(12) United States Patent
Tokuchi

(10) Patent No.: US 11,144,633 B2
(45) Date of Patent: Oct. 12, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 255 days.

(21) Appl. No.: 16/102,016

(22) Filed: Aug. 13, 2018

(65) Prior Publication Data

US 2019/0286810 A1    Sep. 19, 2019

(30) Foreign Application Priority Data

Mar. 13, 2018 (JP) .............................. JP2018-046027

(51) Int. Cl.
*G06F 21/44* (2013.01)
*G06F 21/32* (2013.01)
*G06F 9/54* (2006.01)

(52) U.S. Cl.
CPC ............ *G06F 21/445* (2013.01); *G06F 9/542* (2013.01); *G06F 21/32* (2013.01)

(58) Field of Classification Search
CPC .............................. G06F 21/32; G06F 21/445
See application file for complete search history.

(56) References Cited

U.S. PATENT DOCUMENTS

| | | | |
|---|---|---|---|
| 9,137,393 B2 | 9/2015 | Sato | |
| 2007/0003105 A1* | 1/2007 | Nakamura | G08B 13/19669 382/103 |
| 2014/0063542 A1* | 3/2014 | Aoki | G06F 3/126 358/1.15 |
| 2015/0294108 A1* | 10/2015 | Kim | G06F 21/36 726/18 |
| 2018/0075032 A1* | 3/2018 | Kimura | G06F 21/34 |

FOREIGN PATENT DOCUMENTS

| | | |
|---|---|---|
| JP | 2011-166748 A | 8/2011 |
| JP | 2014-048672 A | 3/2014 |
| JP | 2015-055987 A | 3/2015 |

* cited by examiner

*Primary Examiner* — Dao Q Ho
(74) *Attorney, Agent, or Firm* — Oliff PLC

(57) ABSTRACT

An information processing apparatus includes a controller that, in response to capturing of an operation target and an authentication object by an image capturing unit, controls notification of information used for operating the operation target.

18 Claims, 32 Drawing Sheets

FIG. 16
| ID | DEVICE NAME | SENSING DATA | FUNCTION NAME AND DESCRIPTION OF FUNCTION |
|---|---|---|---|
| 1 | ·MULTIFUNCTION MACHINE $\alpha$ | 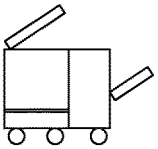 | ·FUNCTION NAME: A<br>·DESCRIPTION: PRINT USING MULTIFUNCTION MACHINE $\alpha$ |
| 2 | ·MULTIFUNCTION MACHINE $\alpha$<br>·PC $\beta$ | 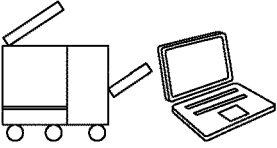 | ·FUNCTION NAME: B<br>·DESCRIPTION: SCAN-TRANSFER USING MULTIFUNCTION MACHINE $\alpha$ AND PC $\beta$ |
| ... | ... | ... | ... |

FIG. 23

| ID | DEVICE NAME | SENSING DATA | FUNCTION NAME AND DESCRIPTION OF FUNCTION |
|---|---|---|---|
| 3 | ·BODY PORTION α1 OF MULTIFUNCTION MACHINE α |  | ·FUNCTION NAME: C<br>·DESCRIPTION: PRINT |
| 4 | ·BODY PORTION α1 OF MULTIFUNCTION MACHINE α<br>·DISPLAY β1 OF PC β | 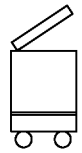 | ·FUNCTION NAME: D<br>·DESCRIPTION: PRINT |
| 5 | ·BODY PORTION α1 OF MULTIFUNCTION MACHINE α<br>·PC β | 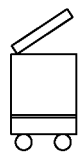 | ·FUNCTION NAME: E<br>·DESCRIPTION: PRINT, SCAN-TRANSFER |
| ... | ... | ... | ... |

| ID | DEVICE NAME | SENSING DATA | POSITIONAL RELATIONSHIP | FUNCTION NAME AND DESCRIPTION OF FUNCTION |
|---|---|---|---|---|
| 6 | · MULTIFUNCTION MACHINE α | | A | · FUNCTION NAME: F<br>· DESCRIPTION: PRINT |
| 7 | · MULTIFUNCTION MACHINE α | | B | · FUNCTION NAME: G<br>· DESCRIPTION: SCAN |
| ... | ... | ... | ... | ... |

FIG. 26

| ID | DEVICE NAME | SENSING DATA | TYPE OF SENSING | FUNCTION NAME AND DESCRIPTION OF FUNCTION |
|---|---|---|---|---|
| 8 | · MULTIFUNCTION MACHINE α | | MOVING IMAGE | · FUNCTION NAME: H<br>· DESCRIPTION: PRINT |
| 9 | · MULTIFUNCTION MACHINE α | | STILL IMAGE | · FUNCTION NAME: J<br>· DESCRIPTION: SCAN |
| ... | ... | ... | ... | ... |

FIG. 27

| ID | DEVICE NAME | SENSING DATA | ORDER | FUNCTION NAME AND DESCRIPTION OF FUNCTION |
|---|---|---|---|---|
| 10 | · MULTIFUNCTION MACHINE α<br>· PC β | | α → β | · FUNCTION NAME: K<br>· DESCRIPTION: SCAN-TRANSFER |
| 11 | · MULTIFUNCTION MACHINE α<br>· PC β | | β → α | · FUNCTION NAME: L<br>· DESCRIPTION: PRINT |
| ... | ... | ... | ... | ... |

FIG. 28

| ID | NAME OF REGISTRATION TARGET | SENSING DATA | FUNCTION NAME AND DESCRIPTION OF FUNCTION |
|---|---|---|---|
| 12 | ·PC ε |  | ·FUNCTION NAME: M<br>·DESCRIPTION: ACTIVATION OF DOCUMENT CREATION SOFTWARE |
| 13 | ·PC ε<br>·NOTE BOOK ζ |  | ·FUNCTION NAME: N<br>·DESCRIPTION: SET PASSWORD FOR DOCUMENT FILE. |
| 14 | ·NOTE BOOK ζ |  | ·FUNCTION NAME: P<br>·DESCRIPTION: OPEN DOCUMENT FILE η. |
| 15 | ·NOTE BOOK ζ<br>·PEN κ |  | ·FUNCTION NAME: Q<br>·DESCRIPTION: ADD CONTENTS OF DOCUMENT FILE η TO ACCOUNTING FILE θ. |
| ... | ... | ... | ... |

| ID | DEVICE NAME | SENSING DATA | AUTHENTICATION INFORMATION | DESCRIPTION OF FUNCTION |
|---|---|---|---|---|
| 16 | · MULTIFUNCTION MACHINE α | | | · COPY FUNCTION<br>· SCAN FUNCTION<br>· PRINT FUNCTION<br>... |
| 17 | · PC β | | | · FILE OPEN FUNCTION<br>· FILE DELETE FUNCTION<br>· EMAIL FUNCTION<br>... |
| 18 | · MULTIFUNCTION MACHINE α<br>· PC β | | | · SCAN-TRANSFER FUNCTION<br>· PRINT FUNCTION |
| ... | ... | ... | ... | ... |

FIG. 42

| ID | DEVICE NAME | SENSING DATA | AUTHENTICATION INFORMATION | DESCRIPTION OF FUNCTION |
|---|---|---|---|---|
| 19 | · BODY PORTION α1 OF MULTIFUNCTION MACHINE α | | | · PRINT FUNCTION |
| 20 | · BODY PORTION α1 OF MULTIFUNCTION MACHINE α · DISPLAY β1 OF PC β | | | · PRINT FUNCTION |
| 21 | · BODY PORTION α1 OF MULTIFUNCTION MACHINE α · PC β | | | · SCAN-TRANSFER FUNCTION · PRINT FUNCTION |
| ... | ... | ... | ... | ... |

FIG. 43
| ID | DEVICE NAME | SENSING DATA | POSITIONAL INFORMATION | AUTHENTICATION INFORMATION | DESCRIPTION OF FUNCTION |
|---|---|---|---|---|---|
| 22 | ·MULTIFUNCTION MACHINE α | 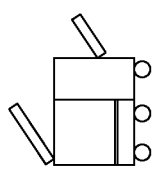 | A | 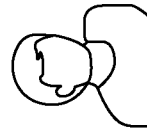 | ·PRINT FUNCTION |
| 23 | ·MULTIFUNCTION MACHINE α | 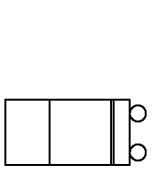 | B | 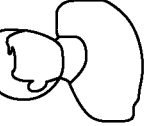 | ·SCAN FUNCTION |
| ⋮ | ⋮ | ⋮ | ⋮ | ⋮ | ⋮ |

FIG. 44
| ID | DEVICE NAME | SENSING DATA | TYPE OF SENSING | AUTHENTICATION INFORMATION | DESCRIPTION OF FUNCTION |
|---|---|---|---|---|---|
| 24 | ·MULTIFUNCTION MACHINE α | 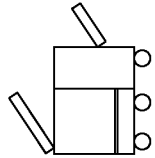 | MOVING IMAGE | 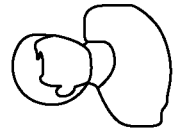 | ·PRINT FUNCTION |
| 25 | ·MULTIFUNCTION MACHINE α | 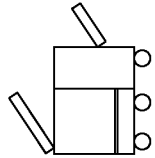 | STILL IMAGE | 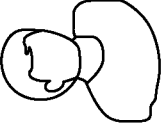 | ·SCAN FUNCTION |
| ... | ... | ... | ... | ... | ... |

FIG. 45
| ID | DEVICE NAME | SENSING DATA | ORDER | AUTHENTICATION INFORMATION | DESCRIPTION OF FUNCTION |
|---|---|---|---|---|---|
| 26 | ·MULTIFUNCTION MACHINE α<br>·PC β |  | α → β | 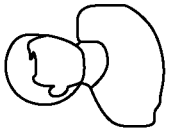 | ·SCAN-TRANSFER FUNCTION |
| 27 | ·MULTIFUNCTION MACHINE α<br>·PC β | 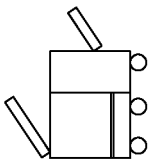 | β → α | 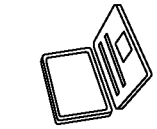 | ·PRINT FUNCTION |
| ⋮ | | | | ⋮ | ⋮ |

FIG. 46

| ID | NAME OF REGISTRATION TARGET | SENSING DATA | AUTHENTICATION INFORMATION | DESCRIPTION OF FUNCTION |
|---|---|---|---|---|
| 28 | · PC ε |  |  | · DESCRIPTION: ACTIVATION OF DOCUMENT CREATION SOFTWARE |
| 29 | · PC ε<br>· NOTE BOOK ζ |  | 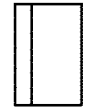 | · DESCRIPTION: SET PASSWORD FOR DOCUMENT FILE. |
| 30 | · NOTE BOOK ζ |  |  | · DESCRIPTION: OPEN DOCUMENT FILE η. |
| 31 | · NOTE BOOK ζ<br>· PEN κ |  |  | · DESCRIPTION: ADD CONTENTS OF DOCUMENT FILE η TO ACCOUNTING FILE θ. |
| ... | ... | ... | | ... |

FIG. 47
| ID | DEVICE NAME | SENSING DATA | AUTHENTICATION LEVEL | AUTHENTICATION INFORMATION | DESCRIPTION OF FUNCTION |
|---|---|---|---|---|---|
| 32 | ·MULTIFUNCTION MACHINE α | 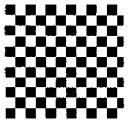 | LEVEL 1 | 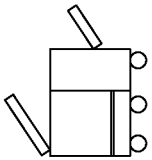 | ·COPY FUNCTION |
| | | | LEVEL 2 |  | ·COPY FUNCTION<br>·PRINT FUNCTION |
| | | | LEVEL 3 | 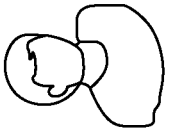 | ·ALL FUNCTIONS |
| ⋮ | ⋮ | ⋮ | ⋮ | ⋮ | ⋮ |

FIG. 48
| ID | DEVICE NAME | SENSING DATA | AUTHENTICATION INFORMATION | DESCRIPTION OF FUNCTION |
|---|---|---|---|---|
| 33 | · MULTIFUNCTION MACHINE α | 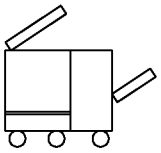 |  | · ALL FUNCTIONS |
| 34 | · MULTIFUNCTION MACHINE α |  | 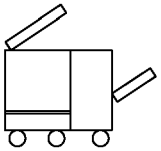 | · COPY FUNCTION<br>· SCAN FUNCTION |
| ... | ... | ... | ... | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-046027 filed Mar. 13, 2018.

BACKGROUND

Technical Field

The present invention relates to an information processing apparatus, and a non-transitory computer readable medium.

Summary

According to an aspect of the invention, there is provided an information processing apparatus including a controller that, in response to capturing of an operation target and an authentication object by an image capturing unit, controls notification of information used for operating the operation target.

BRIEF DESCRIPTION OF THE DRAWINGS

Exemplary embodiments of the present invention will be described in detail based on the following figures, wherein:

FIG. 16 illustrates a function management table;
FIG. 23 illustrates a function management table according to Modification 3;
FIG. 26 illustrates a function management table according to Modification 5;
FIG. 27 illustrates a function management table according to Modification 6;
FIG. 28 illustrates a function management table according to Modification 8;
FIG. 42 illustrates a function management table according to Modification 13;
FIG. 43 illustrates a function management table according to Modification 14;
FIG. 44 illustrates a function management table according to Modification 15;
FIG. 45 illustrates a function management table according to Modification 16;
FIG. 46 illustrates a function management table according to Modification 18;
FIG. 47 illustrates a function management table according to Modification 19;
FIG. 48 illustrates a function management table according to Modification 20.

DETAILED DESCRIPTION

First Exemplary Embodiment

Figure 1:
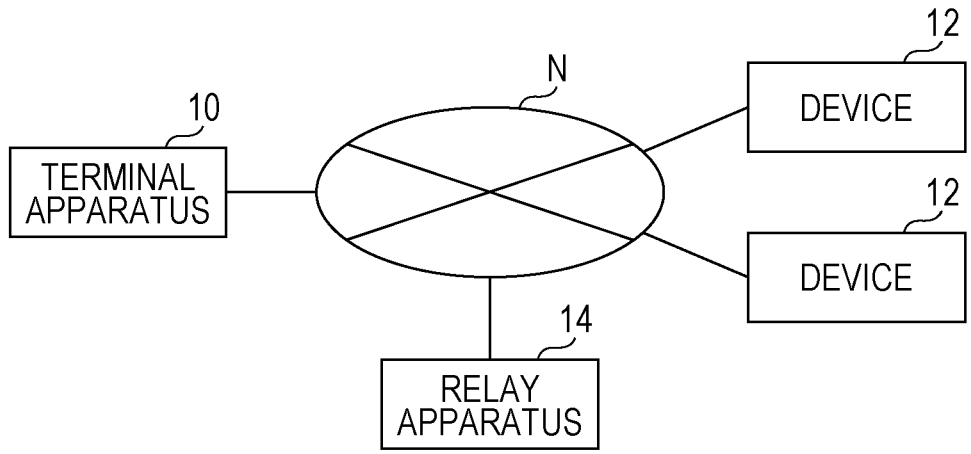
FIG. 1 is a block diagram illustrating an information processing system according to a first exemplary embodiment of the present invention.

An information processing system according to a first exemplary embodiment of the present invention will be described with reference to FIG. 1. FIG. 1 illustrates an example of an information processing system according to the first exemplary embodiment.

In one example, the information processing system according to the first exemplary embodiment includes one or more terminal apparatuses 10, one or more devices 12, and one or more relay apparatuses 14. In the example illustrated in FIG. 1, the information processing system includes a single terminal apparatus 10, two devices 12, and a single relay apparatus 14. The numbers of these components are merely exemplary. The information processing system may include numbers of terminal apparatuses, devices, and relay apparatuses other than those mentioned above. In one example, the terminal apparatus 10, the device 12, and the relay apparatus 14 have the function of communicating with each other via a communication path N such as a network. The communication may be wireless or wired. The Internet may be used as the communication path N. Of course, each of the terminal apparatus 10, the device 12, and the relay apparatus 14 may communicate with another apparatus not via the communication path N but via a different communication path, or directly communicate with another apparatus. Alternatively, the relay apparatus 14 may function as a hub that connects multiple apparatuses with each other, with the terminal apparatus 10 and the device 12 being connected to the relay apparatus 14 to thereby communicate with each other via the relay apparatus 14. A server or other apparatuses may be included in the information processing system.

If the relay apparatus 14 is not used, the relay apparatus 14 may not be included in the information processing system. Likewise, if the device 12 is not used, the device 12 may not be included in the information processing system. As will be described later, a function (such as an independent function or coordinated function) is executed by using, for example, the device 12 or software. If the device 12 is not used for the function, the device 12 may not be included in the information processing system. A detailed description of such a function will be described later in detail.

The terminal apparatus 10 identifies an entity in real space by means of sensing, and associates the entity with a function that is executable in response to the entity being identified again. A detailed description about entities to be identified, sensing, and functions will be given later.

The terminal apparatus 10 is, for example, an apparatus such as a personal computer (PC), a tablet PC, a smart phone, or a cellular phone. The terminal apparatus 10 may be a wearable terminal (such as a wristwatch-type terminal, a wrist band-type terminal, an eyeglass-type terminal, a finger ring-type terminal, a contact lens-type terminal, a body-embedded terminal, or a bearable terminal). The terminal apparatus 10 may have a flexible display serving as a display apparatus. Examples of a flexible display to be used include an organic electroluminescent display (a flexible organic EL display), an electronic paper display, and a flexible liquid crystal display. Flexible displays employing modes of display other than those mentioned above may be used. A flexible display, which refers to a display with a flexibly deformable display portion, is capable of being bent, folded, rolled up, twisted, or stretched, for example. The entire terminal apparatus 10 may be formed by a flexible display, or the flexible display and other components of the terminal apparatus 10 may be functionally or physically separate from each other.

The device 12 represents an apparatus that has a function. Examples of the devices 12 include an image forming apparatus with an image-forming function (such as a scan function, a print function, a copy function, or a facsimile function), a PC, a tablet PC, a smart phone, a cellular phone, a robot (such as a humanoid robot, an animal-type robot other than a humanoid robot, or other types of robots), a projector, a display apparatus such as a liquid crystal display, a recording apparatus, a playback apparatus, an imaging apparatus such as a camera, a refrigerator, a rice cooker, a microwave oven, a coffee maker, a vacuum cleaner, a washing machine, an air-conditioner, a lighting apparatus, a clock, a monitor camera, an automobile, a two-wheel vehicle, an aircraft (e.g., an unmanned aircraft (so-called "drone"), a gaming machine, or various sensing devices (e.g., a temperature sensor, a humidity sensor, a voltage sensor, or a current sensor). The device 12 may be a device that provides an output to the user (e.g., an image forming apparatus or a PC), or may be a device that does not provide an output to the user (e.g., a sensing device). All of multiple devices that execute a coordinated function described later may be devices that provide an output to the user. Alternatively, some of these devices may be devices that provide an output to the user and the other devices may be devices that do not provide an output to the user, or all of these devices may be devices that do not provide an output to the user. The concept of the device 12 may encompass all devices in general. For example, the concept of a device according to the first exemplary embodiment may encompass an information device, a video device, an audio device, or other devices. The device 12 has the function of communicating with another apparatus.

The relay apparatus 14 controls operation of each device 12. The relay apparatus 14 has the function of communicating with another apparatus. The relay apparatus 14 may acquire various information by use of, for example, the Internet. The relay apparatus 14 may function as a server, or may perform operations such as management of data or user information. The relay apparatus 14 may be a so-called smart speaker (a device having a wireless communication function and a speaker function), or may be a device that has a communication function but does not have a speaker function. The relay apparatus 14 may be placed indoors (e.g., on the floor, the ceiling, or a table in a room), or may be placed outdoors. The relay apparatus 14 may be a movable device (e.g., a self-propelled device). The device 12 itself may function as the relay apparatus 14.

The terminal apparatus 10 may communicate with the device 12 not via the relay apparatus 14 but directly or via another apparatus or a communication path to thereby control operation of the device 12.

Figure 2:
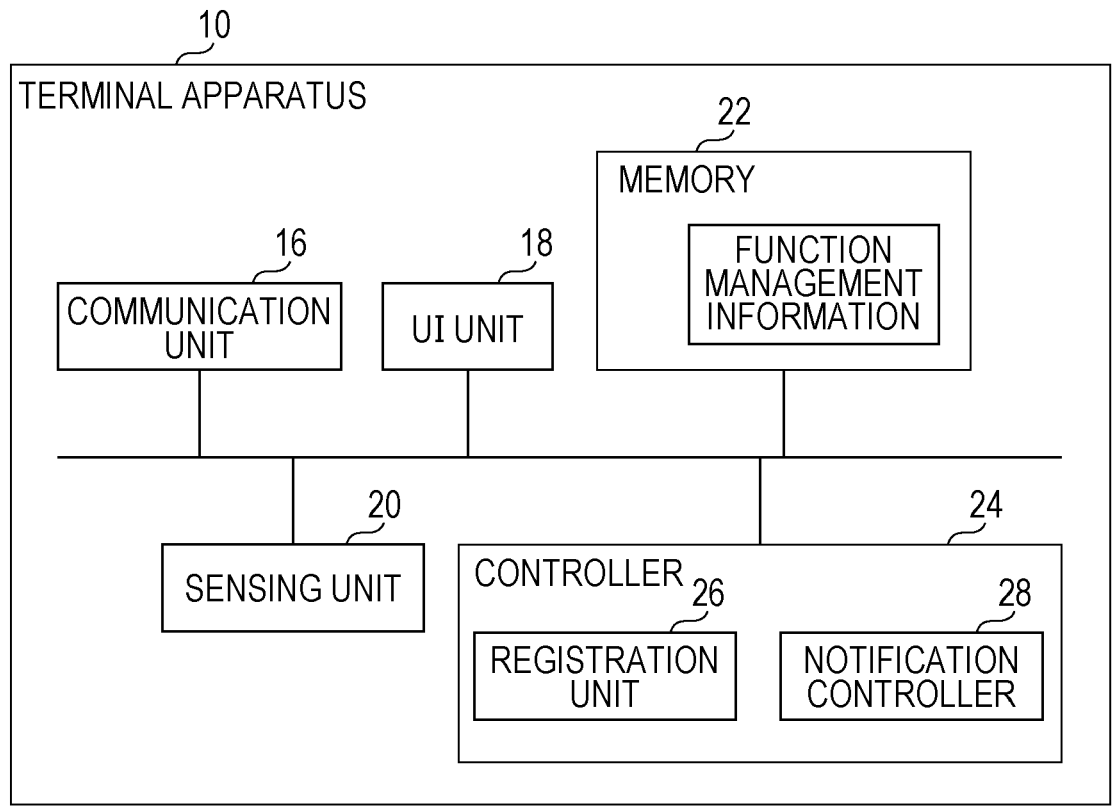
FIG. 2 is a block diagram illustrating a terminal apparatus.

The configuration of the terminal apparatus 10 will be described in detail below with reference to FIG. 2.

A communication unit 16, which is a communication interface, has the function of transmitting data to another apparatus, and the function of receiving data from another apparatus. The communication unit 16 may be a communication interface with a wireless communication function, or may be a communication interface with a wired communication function. For example, the communication unit 16 may support one or more modes of communication, and communicate with a communicating party in accordance with a communication mode suited for the communicating party (i.e., a communication mode supported by the communication party). Examples of such communication modes include infrared communication, visible light communication, Wi-Fi (registered trademark) communication, and short-range wireless communication (e.g., near field communication (NFC)). Examples of short-range wireless communication to be used include Felica (registered trademark), Bluetooth (registered trademark), and radio frequency identifier (RFID). Of course, other modes of wireless communication may be used for short-range wireless communication. The communication unit 16 may switch communication modes or frequency bands in accordance with the communicating party, or may switch communication modes or frequency bands in accordance with the ambient environment.

A UI unit 18, which is a user interface unit, includes a display and an operating unit. The display is, for example, a display apparatus such as a liquid crystal display. The display may be a flexible display. The operating unit is, for example, an input apparatus such as a touch panel or a keyboard. The UI unit 18 may be a user interface that serves as both a display and an operating unit (including, for example, a touch-operated display, or an apparatus that electronically displays a keyboard on a display). The UI unit 18 may include a sound collecting unit such as a microphone, or an audio generating unit such as a speaker. In this case, information may be input to the terminal apparatus 10 by speech input, or information may be uttered by speech.

A sensing unit 20 includes, for example, a camera or a three-dimensional sensor (3D sensor). The sensing unit 20 senses an entity in real space to generate sensing data.

A camera is an image capturing apparatus that captures an image (such as a still image, a moving image, a two-dimensional image, or a three-dimensional image). Moving image data may be video data not including audio data, or may include both video data and audio data. A three-dimensional sensor is a sensor that performs three-dimensional sensing (3D sensing) to measure or detect the three-dimensional shape of a physical object. The concept of sensing encompasses operations such as image capture using a camera and a measurement using a three-dimensional sensor. Image data generated by image capture using a camera, or measurement data (shape data) generated by measurement using a three-dimensional sensor corresponds to an example of sensing data. Alternatively, an entity may be sensed by a sensing device other than the above-mentioned camera or three-dimensional sensor to generate sensing data representing information such as the shape or characteristic features of an entity.

An entity in real space may be a physical object, may be information such as an image or character string displayed on the screen of a display or display apparatus, or may be information such as an image or character string formed in a space. For example, an object associated with a device or software corresponds to an entity in real space. Of course, an object other than those mentioned above may be subject to being sensed as an entity in real space.

A memory 22 is a memory unit such as a hard disk or SSD. The memory 22 stores, for example, information such as function management information, various data, various programs (e.g., an operating system (OS)), various application programs (such as application software), information representing the address of each device 12 (device address information), and information representing the address of the relay apparatus 14 (relay apparatus address information). Various data, various information, or various programs, for example, may be stored in different storages, or may be stored in a single storage.

Function management information is used for management of a function that can be executed by using a component. For example, function management information is used to manage an entity that has been sensed by the sensing unit 20, and a function (a function subject to an operation such as notification or execution) that is executable in response to the entity being sensed again. A component is, for example, the device 12 serving as hardware, software, or a target. A target is, for example, a file (data) or physical object to which a function is applied. A sensed entity may be a component used for a function, or may be an object not used for a component. A detailed description of function management information will be given later.

A controller 24 controls operation of various units of the terminal apparatus 10. For example, the controller 24 performs operations such as execution of various programs, control of communication performed by the communication unit 16, control of the notification of information (e.g., display of information or output of audio) performed using the UI unit 18, and reception of information input to the terminal apparatus 10 by using the UI unit 18. The controller 24 includes a registration unit 26 and a notification controller 28.

The registration unit 26 identifies an entity sensed by the sensing unit 20, associates the entity with a function that is executable in response to the entity being sensed and identified again, and registers the entity and the function into the function management information. For example, the registration unit 26 associates sensing data representing a sensed entity, with information about a function (function information), and registers the sensing data and the function information into the function management information. The registration unit 26 may associate sensing data representing characteristic features of an entity, with function information, and registers the sensing data representing characteristic features and the function information into the function management information.

The notification controller 28 controls notification of a function. For example, when an entity registered in the function management information is sensed by the sensing unit 20, the notification controller 28 determines, in the function management information, a function associated with the entity, and controls notification of the function. More specifically, when an entity is sensed by the sensing unit 20, the notification controller 28 compares sensing data generated as a result of the sensing, with each piece of sensing data registered in the function management information. If the sensing data generated as a result of the sensing is registered in the function management information, the notification controller 28 determines, in the function management information, a function associated with the sensing data, and controls notification of the function. The notification controller 28 may display information indicative of the function on the display of the UI unit 18, or may output information indicative of the function as audio information from a speaker.

The controller 24 may, when an entity registered in the function management information is sensed by the sensing unit 20, control the execution of a function associated with the entity. If the function is a function executed by using the device 12, the controller 24 causes the device 12 to execute the function. If the function is a function executed by using software, the controller 24 activates the software, and causes the software to execute the function.

As described above, in response to sensing, by the sensing unit 20, of an entity registered in the function management information, notification is given of a function associated with the entity or the function is executed. In that sense, it can be said that the entity serves as a trigger for notification or execution of a function associated with the entity.

Hereinafter, functions will be described in detail. Each function registered in the function management information may be an independent function, or may be a coordinated function. An independent function refers to, for example, a function that can be executed by using a single component. A coordinated function refers to a function that can be executed by using multiple components. For example, a coordinated function is a function that can be executed by coordination of multiple components. A coordinated function may be a function that can be executed by using multiple functions possessed by a single device or a single piece of software.

Likewise, the terminal apparatus 10 or the relay apparatus 14 may also be used as a device that executes an independent function or coordinated function, or a function possessed by the terminal apparatus 10 or the relay apparatus 14 may also be used for an independent function or coordinated function. Software or a file used for an independent function or coordinated function may be stored in the memory 22 of the terminal apparatus 10, or may be stored in the device 12, the relay apparatus 14, or another apparatus (such as a server).

For example, the entirety of a device, a specific portion of a device, a specific function of software, or a composite function including multiple functions may be used as a component. For example, if a function is assigned to each portion of a device, a coordinated function may be a function that uses the portion. If a piece of software has multiple functions, a coordinated function may be a function that uses some of the multiple functions. A composite function is made up of multiple functions. As the multiple functions are executed simultaneously or sequentially, a process according to the composite function is executed. A coordinated function may be a function that uses only hardware, may be a function that uses only software, or may be a function that uses both hardware and software.

A coordinated function may be a function that can be executed by coordination of multiple different components, or may be a function that can be executed by coordination of identical components. A coordinated function may be a function previously unavailable prior to coordination of multiple components. For example, coordinating a device (printer) having a print function with a device (scanner) having a scan function enables a copy function to be executed as a coordinated function. That is, coordination of a print function and a scan function enables execution of a copy function. In this case, the print function as a coordinated function is associated with the combination of the print function and the scan function.

The concept of a coordinated function may encompass a combined function, which is a new function that can be executed by coordination of multiple devices or multiple pieces of software. In one example, multiple displays may be combined so that an expanded display function is implemented as a combined function. In another example, a television and a recorder may be combined so that a video recording function is implemented as a combined function. The video recording function may be a function to record images displayed on a television. Multiple cameras may be combined so that a capture-area expansion function is implemented as a combined function. This expansion function is, for example, a function to perform image capture by putting together areas captured by individual cameras. A telephone, a translator, and translation software may be combined so that a translated call function (a function that translates a phone conversation) is implemented as a combined function. As described above, the concept of a coordinated function encompasses a function that can be executed by coordination of multiple devices or multiple pieces of software that are of the same kind, and a function that can be executed by coordination of multiple devices or multiple pieces of software that are of different kinds.

Hereinafter, the function management information will be described in detail. The function management information is, for example, information indicative of the correspondence between the following pieces of information: sensing data representing an entity used as a trigger, function information about a function that can be executed (function subject to an operation such as notification or execution) in response to sensing of the entity, and component identification information used to identify a component used for the function. If an entity used as a trigger is a component used for a function (if entity=component), the component identification information is information used to identify the entity. In this case, sensing data representing the entity may be used as component identification information. Of course, an entity used as a trigger may not be a component used for a function (entity≠component).

For example, the following pieces of information are registered in the function management information in association with each other: sensing data representing an entity used as a trigger, function information about an independent function (an independent function subject to an operation such as notification or execution) that can be executed in response to sensing of the entity, and component identification information indicative of a component used for the independent function.

Further, the following pieces of information are registered in the function management information in association with each other: sensing data representing an entity used as a trigger, function information about a coordinated function (a coordinated function subject to an operation such as notification or execution) that can be executed in response to sensing of the entity, and a combination of multiple components used for the coordinated function (a combination of multiple pieces of component identification information used to identify individual components).

If a component is a device, the component identification information is information used to identify the device (device identification information). If a component is software, the component identification information is information used to identify the software (software identification information). If a component is a target, the component identification information is information used to identify the target (target identification information). Component identification information used to identify a device may include information indicative of a function possessed by the device. Likewise, component identification information used to identify software may include information indicative of a function possessed by the software.

Examples of device identification information include device name, device ID, information indicative of a device type, device model number, information used for management of a device (e.g., asset management information), information indicative of a location where a device is placed (device location information), an image associated with a device (device image), and device address information. If an entity used as a trigger is a device used for a function (if entity=component), sensing data representing the entity may be used as device identification information. A device image is, for example, an appearance image representing a device. An appearance image may be an image representing the exterior of a device (e.g., the housing of a device), may be an image representing a device with the housing open so that its interior is visible from the outside (e.g., an image representing the internal structure of a device), or may be an image representing a device when covered with a packaging sheet or some other material. A device image may be an image generated by capturing a device with an image capturing apparatus such as a camera (such as an image representing the appearance of a device or an image representing the interior of a device), or may be an image schematically representing a device (e.g., an icon). A device image may be a still image, or may be a moving image.

Examples of software identification information include software name, software ID, information indicative of a software type, software model number, information used to manage software, and an image associated with software (software image). A software image is, for example, an image representing software (e.g., an icon). A software image may be a still image, or may be a moving image.

Examples of target identification information include the name of a target, target's ID, information indicative of the type of a target, and an image associated with a target (target's image). For example, if a target is a file (data), the name of the file (e.g., an image file or document file) or other such information is used as target identification information. If a target is a physical object (e.g., a piece of merchandise), the name of the object or other such information is used as target identification information. A target's image may be an image (a still image or a moving image) generated by capturing a physical target with an image capturing apparatus such as a camera, or may be an image schematically representing a target (e.g., an icon).

Examples of function information include identification information such as the name or ID of a function, and description information that provides a description of the function. Examples of function information about an independent function include identification information of the independent function, and description information that provides a description of the independent function. Examples of function information about a coordinated function include identification information of the coordinated function, and description information that provides a description of the coordinated function.

The function management information may be stored in an apparatus other than the terminal apparatus 10 (such as the device 12, the relay apparatus 14, or a server). In this case, the function management information may not be stored in the terminal apparatus 10.

The registration unit 26 or the notification controller 28 may be provided in an apparatus other than the terminal apparatus 10 (such as the device 12, the relay apparatus 14, or a server), and a process to be executed by the registration unit 26 or a process to be executed by the notification controller 28 may be performed by the apparatus other than the terminal apparatus 10.

Hereinafter, a procedure for registering a function will be described.

Registration of Independent Function

Hereinafter, a procedure for registering an independent function will be described in detail. By way of example, the following description assumes that an entity that has been sensed is used for an independent function. That is, a component used for an independent function corresponds to an entity used as a trigger for notification or execution of the independent function (entity=component). The following description also assumes that each of the component and the entity is the device 12.

Figure 3:
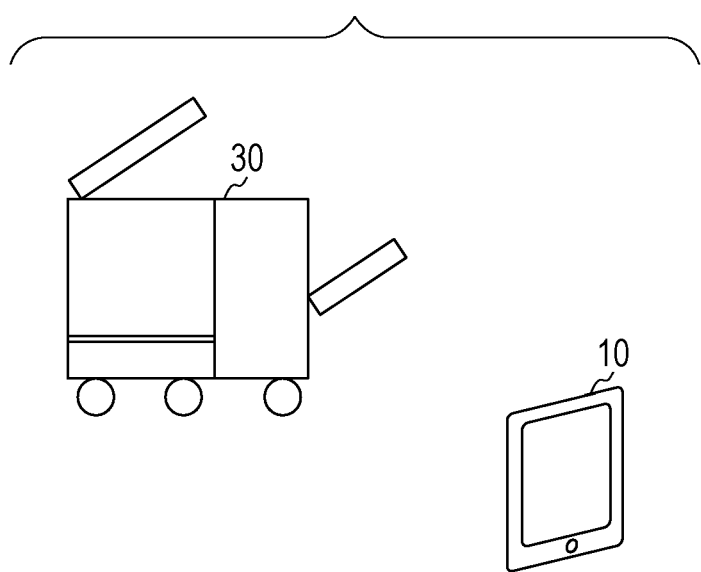
FIG. 3 illustrates devices.

FIG. 3 illustrates a multifunction machine 30, which is as an example of the device 12. The multifunction machine 30 is, for example, an apparatus having multiple functions out of the following functions: a scan function, a print function, a copy function, and a facsimile function. In the present case, the multifunction machine 30 is registered as the device 12 used for an independent function, and is also registered as an entity used as a trigger for notification of the independent function.

Figure 4:
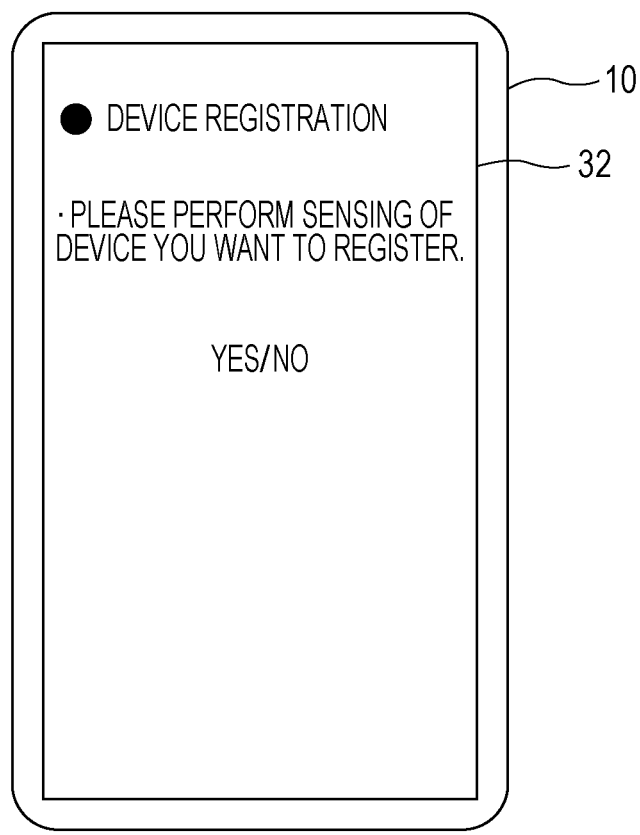
FIG. 4 illustrates a screen.

FIG. 4 illustrates a screen 32 used to register a device. For example, the terminal apparatus 10 is installed with registration software used to perform registration. When the user operates the UI unit 18 and gives an instruction to activate the registration software, the controller 24 activates the registration software. At the same time, the controller 24 displays, on the display of the UI unit 18, the screen 32 used to perform registration. The screen 32 displays, for example, a message prompting the user to perform sensing.

When the user gives, on the screen 32, an instruction to perform sensing (e.g., by pressing a "Yes" button), the sensing unit 20 executes sensing. For example, the multifunction machine 30 is sensed by the sensing unit 20, and sensing data representing the multifunction machine 30 is generated as a result. For example, if the multifunction machine 30 is captured by a camera, image data (still image data or moving image data) representing the multifunction machine 30 is generated as sensing data. If the multifunction machine 30 is sensed by a three-dimensional sensor, measurement data representing the shape of the multifunction machine 30 is generated as sensing data.

Figure 5:
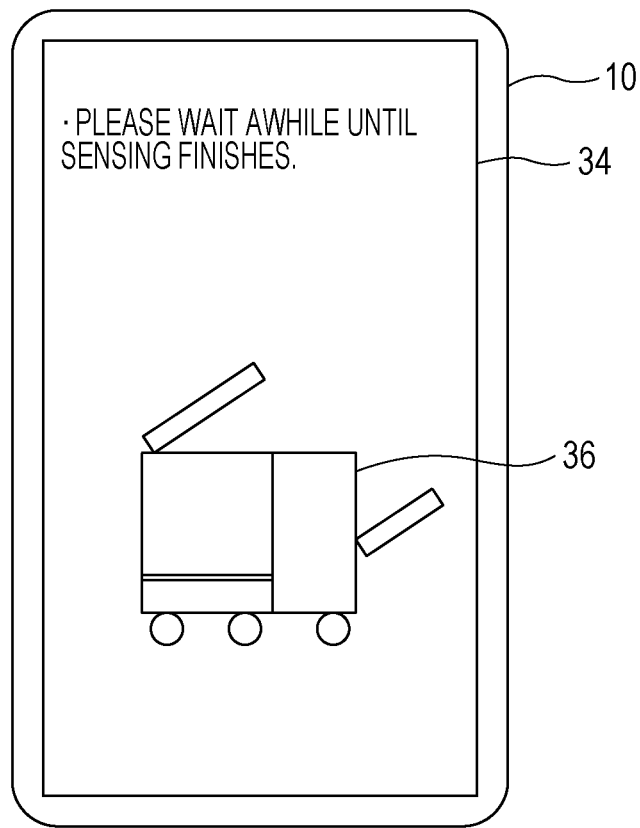
FIG. 5 illustrates a screen.

FIG. 5 illustrates a screen 34 displayed while sensing is performed. The screen 34 displays an image 36 of the multifunction machine 30 that is being sensed. The screen 34 may display a message prompting the user to wait until sensing is finished. The screen 34 may display a message that warns the user not to move the terminal apparatus 10 as much as possible.

Upon completion of sensing, the registration unit 26 registers sensing data generated as a result of the sensing into the function management information. The multifunction machine 30 is thus registered into the function management information. The multifunction machine 30 corresponds to an entity used as a trigger for notification or execution of a function.

Figure 6:
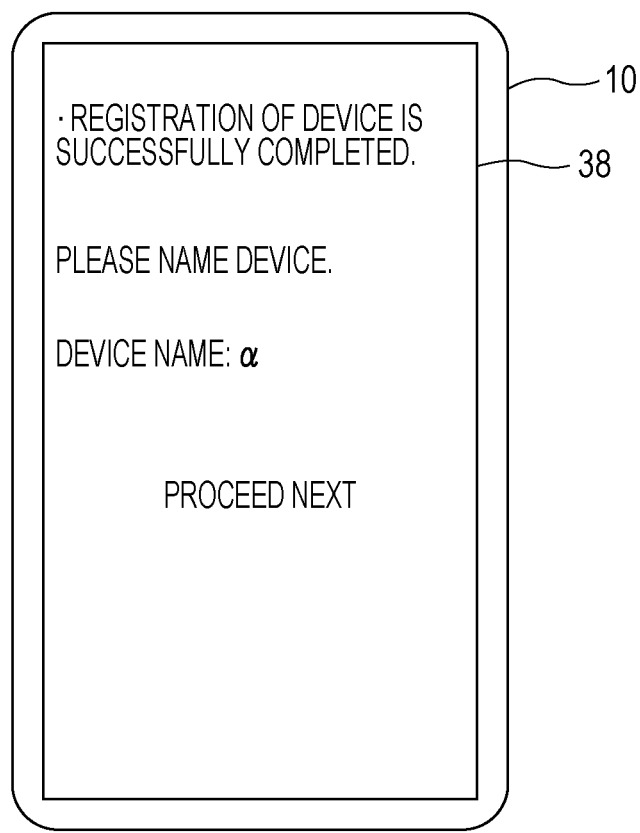
FIG. 6 illustrates a screen.

FIG. 6 illustrates a screen 38 displayed after sensing is completed. The screen 38 displays a message indicating that registration of a device is completed. The screen 38 also displays a field for entering the name of the device. When the user enters, on the screen 38, the name (e.g., name "α") of the multifunction machine 30, the registration unit 26 registers information indicative of the name α into the function management information in association with sensing data representing the multifunction machine 30. When the user gives, on the screen 38, an instruction to proceed to the next setting screen (e.g., by pressing a "Proceed Next" button), the controller 24 displays, on the display of the UI unit 18, a screen used to register an independent function.

Figure 7:
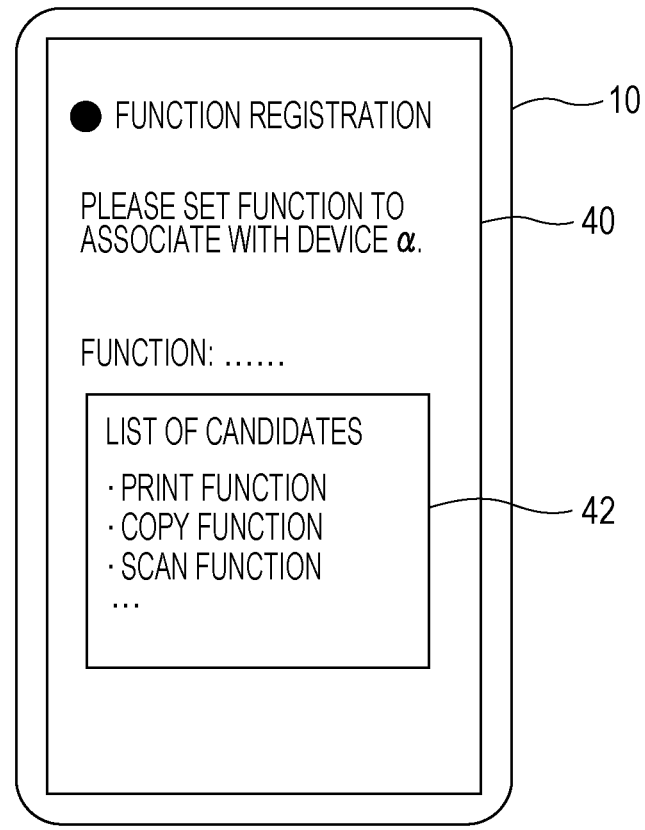
FIG. 7 illustrates a screen.

FIG. 7 illustrates a screen 40 used to register an independent function. The screen 40 displays a field for entering function information about an independent function. Examples of function information include identification information used to identify an independent function (e.g., the name of the independent function), and description information that provides a description of the independent function. When the user enters, on the screen 40, function information about an independent function, the registration unit 26 registers the function information into the function management information in association with sensing data representing the multifunction machine 30.

The user may enter function information about an independent function possessed by the multifunction machine 30, may enter function information about an independent function not possessed by the multifunction machine 30, or may enter function information about an independent function that is not possessed by the multifunction machine 30 and is executed for the multifunction machine 30.

The present example assumes that function information about an independent function possessed by the multifunction machine 30 has been entered. For example, if function information about a copy function has been entered by the user, the registration unit 26 registers the function information about a copy function into the function management information in association with sensing data representing the multifunction machine 30. The user may register a specific description of a process executed by an independent function, or may register only an independent function without registering such a specific description. For example, the user may register information such as the number of sheets to copy, resolution, and paper size as a specific description of a copy process, or may simply register only a copy function without registering such a specific description. The same applies for registration of other independent functions.

The registration unit 26 may search for independent functions possessed by the multifunction machine 30, and display the search results (a list 42 of independent functions) on the screen 40 as a pulldown menu or in some other form. Hereinafter, a search for independent functions possessed by the multifunction machine 30 will be described.

The registration unit 26 identifies, based on sensing data (such as image data or measurement data) generated by sensing performed by using the sensing unit 20, an entity (the multifunction machine 30) on which the sensing has been performed. For example, the registration unit 26 uses a database of entities to identify the above-mentioned entity. The database associates, for each entity, identification information used to identify the entity, with sensing data representing the entity. When an entity is sensed by the sensing unit 20 and sensing data is generated, the registration unit 26 checks the sensing data against each piece of sensing data registered in the database to thereby identify the sensed entity. For example, the registration unit 26 may search the database to retrieve sensing data that perfectly matches the sensing data generated by sensing (perfectly-matching sensing data), and identify the sensed entity as an entity associated with the perfectly-matching sensing data. The registration unit 26 may search the database to retrieve sensing data that partially matches the sensing data generated by sensing (sensing data that matches the generated sensing data by a proportion greater than or equal to a predetermined value) (partially-matching sensing data), and identify the sensed entity as an entity associated with the partially-matching sensing data. The registration unit 26 may extract characteristic features of an entity from sensing data generated by sensing, and search the database to retrieve sensing data having characteristic features identical or similar to the extracted characteristic features, and identify the sensed entity as an entity associated with the retrieved sensing data. In this way, the entity on which sensing has been performed is identified.

For example, the database associates, for each device 12, device identification information used to identify the device 12, with image data representing the device 12. When the device 12 is captured by the sensing unit 20 and the resulting image data is generated as sensing data, the registration unit 26 determines, in the database, identification information of the device 12 that is associated with the image data. In this way, the device 12 subjected to sensing (subjected to image capture) is identified. The multifunction machine 30 is also identified in the same manner. An entity may be identified by information at the subordinate concept level (e.g., the unique name of the entity (e.g., a specific product name, trade name, or model number)), or may be identified by information at the superordinate concept level (e.g., the generic name or common name of the entity).

Independent functions possessed by individual devices 12 or individual pieces of software are registered in the above-mentioned database. For example, the database associates, for each device 12, device identification information of the device with function information about an independent function possessed by the device. The database also associates, for each piece of software, software identification information of the software with function information about an independent function possessed by the software. As described above, in response to identifying of the device 12, the registration unit 26 determines which function information is associated with the device identification information of the device 12. In this way, an independent function possessed by the sensed device 12 is identified. An independent function possessed by the multifunction machine 30 is also identified in the same manner.

The above-mentioned database may be built on the terminal apparatus 10, or may be built on the relay apparatus 14, a server, or other apparatuses.

In the example illustrated in FIG. 7, functions such as a print function, a copy function, and a scan function are determined to be independent functions possessed by the multifunction machine 30, and displayed on the screen 40. When the user selects an independent function from the list 42, the registration unit 26 registers the selected independent function into the function management information in association with sensing data representing the multifunction machine 30. The controller 24 may acquire device identification information of the multifunction machine 30 from the database through the above-mentioned identification process.

The screen 40 may display a field to enter an output result desired by the user. When an output result desired by the user is entered into the field, the registration unit 26 searches for independent functions used to obtain the output result, and the controller 24 displays the search results on the screen 40. The user may select an independent function from the search results.

The user may specify one or more independent functions as independent functions to be registered. The registration unit 26 registers the one or more independent functions specified by the user into the function management information in association with sensing data representing the multifunction machine 30.

Figure 8:
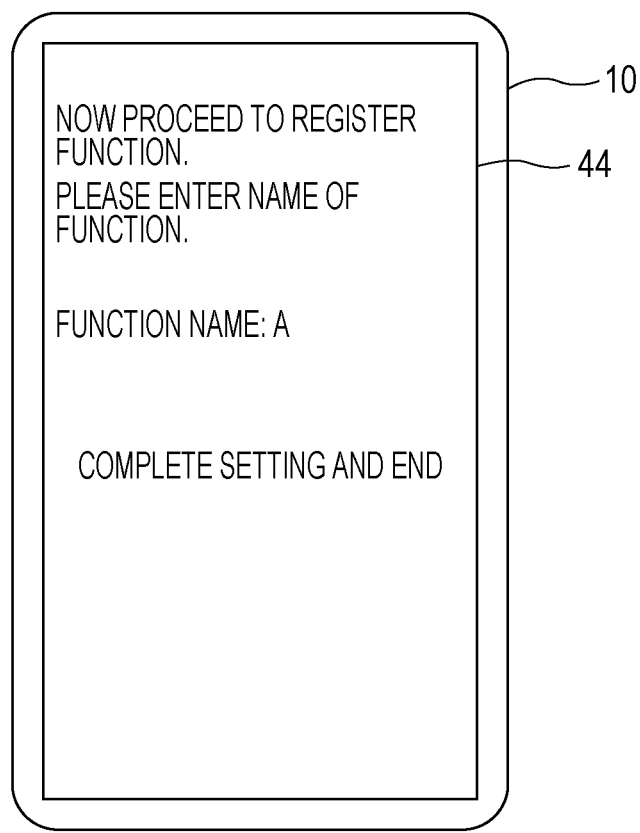
FIG. 8 illustrates a screen.

Upon entry of function information on the screen 40, the controller 24 displays, on the display of the UI unit 18, a screen 44 used to enter the name of a function as illustrated in FIG. 8. When the user enters, on the screen 44, the name (e.g., name "A") of a function, the registration unit 26 registers the name "A" into the function management information as the name of a function entered by the user.

Through the above-mentioned procedure, the following pieces of information are registered into the function management information in association with each other: function information about a copy function, which is an independent function, device identification information of the multifunction machine 30 (a multifunction machine α), which is a component used to execute the independent function, and sensing data representing the multifunction machine 30, which serves as an entity used as a trigger for notification or execution of the independent function.

In response to sensing, after the registration process, of the multifunction machine 30 by the sensing unit 20, the notification controller 28 identifies the multifunction machine 30 based on sensing data generated as a result of the sensing, and determines, in the functional management information, a function A (copy function) associated with the sensing data. In the following description, for the convenience of explanation, sensing data generated after the above-mentioned registration process will be referred to as "re-sensing data".

The notification controller 28 may search the function management information to retrieve sensing data that perfectly matches re-sensing data (perfectly-matching sensing data), and determine an independent function associated with the perfectly-matching sensing data. In this process, if re-sensing data representing the multifunction machine 30 that has been re-sensed, and sensing data representing the multifunction machine α registered in the function management information perfectly match, the notification controller 28 identifies the re-sensed multifunction machine 30 as the multifunction machine α. The notification controller 28 then identifies, in the function management information, the function A associated with the sensing data representing the multifunction machine α, as an independent function associated with the multifunction machine 30.

The notification controller 28 may search the function management information to retrieve sensing data that partially matches re-sensing data (sensing data that matches re-sensing data by a proportion greater than or equal to a predetermined value) (partially-matching sensing data), and determine an independent function associated with the partially-matching sensing data. In this process, if re-sensing data representing the multifunction machine 30 that has been re-sensed, and sensing data representing the multifunction machine α registered in the function management information partially match, the notification controller 28 identifies the re-sensed multifunction machine 30 as the multifunction machine α. The notification controller 28 then identifies, in the function management information, the function A associated with the sensing data representing the multifunction machine α, as an independent function associated with the multifunction machine 30. For example, if re-sensing data represents an entity other than a registered device (e.g., a device other than the multifunction machine α or some other object), the re-sensing data does not perfectly match the sensing data generated at the time of registration. If the background differs between during registration and during re-sensing, the two pieces of sensing data do not perfectly match but partially match. In this case, the notification controller 28 regards the two pieces of sensing data as partially matching, and gives notification of the function A.

The notification controller 28 may extract characteristic features of the multifunction machine 30 from re-sensing data, search the function management information to retrieve sensing data having characteristic features identical or similar to the extracted characteristic features, and determine an independent function associated with the retrieved sensing data. In this process, if the characteristic features extracted from the re-sensing data representing the multifunction machine 30 that has been re-sensed, and characteristic features extracted from sensing data representing the multifunction machine α registered in the function management information are identical or similar, the notification controller 28 identifies the re-sensed multifunction machine 30 as the multifunction machine α. The notification controller 28 then identifies, in the function management information, the function A associated with the sensing data representing the multifunction machine α, as an independent function associated with the multifunction machine 30. For example, if re-sensing data represents an entity other than a registered device (e.g., a device other than the multifunction machine α or some other object), the re-sensing data does not perfectly match the sensing data generated at the time of registration. In this case, if the characteristic features of devices represented by the two pieces of sensing data are identical or similar, the notification controller 28 gives notification of the function A.

In the above-mentioned example, the notification controller 28 compares sensing data generated at the time of registration with re-sensing data, determines an associated independent function in accordance with the comparison result, and gives notification of the independent function. In another example, the notification controller 28 may identify a device represented by sensing data generated at the time of registration, and identify a device represented by re-sensing data, and if the two devices match, the notification controller 28 may give notification of an independent function associated with the sensing data generated at the time of registration. That is, the notification controller 28 searches the function management information to retrieve a device represented by the re-sensing data, and gives notification of an independent function associated with the device. For example, the notification controller 28 searches the above-mentioned database to identify a device represented by the sensing data generated at the time of registration or the re-sensing data.

Figure 9:
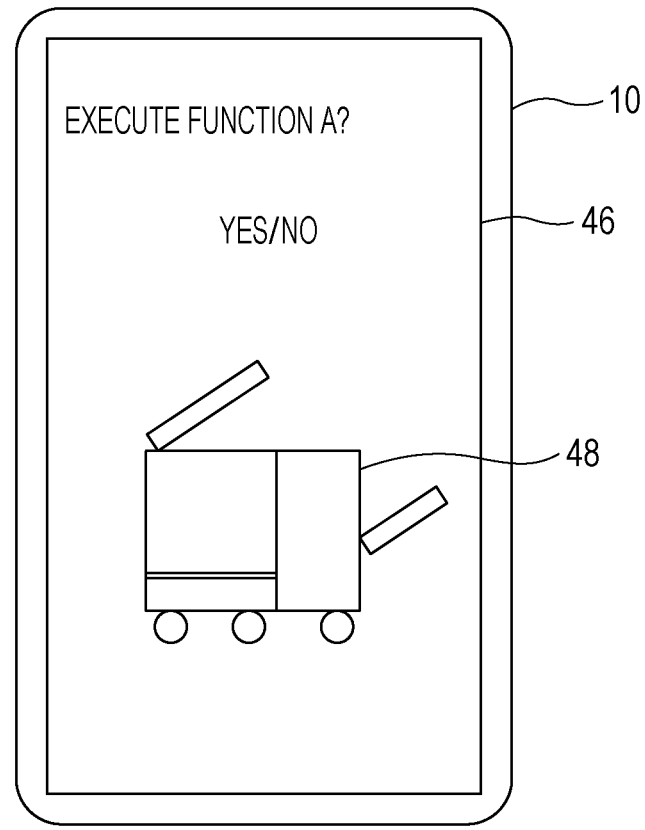
FIG. 9 illustrates a screen.

For example, the notification controller 28 displays information indicative of the function A (copy function) on the display of the UI unit 18. FIG. 9 illustrates an example of information displayed at this time. For example, a screen 46 is displayed on the display of the UI unit 18, and the notification controller 28 displays, on the screen 46, information indicative of the function A (copy function) associated with the sensing data representing the multifunction machine 30 (multifunction machine α). The notification controller 28 may also display an image 48 (e.g., sensing data) representing the multifunction machine 30 on the screen 46.

When the user gives, on the screen 46, an instruction to execute the function A (copy function) (e.g., by pressing a "Yes" button), the controller 24 causes the multifunction machine 30 (multifunction machine α) to execute the function A (copy function). For example, by using device address information of the multifunction machine 30, the controller 24 transmits, to the multifunction machine 30, a control signal indicative of an instruction to execute copying. The control signal may be transmitted to the multifunction machine 30 directly from the terminal apparatus 10, or may be transmitted to the multifunction machine 30 via the relay apparatus 14. The device address information of the multifunction machine 30 may be stored in the terminal apparatus 10 in advance, or may be acquired from the database as a result of the above-mentioned identification process.

Registration of Coordinated Function

Hereinafter, a procedure for registering a coordinated function will be described in detail. By way of example, the following description assumes that an entity that has been sensed is used for a coordinated function. That is, a component used for a coordinated function corresponds to an entity used as a trigger for notification or execution of the coordinated function (entity=component). The following description also assumes that each of the component and the entity is the device 12.

Figure 10:
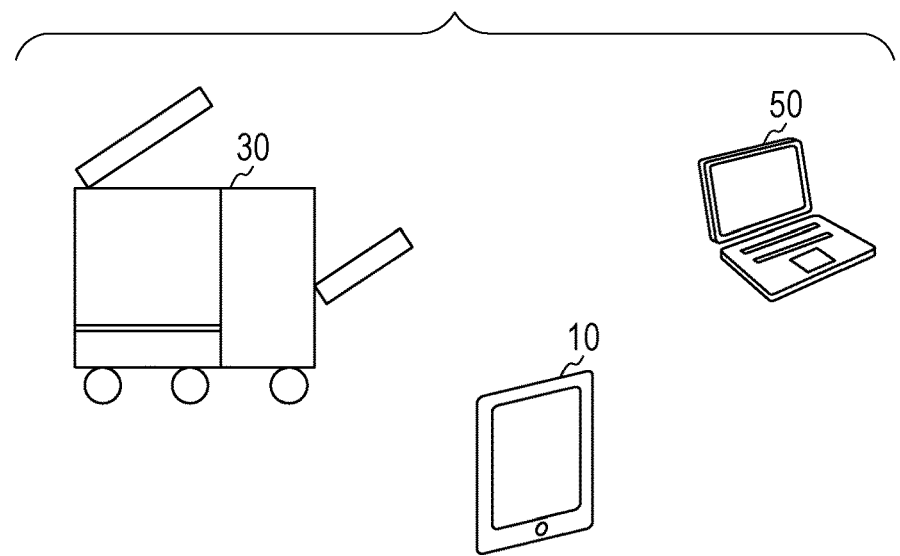
FIG. 10 illustrates devices.

FIG. 10 illustrates the multifunction machine 30 and a PC 50, which each represent an example of the device 12. In the present case, the multifunction machine 30 and the PC 50 are each registered as the device 12 used for a coordinated function, and also registered as an entity used as a trigger for notification of the coordinated function.

For example, as illustrated in FIG. 4, the screen 32 for registering a device is displayed on the display of the UI unit 18. When the user gives, on the screen 32, an instruction to perform sensing, the sensing unit 20 executes sensing. For example, the multifunction machine 30 and the PC 50 are sensed by the sensing unit 20, and sensing data representing the multifunction machine 30 and sensing data representing the PC 50 are generated as a result.

The multifunction machine 30 and the PC 50 may be sensed simultaneously or may be individually sensed sequentially. For example, if the multifunction machine 30 and the PC 50 are captured simultaneously by a camera, that is, if the multifunction machine 30 and the PC 50 are captured simultaneously such that the multifunction machine 30 and the PC 50 are represented within the same frame, image data representing both the multifunction machine 30 and the PC 50 is generated. If each of the multifunction machine 30 and the PC 50 is captured individually by a camera, image data representing the multifunction machine 30 and image data representing the PC 50 are generated individually. The same applies for sensing performed by using a three-dimensional sensor.

For cases where multiple devices 12 are to be sensed individually, if sensing of a given device 12 (e.g., the multifunction machine 30) is followed within a predetermined time limit by sensing of another device 12 (e.g., the PC 50), the registration unit 26 may recognize the two devices 12 (the multifunction machine 30 and the PC 50) as belonging to a group of devices used to execute a coordinated function. Any device 12 sensed outside the time limit is recognized by the registration unit 26 as the device 12 not belonging to the group of devices 12 sensed within the time limit. That is, at the time of initial sensing of the device 12, the sensed device 12 is not registered as a device used to execute an independent function. If sensing of the device 12 is followed within the time limit by sensing of another device 12, then these multiple devices 12 are registered as devices used to execute a coordinated function.

The user may be able to select, on the screen 32 used to register a device, either an independent-function registration mode or a coordinated-function registration mode.

For example, if the independent-function registration mode is specified by the user, and a single device 12 is sensed, the registration unit 26 registers the sensed device 12 as the device 12 used for an independent function. If multiple devices 12 are sensed while the independent-function registration mode is executed, the registration unit 26 registers each of the sensed devices 12 as a separate device 12 used for an independent function.

If the coordinated-function registration mode is specified by the user, and multiple devices 12 are sensed simultaneously or sequentially, the registration unit 26 registers the multiple devices 12 as the devices 12 used for a coordinated function.

Figure 11:
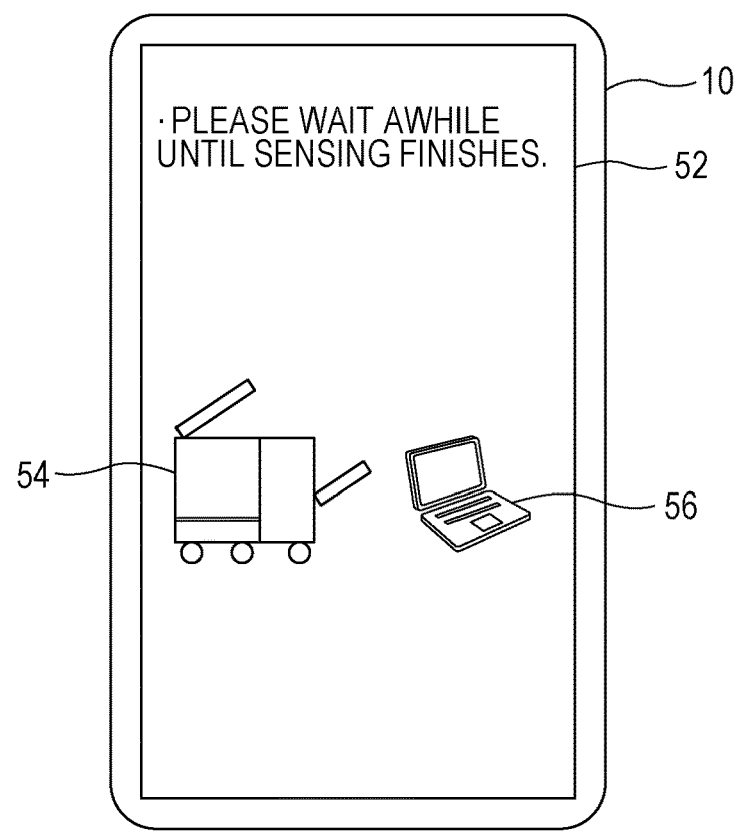
FIG. 11 illustrates a screen.

FIG. 11 illustrates a screen 52 displayed while sensing is performed. The screen 52 displays an image 54 representing the multifunction machine 30 that is being sensed, and an image 56 representing the PC 50 that is being sensed. If the multifunction machine 30 and the PC 50 are being sensed simultaneously, for example, images representing the multifunction machine 30 and the PC 50 are simultaneously displayed on the screen 52. If the multifunction machine 30 and the PC 50 are being sensed sequentially, for example, the images 54 and 56 are displayed on the screen 52 in accordance with the order in which these devices are sensed. Additionally, the same message as that illustrated in FIG. 5 is displayed.

Upon completion of sensing, the registration unit 26 registers sensing data generated as a result of the sensing into the function management information. The multifunction machine 30 and the PC 50 are thus registered into the function management information. The multifunction machine 30 and the PC 50 each correspond to an entity used as a trigger for notification or execution of a function.

Figure 12:
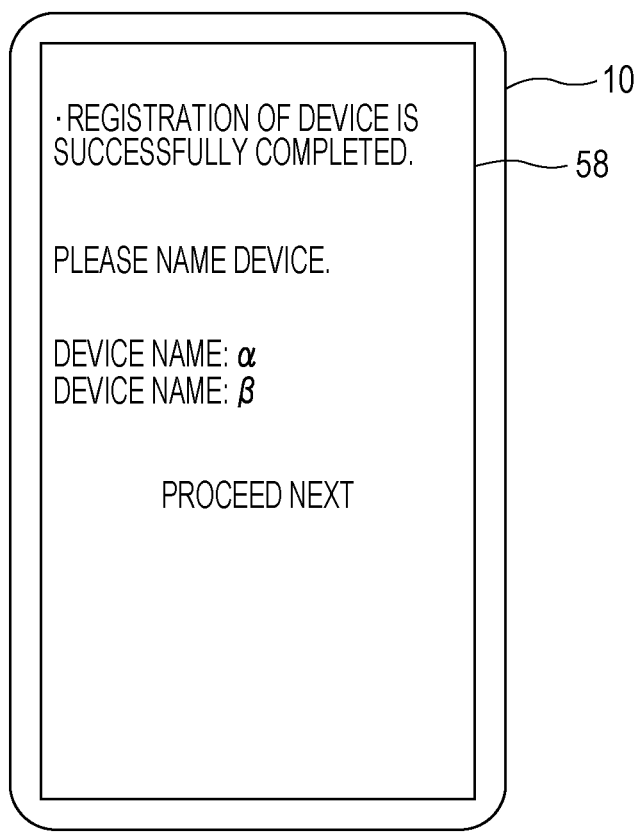
FIG. 12 illustrates a screen.

FIG. 12 illustrates a screen 58 displayed after sensing is completed. The screen 58 displays a message indicating that registration of a device is completed. The screen 58 also displays a field for entering the name of the device. When the user enters, on the screen 58, the name (e.g., name "α") of the multifunction machine 30 and the name (e.g., name "β") of the PC 50, the registration unit 26 registers information indicative of the name α into the function management information in association with sensing data representing the multifunction machine 30, and registers information indicative of the name β into the function management information in association with sensing data representing the PC 50. When the user gives, on the screen 58, an instruction to proceed to the next setting screen, the controller 24 displays, on the display of the UI unit 18, a screen used to register a coordinated function.

Figure 13:
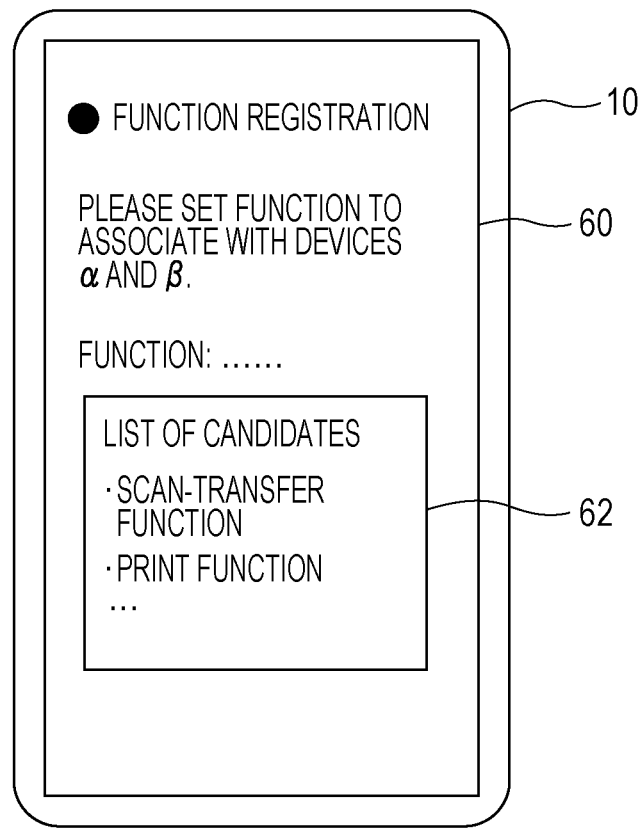
FIG. 13 illustrates a screen.

FIG. 13 illustrates a screen 60 used to register a coordinated function. The screen 60 displays a field to enter function information about a coordinated function. Examples of function information include identification information used to identify a coordinated function (e.g., the name of the coordinated function), and description information that provides a description of the coordinated function. When the user enters, on the screen 60, function information about a coordinated function, the registration unit 26 registers the function information into the function management information in association with a combination of sensing data representing the multifunction machine 30 and sensing data representing the PC 50.

The user may enter function information about a coordinated function that uses functions possessed by each of the multifunction machine 30 and the PC 50, may enter function information about a coordinated function that uses functions not possessed by the multifunction machine 30 and the PC 50, or may enter function information about a coordinated function that is not possessed by the multifunction machine 30 and the PC 50 and is executed for the multifunction machine 30 and the PC 50.

The present example assumes that function information about a coordinated function that uses functions possessed by each of the multifunction machine 30 and the PC 50 has been entered. For example, in response to the user's entry of function information about a scan-transfer function, the registration unit 26 registers function information about a scan-transfer function into the function management information in association with a combination of sensing data representing the multifunction machine 30 and sensing data representing the PC 50. The scan-transfer function is a function that transfers, to the PC 50, image data or document data generated by a scan performed by the multifunction machine 30. The user may register a description of a specific process executed by a coordinated function, or may register only a coordinated function without registering such a specific description. For example, the user may register the conditions (such as resolution) of a scan, or may simply register a scan-transfer function without registering such a specific description. The same applies for registration of other coordinated functions.

The registration unit 26 may search for coordinated functions that can be executed by using the multifunction machine 30 and the PC 50, and display the search results (a list 62 of coordinated functions) on the screen 60 as a pulldown menu or in some other form.

For example, coordinated functions that can be executed by using multiple components may be registered in the above-mentioned database of entities, and the registration unit 26 may refer to the database to search for coordinated functions. For example, the database associates a combination of multiple components (a combination of multiple pieces of component identification information) with function information about a coordinated function that can be executed by using the multiple components. As described above, the registration unit 26 refers to the database to identify the multifunction machine 30 and the PC 50 and, further, determines a coordinated function associated with the combination of the multifunction machine 30 and the PC 50. In this way, a coordinated function that can be executed by using multiple sensed devices 12 is identified.

In the example illustrated in FIG. 13, functions such as a scan-transfer function and a print function are displayed on the screen 60 as coordinated functions that can be executed by using the multifunction machine 30 and the PC 50. When the user selects a coordinated function from the list 62, the registration unit 26 registers the selected coordinated function into the function management information in association with a combination of sensing data representing the multifunction machine 30 and sensing data representing the PC 50. The controller 24 may acquire device identification information of the multifunction machine 30 and device identification information of the PC 50 from the database through the above-mentioned identification process.

The screen 60 may display a field to enter an output result desired by the user. When an output result desired by the user is entered into the field, the registration unit 26 searches for coordinated functions used to obtain the output result, and the controller 24 displays the search results on the screen 60. The user may select a coordinated function from the search results.

The user may specify one or more coordinated functions as coordinated functions to be registered. The registration unit 26 registers the one or more coordinated functions specified by the user into the function management information in association with a combination of sensing data representing the multifunction machine 30 and sensing data representing the PC 50.

Figure 14:
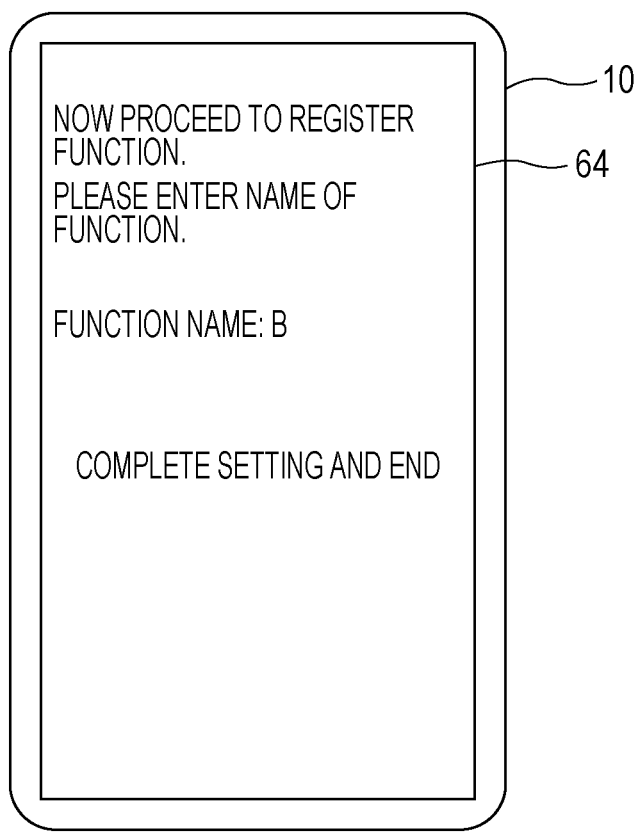
FIG. 14 illustrates a screen.

Upon entry of function information on the screen 60, the controller 24 displays, on the display of the UI unit 18, a screen 64 used to enter the name of a function as illustrated in FIG. 14. When the user enters, on the screen 64, the name (e.g., name "B") of a function, the registration unit 26 registers the name "B" into the function management information as the name of a function entered by the user.

Through the above-mentioned procedure, the following pieces of information are registered into the function management information in association with each other: function information about a scan-transfer function, which is a coordinated function, device identification information of each of the multifunction machine 30 (multifunction machine α) and the PC 50 (PC β), which each serve as a component used to execute the coordinated function, and a combination of sensing data representing the multifunction machine 30 and sensing data representing the PC 50, which each serve as an entity used as a trigger for notification or execution of the coordinated function.

If, after the above-mentioned registration, the multifunction machine 30 and the PC 50 are sensed by the sensing unit 20, the notification controller 28 identifies the multifunction machine 30 and the PC 50 based on sensing data generated as a result of the sensing, and determines, in the function management information, a function B (scan-transfer function) as a function associated with the combination of sensing data representing the multifunction machine 30 and sensing data representing the PC 50. In the sensing process performed after registration, the multifunction machine 30 and the PC 50 may be sensed simultaneously, or may be individually sensed sequentially in the same manner as described above. The meanings and consequences of simultaneous sensing and sequential sensing are the same as the meanings and consequences of simultaneous sensing and sequential sensing performed at the time of registration. If the multifunction machine 30 and the PC 50 are re-sensed simultaneously, re-sensing data representing both the multifunction machine 30 and the PC 50 is generated. If the multifunction machine 30 and the PC 50 are re-sensed individually, re-sensing data representing the multifunction machine 30 and re-sensing data representing the PC 50 are generated.

The notification controller 28 may search the function management information to retrieve sensing data that perfectly matches re-sensing data (perfectly-matching sensing data), and determine a coordinated function associated with the perfectly-matching sensing data. In simultaneous sensing, sensing data or re-sensing data representing both the multifunction machine 30 and the PC 50 is used. In sequential sensing, sensing data or re-sending data individually representing each of the devices 12 is used. The mode of sensing used at the time of registration and the mode of sensing used at the time of re-sensing performed after the registration may be the same or different. For example, if re-sensing data representing the multifunction machine 30 and the PC 50 that have been re-sensed, and sensing data representing the multifunction machine α and the PC β registered in the function management information perfectly match, the notification controller 28 identifies the re-sensed multifunction machine 30 as the multifunction machine α, and identifies the re-sensed PC 50 as the PC β. Further, the notification controller 28 identifies, in the function management information, the function B associated with the sensing data representing the multifunction machine α and the PC β, as a coordinated function that can be executed by using the multifunction machine 30 and the PC 50.

The notification controller 28 may search the function management information to retrieve sensing data that partially matches re-sensing data (sensing data that matches re-sensing data by a proportion greater than or equal to a predetermined value) (partially-matching sensing data), and determine a coordinated function associated with the partially-matching sensing data. In this process, if re-sensing data representing the multifunction machine 30 and the PC 50 that have been re-sensed, and sensing data representing the multifunction machine α and the PC 50 registered in the function management information partially match, the notification controller 28 identifies the re-sensed multifunction machine 30 as the multifunction machine α, and identifies the re-sensed PC 50 as the PC β. Further, the notification controller 28 identifies, in the function management information, the function B associated with the sensing data representing the multifunction machine α and the PC β, as a coordinated function that can be executed by using the multifunction machine 30 and the PC 50.

The notification controller 28 may extract the respective characteristic features of the multifunction machine 30 and PC 50 from re-sensing data, search the function management information to retrieve sensing data having characteristic features identical or similar to the extracted characteristic features, and determine a coordinated function associated with the retrieved sensing data. In this process, if characteristic features extracted from re-sensing data representing the multifunction machine 30 and the PC 50 that have been re-sensed, and characteristic features extracted from sensing data representing the multifunction machine α and the PC β registered in function management information are identical or similar, the notification controller 28 identifies the re-sensed multifunction machine 30 as the multifunction machine α, and identifies the re-sensed PC 50 as the PC β. Further, the notification controller 28 identifies, in the function management information, the function B associated with the sensing data representing the multifunction machine α and the PC β, as a coordinated function that can be executed by using the multifunction machine 30 and the PC 50.

In the above-mentioned example, the notification controller 28 compares sensing data generated at the time of registration with re-sensing data, determines an associated coordinated function in accordance with the comparison result, and gives notification of the coordinated function. In another example, the notification controller 28 may identify multiple devices represented by sensing data generated at the time of registration, identify multiple devices represented by re-sensing data, and if the multiple devices represented by the sensing data generated at the time of registration, and the multiple devices represented by the re-sensing data match, the notification controller 28 may give notification of a coordinated function associated with the sensing data generated at the time of registration. That is, the notification controller 28 searches the function management information to retrieve multiple devices represented by re-sensing data, and gives notification of a coordinated function associated with the multiple devices. For example, the notification controller 28 refers to the above-mentioned database to identify such multiple devices.

Figure 15:
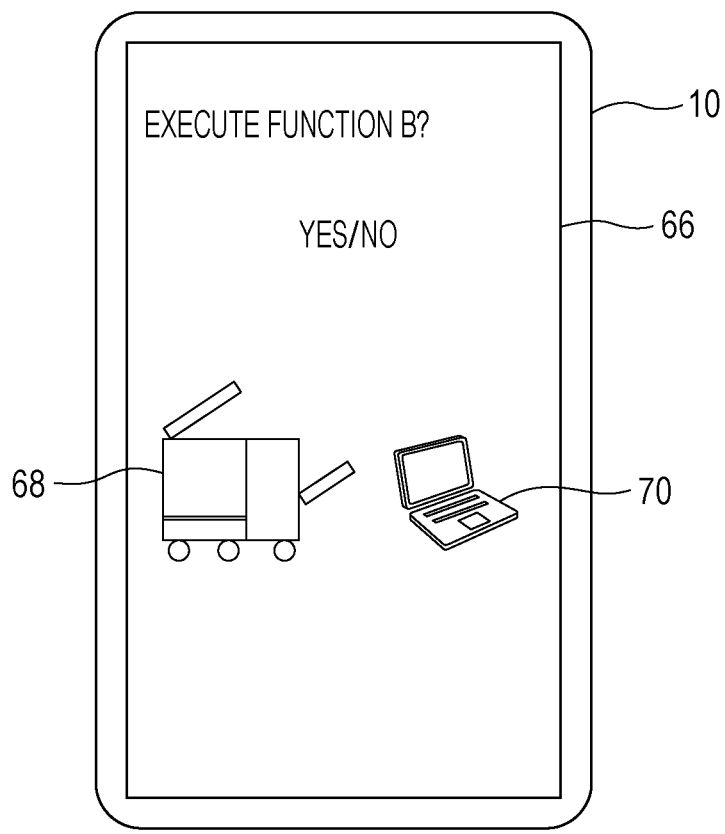
FIG. 15 illustrates a screen.

For example, the notification controller 28 displays, on the display of the UI unit 18, information indicative of the function B (scan function) mentioned above. FIG. 15 illustrates an example of information displayed at this time. For example, a screen 66 is displayed on the display of the UI unit 18, and the notification controller 28 displays, on the screen 66, information indicative of the function B (scan-transfer function) that is associated with a combination of sensing data representing the multifunction machine 30 (multifunction machine α) and sensing data representing the PC 50 (PC β). Further, the notification controller 28 may display, on the screen 66, an image 68 (e.g., an image based on sensing data) representing the multifunction machine 30 and an image 70 (e.g., an image based on sensing data) representing the PC 50.

When the user gives, on the screen 66, an instruction to execute the function B (scan-transfer function) (e.g., by pressing a "Yes" button), the controller 24 causes the multifunction machine 30 and the PC 50 to execute the function B (scan-transfer function). For example, by using the device address information of each of the multifunction machine 30 and the PC 50, the controller 24 transmits, to each of the multifunction machine 30 and the PC 50, a control signal indicative of an instruction to execute a scan-transfer. The control signal may be transmitted to each of the multifunction machine 30 and the PC 50 directly from the terminal apparatus 10, or may be transmitted to each of the multifunction machine 30 and the PC 50 via the relay apparatus 14. The device address information of each of the multifunction machine 30 and the PC 50 may be stored in the terminal apparatus 10 in advance, or may be acquired from the database as a result of the above-mentioned identification process.

Function Management Table

Hereinafter, exemplary function management information will be described with reference to FIG. 16. FIG. 16 illustrates an exemplary function management table serving as function management information. In one example, the function management table includes the following pieces of information in association with each other: an ID, information indicative of the name of a device, sensing data, and information describing a function. An ID represents information used for management of registered information. Examples of sensing data include image data (still image data or moving image data) generated by image capture using a camera, and measurement data generated by sensing using a three-dimensional sensor. Data representing asperities or irregularities that may not be fully expressed by an image may be registered as measurement data. Using such data increases the accuracy of recognition of each individual entity (e.g., the device 12), for example.

For example, an ID "1" is associated with an independent function (function name: A). The independent function is a function that performs a print by use of the multifunction machine α (print function). As sensing data representing an entity used as a trigger, sensing data representing the multifunction machine α is registered. That is, the multifunction machine α is registered as a component used to execute the independent function A, and sensing data representing the multifunction machine α is registered as sensing data representing an entity used as a trigger for notification or execution of the independent function A. When the multifunction machine α is re-sensed by the sensing unit 20 and the multifunction machine α is identified, notification is given of a print function representing the independent function A.

The mode of sensing used at the time of registration of the multifunction machine α, and the mode of re-sensing may be the same or different. In one possible configuration, at the time of registration, the multifunction machine α is captured by a camera and the resulting image data is registered as sensing data, and at the time of re-sensing, the multifunction machine α is sensed by a three-dimensional sensor and the resulting measurement data is generated. In this case as well, at the time of registration, the registration unit 26 identifies the multifunction machine α based on the image data, and at the time of re-sensing, the notification controller 28 identifies the multifunction machine α based on the measurement data. If the two identification results match, the notification controller 28 gives notification of the independent function A registered in association with the multifunction machine α. In another possible configuration, by using the function management table, the notification controller 28 extracts characteristic features from measurement data generated at the time of re-sensing, searches for sensing data (image data or measurement data) having characteristic features identical or similar to the extracted characteristic features, determines a function associated with the sensing data, and gives notification of the determined function. For example, if characteristic features extracted from measurement data generated at the time of re-sensing, and characteristic features extracted from image data generating at the time of registration are identical or similar, the notification controller 28 gives notification of a function associated with the image data. The same applies for cases where a three-dimensional sensor is used at the time of registration and a camera is used at the time of re-sensing.

An ID "2" is associated with a coordinated function (function name: B). The coordinated function is a scan-transfer function executed by using the multifunction machine α and the PC β. As sensing data representing an entity used as a trigger, sensing data representing each of the multifunction machine α and the PC β is registered. That is, the multifunction machine α and the PC β are each registered as a component used to execute the coordinated function B, and sensing data representing each of the multifunction machine α and the PC β is registered as sensing data representing an entity used as a trigger for notification or execution of the coordinated function B. When the multifunction machine α and the PC β are re-sensed by the sensing unit 20 and the multifunction machine α and the PC β are identified, notification is given of a scan-transfer function as the coordinated function B.

Although FIG. 16 depicts an example in which each piece of sensing data is associated with a single function (independent function or coordinated function), each piece of sensing data may be associated with multiple functions. For example, a print function, a copy function, and a scan function may be associated as independent functions with sensing data representing the multifunction machine α. In response to re-sensing of the multifunction machine α, the notification controller 28 gives notification of the print function, the copy function, and the scan function. For example, the notification controller 28 displays a list of independent functions on the display of the UI unit 18. Sensing data representing the multifunction machine α and the PC β may be associated with multiple coordinated functions. In this case as well, in response to re-sensing of the multifunction machine α and the PC β, the notification controller 28 gives notification of the multiple coordinated functions.

If multiple devices 12 are sensed at the time of registration, sensing data generated as a result of the sensing may be associated with a coordinated function, may be associated with independent functions possessed by individual devices 12, or may be associated with both coordinated and independent functions. If independent functions are associated with the sensing data, when the multiple devices 12 are re-sensed, notification is given of an independent function possessed by each of the devices 12. If both coordinated and independent functions are associated with the sensing data, when the multiple devices 12 are re-sensed, notification is given of both the coordinated and independent functions. In another possible configuration, when the user gives an instruction to notify the user of a coordinated function, the user is notified of a coordinated function, and when the user gives an instruction to notify the user of an independent function, the user is notified of an independent function.

Although FIG. 16 depicts an example in which an independent function possessed by the multifunction machine α is specified by the user and registered into the function management table in association with the multifunction machine α serving as a trigger, an independent function not possessed by the multifunction machine α may be specified by the user and registered into the function management table in association with the multifunction machine α serving as a trigger. For example, at the time of registration, the multifunction machine α is sensed, and sensing data representing the multifunction machine α is registered into the function management table as sensing data representing a trigger. If a function not possessed by the multifunction machine α (e.g., a cleaning function) is specified by the user as an independent function to be associated with the multifunction machine α, the registration unit 26 registers function information about a cleaning function into the function management table in association with the sensing data representing the multifunction machine α. The cleaning function is a function executed by a device other than the multifunction machine α (e.g., an automatic cleaner AA). In this case, the registration unit 26 registers device identification information of the automatic cleaner AA (information including, for example, address information of the automatic cleaner AA) into the function management table. In registering the function, the user may enter device identification information of the automatic cleaner AA into the terminal apparatus 10, or the registration unit 26 may refer to the database or other information to acquire the device identification information. As a result of the above-mentioned registration process, the multifunction machine α is registered into the function management table as a trigger, and the cleaning function executed by using the automatic cleaner AA is registered into the function management table as an independent function associated with the multifunction machine α. When, after the registration process, the multifunction machine α is re-sensed by the sensing unit 20, the notification controller 28 determines, in the function management table, the cleaning function associated with the sensing data representing the multifunction machine α, and gives notification of the cleaning function. When the user gives an instruction to execute cleaning, the controller 24 transmits control information indicative of the instruction to execute cleaning to the automatic cleaner AA. The automatic cleaner AA executes cleaning in accordance with the control information.

As described above, the device 12 serving as a trigger (the device 12 that has been sensed) may be associated with an independent function possessed by the device 12, or may be associated with an independent function not possessed by the device 12. The same applies for coordinated functions. For example, a coordinated function that is not executable by using the multifunction machine α and the PC β may be registered in association with a combination of the multifunction machine α and the PC β. In this case, when the multifunction machine α and the PC β are re-sensed by the sensing unit 20, notification is given of the coordinated function associated with the combination of the multifunction machine α and the PC β.

Sensing data representing a single device 12 may be associated with a coordinated function that uses the device 12 or with a coordinated function that does not use the device 12.

As described above, according to the first exemplary embodiment, by sensing the device 12 and specifying a function to be registered, the function may be associated with the device 12. In this way, setting of a function for the device 12 may be easily executed.

Modifications of the first exemplary embodiment will be described below.

Modification 1

Modification 1 will be described. Modification 1 represents a modification according to the first exemplary embodiment. According to Modification 1, the registration unit 26 associates, with an entity to be registered, a function not possessed by the entity. For example, the registration unit 26 associates, with an object other than the device 12, a function possessed by the device 12. Hereinafter, Modification 1 will be described in detail with reference to FIGS. 17 and 18.

Figure 17:
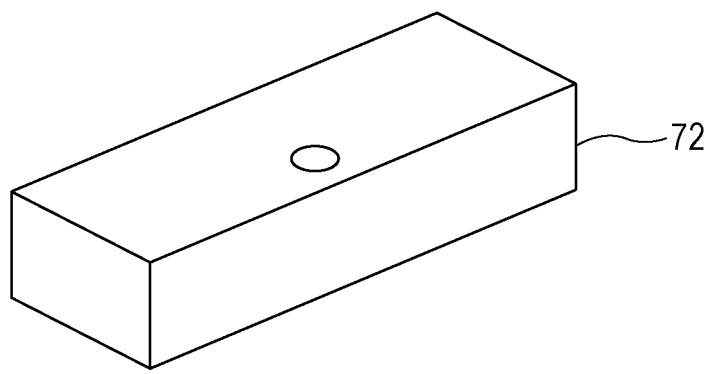
FIG. 17 illustrates a pen case.

FIG. 17 illustrates a pen case 72 serving as an entity. When the pen case 72 is sensed by the sensing unit 20, sensing data representing the pen case 72 is generated. The registration unit 26 registers the sensing data into the function management table. The pen case 72 is thus registered into the function management table as an entity serving as a trigger.

Figure 18:
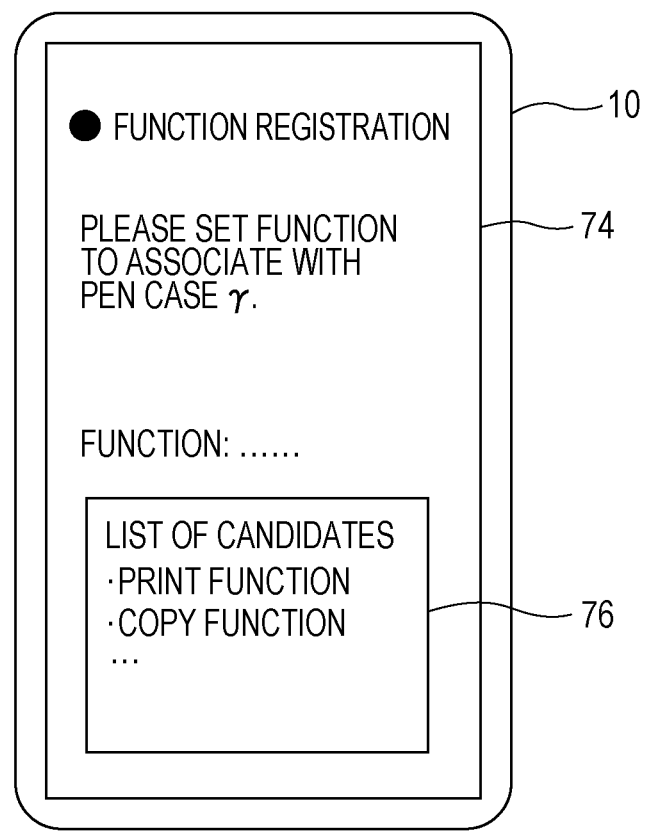
FIG. 18 illustrates a screen.

FIG. 18 illustrates a screen 74 used to register a function. The pen case 72 is associated by the user with a name "γ". As with the first exemplary embodiment mentioned above, function information about a function (independent function or coordinated function) associated with the pen case γ is entered by the user on the screen 74. The registration unit 26 may display a list 76 of functions on the screen 74. Each function in the list 76 is a function not possessed by the pen case γ. For example, function information about each of multiple function candidates is stored in the memory 22 in advance, and the registration unit 26 displays the list 76 on the screen 74 based on each piece of function information stored in the memory 22. Of course, function information about each function candidate may be stored in another apparatus (e.g., each device 12, the relay apparatus 14, or a server), and the registration unit 26 may acquire the function information from the other apparatus.

The registration unit 26 registers a function specified by the user into the function management table in association with sensing data representing the pen case γ. In registering the function, the user may enter device identification information of the device 12 used for the function into the terminal apparatus 10, or the registration unit 26 may refer to the database or other information to acquire device identification information of the device 12 used for the function. The registration unit 26 registers the device identification information into the function management table in association with the sensing data representing the pen case γ. For example, if a print function possessed by a multifunction machine α is specified by the user as a function to be registered, the registration unit 26 registers function information about the print function, and device identification information of the multifunction machine α into the function management table in association with the sensing data representing the pen case γ.

When the pen case γ is re-sensed by the sensing unit 20 and identified, the notification controller 28 gives notification of the print function associated with the pen case γ. When the user gives an instruction to execute the print function, the controller 24 transmits control information indicative of the instruction to execute printing to the multifunction machine α. The multifunction machine α executes printing in accordance with the control information.

As described above, by sensing an entity not having a function, and specifying a function to be registered, the entity may be associated with the function.

Modification 2

Modification 2 will be described. Modification 2 represents a modification according to the first exemplary embodiment. According to Modification 2, the registration unit 26 associates, with an entity to be registered, a function that is not possessed by the entity and is related to the entity. For example, the registration unit 26 associates, with an object other than the device 12, a function possessed by the device 12. Hereinafter, Modification 2 will be described in detail with reference to FIG. 19.

In one example, a cat as an entity is sensed by the sensing unit 20, and sensing data representing the cat is generated. The registration unit 26 registers the sensing data into the function management table. The cat is thus registered into the function management table as an entity serving as a trigger.

Figure 19:
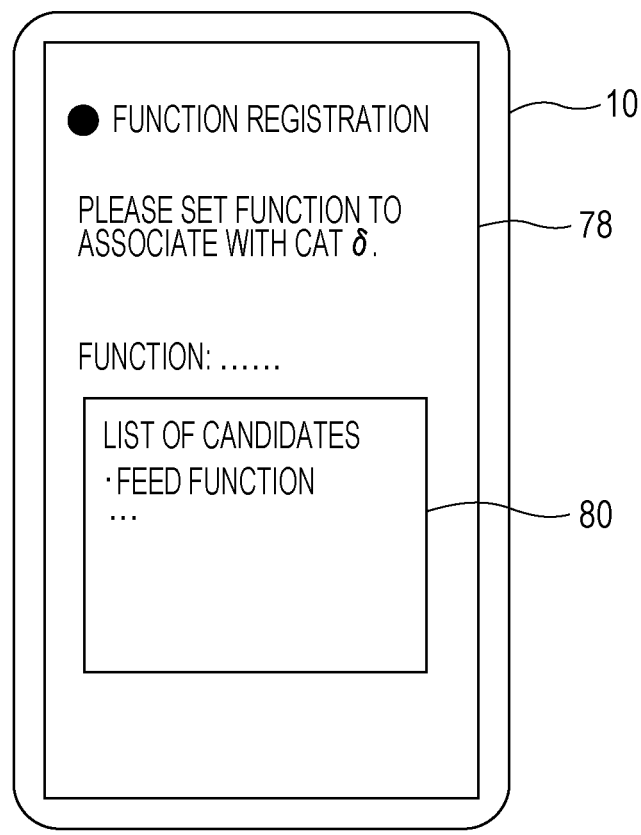
FIG. 19 illustrates a screen.

FIG. 19 illustrates a screen 78 used to register a function. The cat that has been sensed is associated by the user with a name "δ". As with the first exemplary embodiment mentioned above, function information about a function (independent function or coordinated function) associated with the cat δ is entered by the user on the screen 78. The registration unit 26 also displays a list 80 of functions on the screen 78. Each function in the list 80 is a function (related function) related to the cat δ. A related function is, for example, a function executed for an entity to be registered (e.g., the cat δ). For example, the registration unit 26 refers to the above-mentioned database to identify an entity that has been sensed. In the present case, the sensed entity is identified to be a cat. Function information about a related function for each entity is stored in the memory 22 in advance, and the registration unit 26 displays the list 80 on the screen 78 based on the function information stored in the memory 22. Of course, function information about a related function may be stored in another apparatus (e.g., each device 12, the relay apparatus 14, or a server), and the registration unit 26 may acquire the function information from the other apparatus.

The registration unit 26 registers a function specified by the user into the function management table in association with sensing data representing the cat δ. In registering the function, the user may enter device identification information of the device 12 used for the function into the terminal apparatus 10, or the registration unit 26 may refer to the database or other information to acquire device identification information of the device 12 used for the function. The registration unit 26 registers the device identification information into the function management table in association with the sensing data representing the cat δ. For example, if a feed function is specified by the user as an independent function related to the cat δ, the registration unit 26 registers function information about the feed function, and device identification information of the device 12 that executes the feed function, into the function management table in association with the sensing data representing the cat δ.

When the cat δ is re-sensed by the sensing unit 20 and identified, the notification controller 28 gives notification of the feed function associated with the cat δ. When the user gives an instruction to execute the feed function, the controller 24 transmits control information indicative of the instruction to execute the feed function to the device 12 that executes the feed function. The device 12 executes the feed function in accordance with the control information.

As described above, by sensing an entity and specifying a function related to the entity, the entity may be associated with the related function.

Modification 3

Modification 3 will be described. Modification 3 represents a modification according to the first exemplary embodiment. According to Modification 3, a portion of an entity is registered, and a function is registered in association with the portion. In response to re-sensing of the portion, notification is given of the function associated with the portion.

Figure 20:
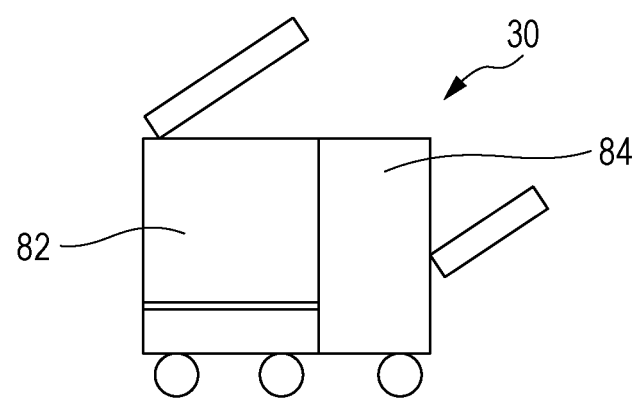
FIG. 20 illustrates a device.

Hereinafter, a description will be given about a portion of an entity with reference to FIG. 20. FIG. 20 illustrates the multifunction machine 30 serving as the device 12. For example, the multifunction machine 30 includes a body portion 82 and a post-processing portion 84. For example, when the body portion 82 of the multifunction machine 30 is sensed by the sensing unit 20, sensing data representing the body portion 82 is generated. The registration unit 26 registers the sensing data into the function management table. The body portion 82 is thus registered into the function management table as an entity serving as a trigger.

Figure 21:
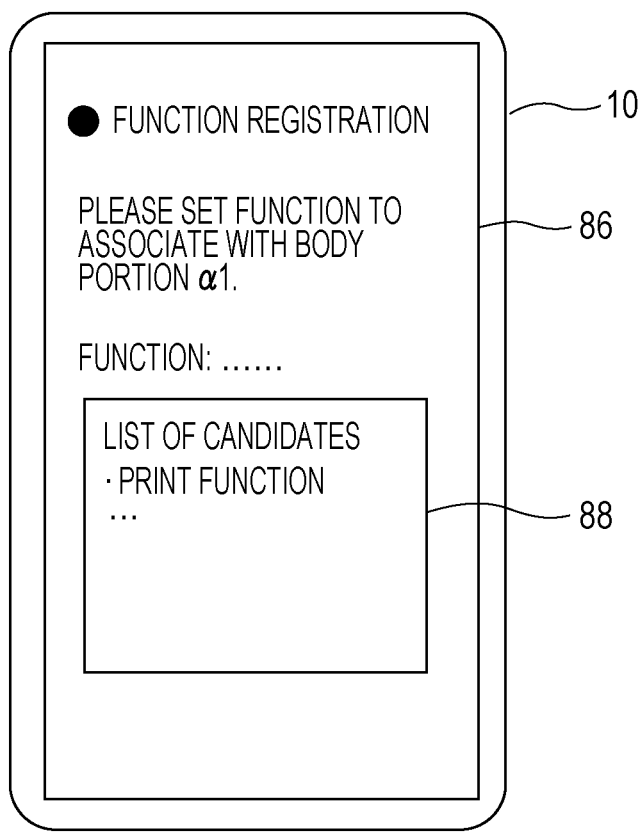
FIG. 21 illustrates a screen.

FIG. 21 illustrates a screen 86 used to register a function. The body portion 82 is associated by the user with a name "α1". As with the first exemplary embodiment mentioned above, function information about a function (independent function or coordinated function) associated with the body portion α1 is entered by the user on the screen 86. The registration unit 26 may also display a list 88 of functions on the screen 74. Each function in the list 88 is a function possessed by the body portion 82 (a function assigned to the body portion 82).

For example, a function is assigned to each of the body portion 82 and the post-processing portion 84 of the multifunction machine 30. Information indicative of this assignment is registered into the above-mentioned database in advance. In one example, a print function, a copy function, and a scan function are assigned to the body portion 82, and a post-processing function such as a stapling function is assigned to the post-processing portion 84. Information indicative of the assignment of these functions is registered into the above-mentioned database in advance. As with the first exemplary embodiment mentioned above, the registration unit 26 searches the above-mentioned database to determine sensing data representing the body portion 82 to thereby identify the multifunction machine 30 and also identify the body portion 82. Further, the registration unit 26 determines functions assigned to the body portion 82. The registration unit 26 displays the determined functions on the screen 86 in the form of the list 88.

The registration unit 26 registers a function specified by the user into the function management table in association with sensing data representing the body portion α1. In registering the function, the user may enter device identification information of the multifunction machine 30 into the terminal apparatus 10, or the registration unit 26 may refer to the database or other information to acquire device identification information of the multifunction machine 30. The registration unit 26 registers the device identification information into the function management table in association with the sensing data representing the body portion α1. For example, if a print function possessed by the body portion α1 is specified by the user as a function to be registered, the registration unit 26 registers function information about the print function, and device identification information of the multifunction machine 30 into the function management table in association with the sensing data representing the body portion α1.

When the body portion α1 is re-sensed by the sensing unit 20 and identified, the notification controller 28 gives notification of the print function associated with the body portion α1. When the user gives an instruction to execute the print function, the controller 24 transmits control information indicative of the instruction to execute printing to the multifunction machine 30. The multifunction machine 30 executes printing in accordance with the control information.

In this way, a function may be associated also with a portion of an entity (e.g., a portion of the device 12).

According to Modification 3, a different function may be associated with each portion of the same entity. Consequently, notification may be given of a function that differs between when a given portion of an entity is sensed and when another portion is sensed. For example, a print function is associated with the body portion 82 of the multifunction machine 30 and a post-processing function is associated with the post-processing portion 84, so that notification is given of the print function in response to re-sensing of the body portion 82, and notification is given of the post-processing function in response to re-sensing of the post-processing portion 84.

According to Modification 3, the entirety of an entity, and a portion of the entity may be associated with different functions. For example, it is possible to associate the entirety of the multifunction machine 30 with all functions possessed by the multifunction machine 30, associate the body portion 82 with only a copy function, and associate the post-processing portion 84 with only a post-processing function. Consequently, for the same multifunction machine 30, which function the user is notified of may be changed by changing what is to be re-sensed.

Even if the entirety of an entity is sensed at the time of registration, the registration unit 26 may, in accordance with an instruction from the user, register one portion of the entity or individually register multiple portions of the entity, and associate a function with each portion. For example, if the entirety of the multifunction machine 30 is sensed at the time of registration, the registration unit 26 may, in accordance with an instruction from the user, associate a copy function with the body portion 82 of the multifunction machine 30, and associate a post-processing function with the post-processing portion 84.

Even if the entirety of an entity (e.g., the multifunction machine 30) is re-sensed, the notification controller 28 may identify a portion of the entity (e.g., the body portion 82 of the multifunction machine 30), and if a function is associated with the portion (e.g., the body portion 82), the notification controller 28 may give notification of the function. If a function is associated with the entire entity (e.g., the multifunction machine 30), the notification controller 28 may give notification of the function associated with the entire entity, and also give notification of a function associated with a portion of the entity. Of course, it is also possible to employ a configuration such that, if the entirety of an entity is re-sensed, even if a function is associated with a portion of the entity, the notification controller 28 gives notification of a function associated with the entire entity, and does not give notification of the function associated with the portion of the entity.

The registration unit 26 may associate, with a portion of an entity to be registered, a function not possessed by the portion. For example, it is assumed that, in the same manner as described above, the body portion 82 of the multifunction machine 30 is sensed, and the body portion 82 is thus registered into the function management table as an entity.

Figure 22:
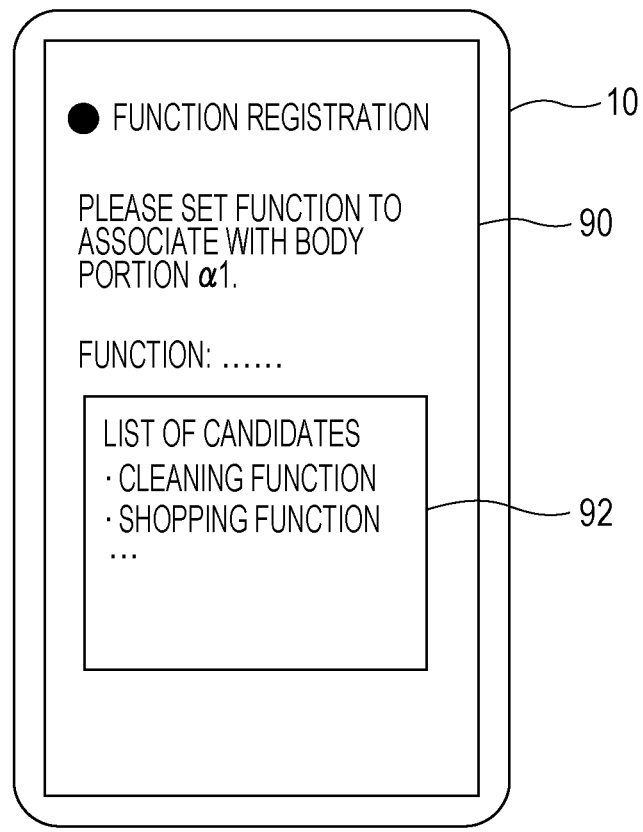
FIG. 22 illustrates a screen.

FIG. 22 illustrates a screen 90 used to register a function. The registration unit 26 displays a list 92 of functions on the screen 90. Each function in the list 92 is a function not possessed by the body portion α1. For example, function information about each of multiple function candidates is stored in the memory 22 in advance, and the registration unit 26 displays the list 92 on the screen 90 based on each piece of function information stored in the memory 22. Of course, function information about each function candidate may be stored in another apparatus (e.g., each device 12, the relay apparatus 14, or a server), and the registration unit 26 may acquire the function information from the other apparatus.

The registration unit 26 registers a function specified by the user into the function management table in association with sensing data representing the body portion α1. In registering the function, the user may enter device identification information of the device 12 used for the function into the terminal apparatus 10, or the registration unit 26 may refer to the database or other information to acquire device identification information of the device 12 used for the function. The registration unit 26 registers the device identification information into the function management table in association with the sensing data representing the body portion α1. For example, if a cleaning function possessed by an automatic cleaner AA is specified by the user as a function to be registered, the registration unit 26 registers function information about the cleaning function, and device identification information of the automatic cleaner AA into the function management table in association with the sensing data representing the body portion α1.

When the body portion α1 is re-sensed by the sensing unit 20 and identified, the notification controller 28 gives notification of the cleaning function associated with the body portion α1. When the user gives an instruction to execute the cleaning function, the controller 24 transmits control information indicative of the instruction to execute the cleaning function to the automatic cleaner AA. The automatic cleaner AA executes the cleaning function in accordance with the control information.

As described above, a portion of an entity may be associated with a function not possessed by the portion.

A portion of an entity may be associated with a single function, or may be associated with multiple functions. A portion of an entity may be associated with an independent function possessed by the portion, may be associated with an independent function not possessed by the portion, may be associated with a coordinated function that can be executed by using the portion, or may be associated with a coordinated function that can be executed without using the portion.

FIG. 23 illustrates an exemplary function management table according to Modification 3. Like the above-mentioned function management table according to the first exemplary embodiment, this function management table includes the following pieces of information in association with each other: an ID, information indicative of the name of a device, sensing data, and information describing a function. According to Modification 3, as a device name, the name of a portion of a device is registered into the function management table.

For example, an ID "3" is associated with an independent function (function name: C). The independent function is a function that performs a print (print function) by use of the body portion α1 of the multifunction machine α. As sensing data representing a portion of an entity that serves as a trigger, sensing data representing the body portion α1 of the multifunction machine α is registered. That is, the body portion α1 of the multifunction machine α is registered as a component used to execute the independent function C, and sensing data representing the body portion α1 of the multifunction machine α is registered as sensing data representing a portion of an entity that is used as a trigger for notification or execution of the independent function C. When the body portion α1 of the multifunction machine α is re-sensed by the sensing unit 20 and the body portion α1 is identified, notification is given of the print function representing the independent function C. In another example, notification may be given of the independent function C when the multifunction machine α is identified.

An ID "4" is associated with a coordinated function (function name: D). The coordinated function is a print function executed by using the body portion α1 of the multifunction machine α and a display β1 of a PC β. This print function is a function that transmits image data or document data displayed on the display β1 of the PC β to the multifunction machine α, and prints the image data or document data by use of the body portion α1. As sensing data representing a portion of an entity that serves as a trigger, sensing data representing each of the body portion αl of the multifunction machine α and the display β1 of the PC β is registered. That is, the body portion α1 of the multifunction machine α and the display β1 of the PC β are each registered as a component used to execute the coordinated function D, and sensing data representing each of the body portion α1 of the multifunction machine α and the display β1 of the PC β is registered as sensing data representing an entity used as a trigger for notification or execution of the coordinated function D. When the body portion α1 of the multifunction machine α and the display β1 of the PC β are re-sensed by the sensing unit 20, and the body portion α1 of the multifunction machine α and the display β1 of the PC β are thus identified, notification is given of the print function as the coordinated function D.

An ID "5" is associated with multiple coordinated functions (function name: E). For example, a print function and a scan-transfer function are registered as the coordinated functions. The print function is a function executed by using the body portion α1 of the multifunction machine α and the PC β. Specifically, the print function is a function that transmits image data or document data stored in the PC β to the multifunction machine α, and prints the image data or document data by use of the body portion α1. The scan-transfer function is a function that performs a scan by use of the body portion α1 of the multifunction machine α, and transfers data generated by the scan to the PC β. As sensing data representing an entity used as a trigger, sensing data representing each of the body portion αl of the multifunction machine α and the entire PC β is registered. That is, the body portion α1 of the multifunction machine α and the PC β are each registered as a component used to execute the coordinated function E, and sensing data representing each of the body portion α1 of the multifunction machine α and the entire PC β is registered as sensing data representing an entity used as a trigger for notification or execution of the coordinated function E. When the body portion α1 of the multifunction machine α and the entire PC β are re-sensed by the sensing unit 20, and the body portion α1 of the multifunction machine α and the PC β are identified, notification is given of each of the print function and the scan-transfer function as the coordinated function E.

Modification 4

Modification 4 will be described. Modification 4 represents a modification according to the first exemplary embodiment. According to Modification 4, the registration unit 26 associates a function with a direction with respect to an entity to be registered. For example, the registration unit 26 associates a function with the direction or angle of sensing with respect to an entity. The registration unit 26 may associate either the same function or a different function for each direction. Hereinafter, Modification 4 will be described in detail with reference to FIGS. 24 and 25.

Figures 24, 25:
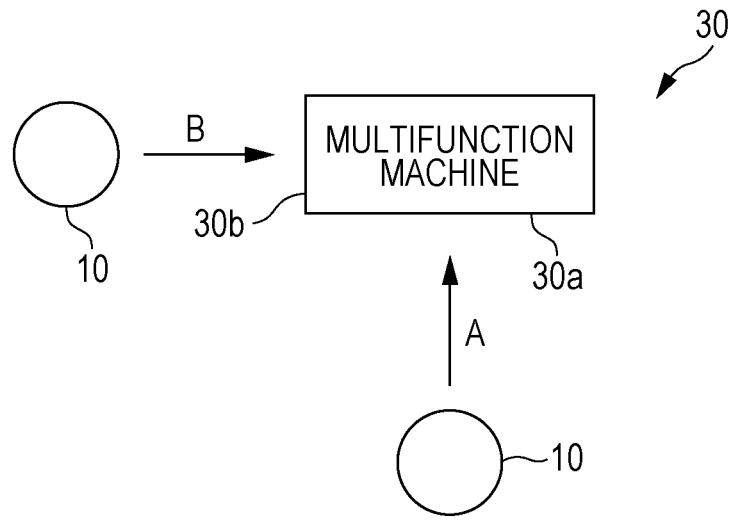
FIG. 24 illustrates the positional relationship between a terminal apparatus and devices.
FIG. 25 illustrates a function management table according to Modification 4.

FIG. 24 illustrates the positional relationship between the device 12 serving as an entity, and each of the terminal apparatuses 10. FIG. 24 depicts the multifunction machine 30 as an example of the device 12.

For example, if sensing is performed on the multifunction machine 30 in a direction indicated by an arrow A, a front face 30a of the multifunction machine 30 is sensed, and sensing data representing the front face 30a is generated. The registration unit 26 registers the sensing data into the function management table, and registers a function specified by the user into the function management table in association with the sensing data.

If sensing is performed on the multifunction machine 30 in a direction indicated by an arrow B, a left side face 30b of the multifunction machine 30 is sensed, and sensing data representing the left side face 30b is generated. The registration unit 26 registers the sensing data into the function management table, and registers a function specified by the user into the function management table in association with the sensing data.

FIG. 25 illustrates an exemplary function management table according to Modification 4. The function management table includes the following pieces of information in association with each other: an ID, information indicative of the name of a device, sensing data, information indicative of a positional relationship, and information describing a function. The information indicative of a positional relationship is indicative of the positional relationship between an entity and the terminal apparatus 10. Examples of the positional information include information indicative of the orientation of the entity, information indicative of the direction of sensing performed on the entity, and positional information of each of the entity and the terminal apparatus 10 (e.g., positional information determined by a global positioning system (GPS)).

For example, an ID "6" is associated with an independent function (function name: F). The independent function is a function that performs a print (print function) by use of a multifunction machine α. As sensing data representing an entity used as a trigger, sensing data representing the front face 30a of the multifunction machine α is registered. As the positional relationship, a direction A of sensing is registered. For example, at the time of registration, the user may enter information indicative of the direction A or information indicative of the front face, or the registration unit 26 may, by use a GPS, determine the positional relationship between the multifunction machine α and the terminal apparatus 10, and register information indicative of the positional relationship into the function management table. That is, the multifunction machine α is registered as a component used to execute the independent function F, and sensing data representing the front face 30a of the multifunction machine α is registered as sensing data representing an entity used as a trigger for notification or execution of the independent function F. When the multifunction machine α is re-sensed by the sensing unit 20 from the direction A, and re-sensing data representing the front face 30a of the multifunction machine α is generated and the front face 30a is identified, notification is given of the independent function F.

An ID "7" is associated with an independent function (function name: G). The independent function is a function that performs a scan (scan function) by use of the multifunction machine α. As sensing data representing an entity used as a trigger, sensing data representing the left side face 30b of the multifunction machine α is registered. As the positional relationship, a direction B of sensing is registered. For example, at the time of registration, the user may enter information indicative of the direction B or information indicative of the left side face, or the registration unit 26 may, by use a GPS, determine the positional relationship between the multifunction machine α and the terminal apparatus 10, and register information indicative of the positional relationship into the function management table. That is, the multifunction machine α is registered as a component used to execute the independent function G, and sensing data representing the left side face 30b of the multifunction machine α is registered as sensing data representing an entity used as a trigger for notification or execution of the independent function G. When the multifunction machine α is re-sensed by the sensing unit 20 from the direction B, and re-sensing data representing the left side face 30b of the multifunction machine α is generated and the left side face 30b is identified, notification is given of the independent function G.

As described above, according to Modification 4, a function may be associated with each direction of sensing. Consequently, for example, a different function may be associated with each direction.

According to Modification 4, for example, sensing data generated by sensing an entity 360 degrees, and sensing data generated by sensing an entity 180 degrees may be each associated with a different function. This configuration may enable notification or execution of a function that differs between when an entity is re-sensed 360 degrees or when an entity is re-sensed 180 degrees.

Modification 5

Modification 5 will be described. Modification 5 represents a modification according to the first exemplary embodiment. According to Modification 5, the registration unit 26 associates, with an entity to be registered, a different function for each type of sensing. The registration unit 26 may associate, with an entity to be registered, a different function for each type of sensing or the same function for each type of sensing. That is, the registration unit 26 may change, in accordance with the type of sensing, what function is associated with an entity to be registered. If an entity is sensed by means of the same type of sensing as that used at the time of registration, the notification controller 28 gives notification of a function associated with the entity.

Hereinafter, Modification 5 will be described in detail with reference to FIG. 26. FIG. 26 illustrates an exemplary function management table according to Modification 5. The function management table includes the following pieces of information in association with each other: an ID, information indicative of the name of a device, sensing data, information indicative of the type of sensing, and information describing a function. Examples of sensing type include still image capture, moving image capture, and three-dimensional shape measurement.

For example, an ID "8" is associated with an independent function (function name: H). The independent function is a function that performs a print (print function) by use of a multifunction machine α. As sensing data representing an entity used as a trigger, moving image data representing the multifunction machine α is registered. That is, the multifunction machine α is registered as a component used to execute the independent function H, and moving image data representing the multifunction machine α is registered as sensing data representing an entity used as a trigger for notification or execution of the independent function H. When the multifunction machine α is re-sensed by the sensing unit 20, and moving image data representing the multifunction machine α is generated and the multifunction machine α is identified, the notification controller 28 gives notification of the independent function H. By contrast, even if the multifunction machine α is re-sensed and still image data or measurement data is generated as a result, the notification controller 28 does not give notification of the independent function H. In this case, the notification controller 28 gives notification of an independent function J described later.

An ID "9" is associated with an independent function (function name: J). The independent function is a function that performs a scan (scan function) by use of the multifunction machine α. As sensing data representing an entity used as a trigger, still image data representing the multifunction machine α is registered. That is, the multifunction machine α is registered as a component used to execute the independent function J, and still image data representing the multifunction machine α is registered as sensing data representing an entity used as a trigger for notification or execution of the independent function J. When the multifunction machine α is re-sensed by the sensing unit 20, and still image data representing the multifunction machine α is generated and the multifunction machine α is identified, the notification controller 28 gives notification of the independent function J. By contrast, even if the multifunction machine α is re-sensed and moving image data or measurement data is generated as a result, the notification controller 28 does not give notification of the independent function J.

In this case, the notification controller 28 gives notification of the independent function H.

According to Modification 5, the same entity may be associated with a different function for each type of sensing. Consequently, a different function may be used for each type of sensing.

As sensing data, measurement data generated by using a three-dimensional sensor or other measurement data may be used. A different coordinated function may be registered for each type of sensing. For cases where multiple entities are to be registered, a different function may be registered for each type of sensing in the same manner as described above.

Modification 6

Modification 6 will be described. Modification 6 represents a modification according to the first exemplary embodiment. According to Modification 6, the registration unit 26 associates, with multiple entities to be registered, a coordinated function according to the order of sensing the multiple entities. The notification controller 28 gives notification of a coordinated function associated with the multiple entities if the multiple entities are sensed in accordance with the order in which sensing is performed at the time of registration.

Hereinafter, Modification 6 will be described in detail with reference to FIG. 27. FIG. 27 illustrates an exemplary function management table according to Modification 6. The function management table includes the following pieces of information in association with each other: an ID, information indicative of the name of a device, sensing data, information indicative of the order of sensing individual entities, and information describing a function.

For example, an ID "10" is associated with a coordinated function (function name: K). The coordinated function is a function that performs a scan-transfer (scan-transfer function) by use of a multifunction machine α and a PC β. As sensing data representing an entity used as a trigger, sensing data representing the multifunction machine α and sensing data representing the PC β are each registered. That is, the multifunction machine α and the PC β are each registered as a component used to execute the coordinated function K, and sensing data representing the multifunction machine α and sensing data representing the PC β are each registered as sensing data representing an entity used as a trigger for notification or execution of the coordinated function K. At the time of registration, the multifunction machine α and the PC β are sensed in the order of the multifunction machine α followed by the PC β. Examples of the sensing data include still image data, moving image data, and measurement data. In one example, by sensing the multifunction machine α and the PC β individually in the order of the multifunction machine α followed by the PC β, sensing data representing the multifunction machine α and sensing data representing the PC β may be individually generated and registered. In another example, by successively capturing the multifunction machine α and the PC β with a camera in the order of the multifunction machine α followed by the PC β, moving image data representing the multifunction machine α and the PC β may be generated and registered. If the multifunction machine α and the PC β are re-sensed by the sensing unit 20 in this order, and the multifunction machine α and the PC β are identified, the notification controller 28 gives notification of the coordinated function K. By contrast, if the multifunction machine α and the PC β are re-sensed by the sensing unit 20 in the order of the PC β followed by the multifunction machine α, and the multifunction machine α and the PC β are identified, the notification controller 28 does not give notification of the coordinated function K. In this case, the notification controller 28 gives notification of a coordinated function L described later.

An ID "11" is associated with a coordinated function (function name: L). The coordinated function is a function that performs a print (print function) by use of the multifunction machine α and the PC β. As sensing data representing an entity used as a trigger, sensing data representing the multifunction machine α and sensing data representing the PC β are registered. That is, the multifunction machine α and the PC β are each registered as a component used to execute the coordinated function L, and sensing data representing the multifunction machine α and sensing data representing the PC β are each registered as sensing data representing an entity used as a trigger for notification or execution of the coordinated function L. At the time of registration, the multifunction machine α and the PC β are sensed in the order of the PC β followed by the multifunction machine α. In one example, by sensing the multifunction machine α and the PC β individually in the order of the PC β followed by the multifunction machine α, sensing data representing the multifunction machine α and sensing data representing the PC β may be individually generated and registered. In another example, by successively capturing the multifunction machine α and the PC β with a camera in the order of the PC β followed by the multifunction machine α, moving image data representing the multifunction machine α and the PC β may be generated and registered. If the PC β and the multifunction machine α are re-sensed by the sensing unit 20 in this order, and the multifunction machine α and the PC β are identified, the notification controller 28 gives notification of the coordinated function L. By contrast, if the multifunction machine α and the PC β are re-sensed by the sensing unit 20 in the order of the multifunction machine α followed by the PC β, and the multifunction machine α and the PC β are identified, the notification controller 28 does not give notification of the coordinated function L. In this case, the notification controller 28 gives notification of the coordinated function K.

According to Modification 6, a function to be registered may be changed in accordance with the order of sensing individual entities.

The notification controller 28 may provide notification of each function in such a way that the priority of notification of each function is changed in accordance with the order of re-sensing individual entities. For example, if the multifunction machine α and the PC β are re-sensed in this order, the notification controller 28 provides notification of the coordinated function K, which is associated with the ID "10", at a higher priority than the coordinated function L, which is associated with the ID "11". For example, the notification controller 28 displays, on the display of the UI unit 18, both information indicative of the coordinated function K and information indicative of the coordinated function L. At this time, the notification controller 28 displays the information indicative of the coordinated function K on the display at a higher priority than the information representing the coordinated function L. The notification controller 28 may display the information indicative of the coordinated function K at a position on the display higher than the information indicative of the coordinated function L. Alternatively, the notification controller 28 may display information indicative of each of these coordinated functions on the display while associating the information indicative of the coordinated function K with information indicative of a first rank and associating the information indicative of the coordinated function L with information indicative of a second rank.

Although FIG. 27 illustrates an example in which two entities are sensed and registered, for cases where three or more entities are sensed, the registration unit 26 registers a function that varies according to the order of sensing of these entities into the function management table in the same manner as described above.

Modification 7

Modification 7 will be described. Modification 7 represents a modification according to the first exemplary embodiment. According to Modification 7, if the condition of sensing performed at the time of registration, and the condition of sensing performed at the time of re-sensing have a correspondence relationship (e.g., if the two conditions match), the notification controller 28 gives notification of a function associated with sensing data generated by the sensing performed at the time of registration.

The condition of sensing is, for example, a condition determined by at least one of the followings: the direction of sensing performed on an entity, the number of times of sensing, the type of sensing, and the order of sensing.

For example, if, at the time of registration, an entity to be registered (e.g., the multifunction machine α) is sensed from its front face to the back face and, further, a function to be registered is specified, the registration unit 26 associates the function with sensing data representing an area of the multifunction machine α from the front face to the back face, and registers the sensing data and the function into the function management table. If the multifunction machine α is re-sensed from its front face to the back face, the notification controller 28 gives notification of the function associated with the sensing data representing an area of the multifunction machine α from the front face to the back face.

If, at the time of registration, an entity to be registered (e.g., the multifunction machine α) is sensed multiple times to generate multiple pieces of sensing data and, further, a function to be registered is specified, the registration unit 26 associates the function with the multiple pieces of sensing data, and registers the multiple pieces of sensing data and the function into the function management table. If the multifunction machine α is re-sensed a number of times equal to the number of times that sensing is performed at the time of registration, the registration unit 26 gives notification of the function associated with the multiple pieces of sensing data.

If an entity is re-sensed in accordance with the same mode of sensing as the mode of sensing used at the time of registration, the notification controller 28 gives notification of a function associated with sensing data generated at the time of registration. This process is identical to the above-mentioned process according to Modification 5.

If multiple entities are re-sensed in the same order as the order of sensing performed at the time of registration, the notification controller 28 gives notification of a function associated with the sensing data generated at the time of registration. This process is identical to the above-mentioned process according to Modification 6.

As the condition of sensing to be used, a combination of multiple conditions selected from among the direction of sensing, the number of times of sensing, the type of sensing, and the order of sensing may be used. In this case, notification of a function is provided if re-sensing is performed by using the same combination of sensing conditions as the combination of sensing conditions used at the time of registration. Therefore, the more complex the combination, the higher the security provided for notification of the function.

In one possible configuration, an entity to be registered (e.g., the multifunction machine α) is sensed multiple times from its front face to the back face, followed by sensing of the multifunction machine α multiple times from its back face to the front face in accordance with a mode of sensing different from that used at the time of the previous sensing, and then a function is registered in association with one or more pieces of sensing data generated as a result of these sensing operations. If, at the time of re-sensing, the entity is sensed by the same method of sensing as that used for the sensing at the time of registration, notification is given of the above-mentioned function.

The process according to Modification 7 may be applied to home security or other systems. For example, a function that unlocks the front door in response to sensing of multiple portions of a house (e.g., a specific portion of the door, a specific portion of the roof, and a specific portion of the exterior wall) may be registered. That is, the multiple portions are sensed in accordance with a specific sensing condition (e.g., a condition defined by a specific order of sensing, a specific number of times of sensing, or other factors), and sensing data generated as a result of the sensing, and the function that unlocks the door are registered into the function management table in association with each other. In another example, if the multiple portions are re-sensed in accordance with the above-mentioned specific sensing condition, the notification controller 28 gives notification of the unlock function. If the multiple portions are not re-sensed in accordance with the specific sensing condition, the notification controller 28 does not give notification of the unlock function. When the user instructs that the unlock function be executed, the door is unlocked. If the multiple portions are re-sensed in accordance with the specific sensing condition, the controller 24 may execute the unlock function to unlock the door. Applying the process according to Modification 7 to security as described above may provide enhanced security.

Modification 8

Modification 8 will be described. Modification 8 represents a modification according to the first exemplary embodiment. According to Modification 8, software or a target (such as a file) is used as a component used for a function. For example, an independent function or coordinated function may be executed by one or more pieces of software, or an independent function or coordinated function may be executed for a target such as a file or a piece of merchandise.

Hereinafter, Modification 8 will be described in detail with reference to FIG. 28. FIG. 28 illustrates a function management table according to Modification 8. The function management table includes the following pieces of information in association with each other: an ID, information indicative of the name of a registration target (entity), sensing data, and information describing a function. In Modification 8, the function is executed by software, or the function is applied to a target.

For example, an ID "12" is associated with an independent function (function name: M). The independent function is a function that activates document creation software. The document creation software is a piece of software used for operations such as display and creation of a document. As sensing data representing an entity used as a trigger, sensing data representing a PC ε is registered. That is, document creation software is registered as a component used to execute the independent function M, and sensing data representing the PC ε is registered as sensing data representing an entity used as a trigger for notification or execution of the independent function M. That is, in the present case, a component used to execute a function differs from an entity used as a trigger (component≠entity). The document creation software is installed in, for example, the terminal apparatus 10. Of course, the document creation software may be installed in another apparatus. At the time of registration, the PC ε is sensed and, further, activation of the document creation software is specified as an independent function to be registered. The registration unit 26 registers the sensing data representing the PC ε into the function management table in association with the independent function M. When the PC ε is re-sensed by the sensing unit 20 and the PC ε is identified, the notification controller 28 gives notification of the independent function M associated with the sensing data representing the PC ε. When the user gives an instruction to execute the independent function M, the controller 24 activates the document creation software.

An ID "13" is associated with a coordinated function (function name: N). The coordinated function is a function that sets a password for a document file, and can be executed by coordination of document creation software and password setting software. As sensing data representing an entity used as a trigger, sensing data representing each of the PC ε and a notebook ξ is registered. That is, the document creation software and the password setting software are each registered as a component used to execute the coordinated function N, and sensing data representing each of the PC ε and the notebook ξ is registered as sensing data representing an entity used as a trigger for notification or execution of the coordinated function N. That is, in the present case, a component used to execute a function differs from an entity used as a trigger (component≠entity). The document creation software and the password setting software are installed in, for example, the terminal apparatus 10. Of course, the document creation software and the password setting software may be installed in another apparatus. At the time of registration, the PC ε and the notebook ξ are sensed and, further, the coordinated function N, which is executed by using the document creation software and the password setting software, is specified as a function to be registered. The registration unit 26 associates the coordinated function N with the sensing data representing the PC ε and the notebook ξ and registers the resulting data into the function management table. When the PC ε and the notebook ξ are re-sensed by the sensing unit 20 and the PC ε and the notebook ξ are identified, the notification controller 28 gives notification of the coordinated function N associated with the sensing data representing the PC ε and the notebook ξ. When the user gives an instruction to execute the coordinated function N, the controller 24 sets, by use of the document creation software and the password setting software, a password for a document file specified by the user.

An ID "14" is associated with an independent function (function name: P). The independent function is a function that opens a document file η, and can be executed by using document creation software. As sensing data representing an entity used as a trigger, sensing data representing the notebook ξ is registered. That is, document creation software is registered as a component used to execute the independent function P, and sensing data representing the document file η is registered as a target to which the independent function P is applied. Further, as sensing data representing an entity used as a trigger for notification or execution of the independent function P, sensing data representing the notebook ξ is registered. That is, in the present case, a component used to execute a function differs from an entity used as a trigger (component≠entity). At the time of registration, the notebook ξ is sensed and, further, the independent function P, which is executed by using the document creation software, is specified as a function to be registered. Further, the document file η is specified as a target to which the independent function P is applied. The registration unit 26 associates, with the sensing data representing the notebook ξ the independent function P and the document file η, and registers the resulting data into the function management table. When the notebook ξ is re-sensed by the sensing unit 20 and the notebook ξ is identified, the notification controller 28 gives notification of the independent function P associated with the sensing data representing the notebook ξ. When the user gives an instruction to execute the independent function P, the controller 24 opens the document file η by use of the document creation software.

An ID "15" is associated with a coordinated function (function name: Q). The coordinated function is a function that adds the contents of the document file η into an accounting file θ, and can be executed by coordination of document creation software and accounting software. As sensing data representing an entity used as a trigger, sensing data representing each of the notebook ξ and a pen ι is registered. That is, the document creation software and the accounting software are each registered as a component used to execute the coordinated function Q, and sensing data representing each of the notebook ξ and the pen κ is registered as sensing data representing an entity used as a trigger for notification or execution of the coordinated function Q. That is, in the present case, a component used to execute a function differs from an entity used as a trigger (component≠entity). The document creation software and the accounting software are installed in, for example, the terminal apparatus 10. Of course, the document creation software and the accounting software may be installed in another apparatus. At the time of registration, the notebook ξ and the pen κ are sensed and, further, the coordinated function Q, which is executed by using the document creation software and the accounting software, is specified as a function to be registered. Further, the document file η and the accounting file θ are each specified as a target to which the coordinated function Q is applied. The registration unit 26 associates the sensing data representing the notebook ξ and the pen κ with the coordinated function Q, the document file η, and the accounting file θ, and registers the resulting data into the function management table. When the notebook ξ and the pen κ are re-sensed by the sensing unit 20 and the notebook ξ and the pen κ are identified, the notification controller 28 gives notification of the coordinated function Q associated with the sensing data representing the notebook ξ and the pen κ. When the user gives an instruction to execute the coordinated function Q, the controller 24 adds the contents of the document file η to the accounting file θ by use of the document creation software and the accounting software.

As described above, as a component other than the device 12, software or a file may be used for a function. A coordinated function that can be executed by a combination of multiple components selected from among components including the device 12, software, and a file may be registered into the function management table in association with sensing data. The process according to each of Modifications 1 to 7 mentioned above may be applied to Modification 8.

At least two of Modifications 1 to 8 mentioned above may be combined. For example, a function that varies according to the order of sensing multiple portions of the device 12 may be associated, a function that varies according to the type of sensing performed on a portion of the device 12 may be associated, or a coordinated function that can be executed by using a portion of the device 12 and software may be registered. Combinations other than those mentioned above may be executed.

A component (such as the device 12, software, or a target) or function (independent function or coordinated function) registered by performing sensing according to the first exemplary embodiment and its modifications mentioned above may be edited by the user. For example, when the user operates the UI unit 18 and gives an instruction to display an editing screen, the controller 24 displays the editing screen on the display. A previously registered component or function is edited by the user on the editing screen. For example, a list of previously registered components or functions may be displayed, and a component to be edited may be selected from the list of components or a function to be edited may be selected from the list of functions. For example, the user may change or add a description of a function, or may change or add a component used for a function.

The same sensing data may be used over and over again. For example, the registration unit 26 associates a function specified by the user with previously registered sensing data, and registers the function into the function management table. The sensing data may be already associated with another function, or may not be associated with another function. That is, the registration unit 26 may associate a new function with sensing data with which a function has been already associated, or may associate a function with sensing data with which no function is associated. This saves the trouble of sensing the same component again and again whenever each function is to be registered.

A function may be associated with sensing data already stored in the memory 22, or may be associated with sensing data acquired from an external apparatus.

Sensing data itself may be edited. For example, if sensing data is edited by the user, the registration unit 26 associates the edited sensing data with a function specified by the user, and registers the edited sensing data and the function into the function management table. For example, in response to the user performing an operation to cut away a portion of sensing data, the registration unit 26 associates a function specified by the user with the resulting partial sensing data (e.g., the remaining sensing data), and registers the partial sensing data and the function into the function management table. The registration unit 26 may register edited sensing data and its associated function into the function management table while keeping pre-edited sensing data and its associated function registered in the function management table. In another example, the registration unit 26 may delete pre-edited sensing data and its associated function from the function management table, and register edited sensing data and its associated function into the function management table. By way of a specific example, if sensing data representing the entirety of a multifunction machine is already registered, the sensing data may be edited to generate sensing data representing only the body portion of the multifunction machine. A new function is associated with the sensing data representing only the body portion of the multifunction machine, and the sensing data and the new function are registered into the function management table.

In one implementation of the first exemplary embodiment and its modifications mentioned above, the notification controller 28 may, if sensing fails in the middle of the sensing, display a message indicative of the failed sensing on the display, or output the message in audible form. In another implementation, the notification controller 28 may display, on the display, a message prompting the user to perform re-sensing, or may output the message in audible form. The same applies for a second exemplary embodiment and its modifications that will be described below.

Second Exemplary Embodiment

An information processing system according to a second exemplary embodiment will be described below. The information processing system according to the second exemplary embodiment is of the same configuration as the information processing system according to the first exemplary embodiment.

According to the second exemplary embodiment, in response to sensing of an operation target and an authentication object (authentication matter), the terminal apparatus 10 gives notification of information used for operating the operation target. Examples of an operation target include the device 12, software, and a file, which each serve as the component mentioned above. Examples of sensing include the above-mentioned image capture using a camera, and the above-mentioned measurement using a three-dimensional sensor. Examples of an authentication object (authentication matter) include a human or some other object, information such as an image or character string displayed on a screen, and information such as a geometrical figure or character string formed on an object. The sensing unit 20 corresponds to an example of an image capturing unit.

Figures 29, 30:
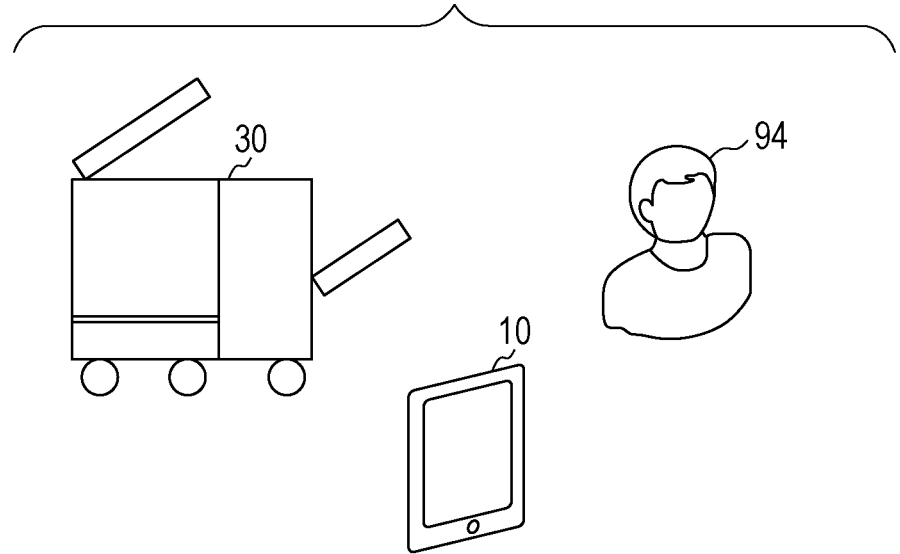
FIG. 29 illustrates a function management table according to a second exemplary embodiment.
FIG. 30 illustrates devices.

The second exemplary embodiment will be described in detail below. FIG. 29 illustrates an exemplary function management table according to the second exemplary embodiment. The function management table corresponds to an example of function management information. In one example, the function management table includes the following pieces of information in association with each other: an ID, information indicative of the name of a device, sensing data, authentication information, and information describing a function. The ID, the name of a device, and the description of a function are identical to those according to the first exemplary embodiment mentioned above. The authentication information is, for example, biometric information, an image, or a character. As the biometric information, information used for biometric authentication is used. Examples of biometric information include fingerprint information (e.g., an image representing a fingerprint) used for fingerprint authentication, retina information (e.g., an image representing a retina) used for retina authentication, face information (e.g., an image representing a face) used for face authentication, vein information (e.g., an image representing a vein) used for vein authentication, and gait information (e.g., an image representing gait behaviors) used for gait authentication. Of course, biometric information other than those mentioned above may be used. As an image, for example, data such as still image data, moving image data, or measurement data is used. An image representing a two-dimensional barcode or other information may be used as an image.

Sensing data, authentication information, and function information are registered into the function management table in advance. As with the first exemplary embodiment, these pieces of information may be registered by the registration unit 26. In this case, at the time of registration, authentication information is also registered into the function management table together with sensing data and function information. Authentication information may be registered through sensing of an authentication object (authentication matter), may be registered by entry of the authentication information by the user, or may be registered by being entered into the terminal apparatus 10 by other methods. The registration unit 26 registers, for example, authentication information generated by sensing, authentication information entered by the user, or authentication information entered by other methods into the function management table in association with sensing data and function information. If the above-mentioned information is to be registered not by the registration unit 26 but by another method, the registration unit 26 may not be provided in the terminal apparatus 10 according to the second exemplary embodiment. That is, in such a case, the function management table according to the second exemplary embodiment may be created in advance by another method, rather than being created by the registration unit 26.

Hereinafter, information registered in the function management table will be described in detail.

For example, as an operation target associated with an ID "16", a multifunction machine α representing the device 12 is registered. As sensing data, sensing data (e.g., still image data, moving image data, or measurement data) representing the multifunction machine α is registered. As authentication information, image data associated with a user X is registered. This authentication information is used for operating the multifunction machine α. Image data used as authentication information is, for example, still image data, moving image data, or measurement data that represents the face of the user X. That is, an authentication object is the face of the user X. Of course, the entire body of the user X or a part of the body (e.g. an arm, a hand, a finger, or a foot) of the user X may be used as an authentication object and image data representing such information may be used as authentication information, or biometric information such as fingerprint information of the user X may be used as authentication information. Further, function information about one or more independent functions possessed by the multifunction machine α is registered. In one example, independent functions such as a copy function, a scan function, and a print function possessed by the multifunction machine α are registered.

When the multifunction machine α is sensed and, further, the face of the user X is sensed, the notification controller 28 gives notification of information used for operating the multifunction machine α. For example, the notification controller 28 displays, on the display of the UI unit 18, information indicative of each independent function possessed by the multifunction machine α.

More specifically, sensing the multifunction machine α generates sensing data representing the multifunction machine α. Likewise, sensing the face of the user X generates sensing data representing the face of the user X. The notification controller 28 searches the function management table for a combination of sensing data representing the multifunction machine α and sensing data representing the face of the user X. Authentication succeeds if the combination is registered in the function management table. If authentication succeeds, the notification controller 28 displays, on the display of the UI unit 18, information (e.g., an operation screen) used for operating the multifunction machine α. For example, the notification controller 28 displays, on the display, information indicative of one or more independent functions associated with the combination. Authentication fails if the above-mentioned combination is not registered in the function management table. In this case, the notification controller 28 does not display, on the display, information used for operating the multifunction machine α. The notification controller 28 may display, on the display, information indicating failed authentication.

As an operation target associated with an ID "17", a PC β representing the device 12 is registered. As sensing data, sensing data (e.g., still image data, moving image data, or measurement data) representing the PC β is registered. As authentication information, image data associated with the user X is registered. This authentication information is used for operating the PC β. Image data used as authentication information is, for example, still image data, moving image data, or measurement data that represents the face of the user X. Further, function information about one or more independent functions possessed by the PC β is registered. In one example, independent functions such as a file open function, a file delete function, and an e-mail function possessed by the PC β are registered.

When the PC β is sensed and, further, the face of the user X is sensed, the notification controller 28 gives notification of information used for operating the PC β. For example, the notification controller 28 displays, on the display of the UI unit 18, information indicative of each independent function possessed by the PC β.

More specifically, sensing the PC β generates sensing data representing the PC β. Likewise, sensing the face of the user X generates sensing data representing the face of the user X. The notification controller 28 searches the function management table for a combination of sensing data representing the PC β and sensing data representing the face of the user X. Authentication succeeds if the combination is registered in the function management table. If authentication succeeds, the notification controller 28 displays, on the display of the UI unit 18, information (e.g., an operation screen) used for operating the PC β. For example, the notification controller 28 displays, on the display, information indicative of one or more independent functions associated with the combination. Authentication fails if the above-mentioned combination is not registered in the function management table. In this case, the notification controller 28 does not display, on the display, information used for operating the PC β. The notification controller 28 may display, on the display, information indicating failed authentication.

As operation targets associated with an ID "18", the multifunction machine α and the PC β, which each represent the device 12, are registered. As sensing data, sensing data (e.g., still image data, moving image data, or measurement data) representing the multifunction machine α and the PC β is registered. As authentication information, image data associated with the user X is registered. This authentication information is used for operating the multifunction machine α and the PC β. Image data used as authentication information is, for example, still image data, moving image data, or measurement data that represents the face of the user X. Further, function information about each coordinated function that can be executed by using the multifunction machine α and the PC β is registered. In one example, a scan-transfer function and a print function are registered. As with the first exemplary embodiment, sensing data representing both the multifunction machine α and the PC β may be generated and registered, or sensing data representing the multifunction machine α and sensing data representing the PC β may be individually generated and registered.

When the multifunction machine α and the PC β are sensed and, further, the face of the user X is sensed, the notification controller 28 gives notification of information used for operating the multifunction machine α and the PC β. For example, the notification controller 28 displays, on the display of the UI unit 18, information indicative of each coordinated function that can be executed by using the multifunction machine α and the PC β.

More specifically, sensing the multifunction machine α and the PC β generates sensing data representing the multifunction machine α and the PC β. As with the first exemplary embodiment mentioned above, the multifunction machine α and the PC β may be sensed simultaneously, or may be sensed sequentially. Likewise, sensing the face of the user X generates sensing data representing the face of the user X. The notification controller 28 searches the function management table for a combination of sensing data representing the multifunction machine α and the PC β and sensing data representing the face of the user X. Authentication succeeds if the combination is registered in the function management table. If authentication succeeds, the notification controller 28 displays, on the display of the UI unit 18, information (e.g., an operation screen) used for operating the multifunction machine α and the PC β. For example, the notification controller 28 displays, on the display, information indicative of one or more coordinated functions associated with the combination. Authentication fails if the above-mentioned combination is not registered in the function management table. In this case, the notification controller 28 does not display, on the display, information used for operating the multifunction machine α and the PC β. The notification controller 28 may display, on the display, information indicating failed authentication.

Hereinafter, processes performed by the terminal apparatus 10 according to the second exemplary embodiment will be described.

Sensing of Single Device 12

The following describes a process performed in response to sensing (e.g., image capture) of a single device 12. FIG. 30 illustrates the multifunction machine 30 and a user 94. In the present case, the multifunction machine 30 corresponds to an example of an operation target. The user 94 corresponds to an example of an authentication object.

For example, when the user operates the UI unit 18 and gives an instruction to perform sensing, the sensing unit 20 executes sensing. For example, the multifunction machine 30 is sensed by the sensing unit 20, and sensing data representing the multifunction machine 30 is generated as a result. Further, the face of the user 94 is sensed by the sensing unit 20, and sensing data representing the face of the user 94 is generated as a result. For example, if the multifunction machine 30 is captured by a camera, image data (still image data or moving image data) representing the multifunction machine 30 is generated as sensing data. If the multifunction machine 30 is sensed by a three-dimensional sensor, measurement data representing the shape of the multifunction machine 30 is generated as sensing data. Likewise, if the face of the user 94 is captured by a camera, image data representing the face of the user 94 is generated as authentication information. If the face of the user 94 is sensed by a three-dimensional sensor, measurement data representing the shape of the face of the user 94 is generated as authentication information.

Figure 31:
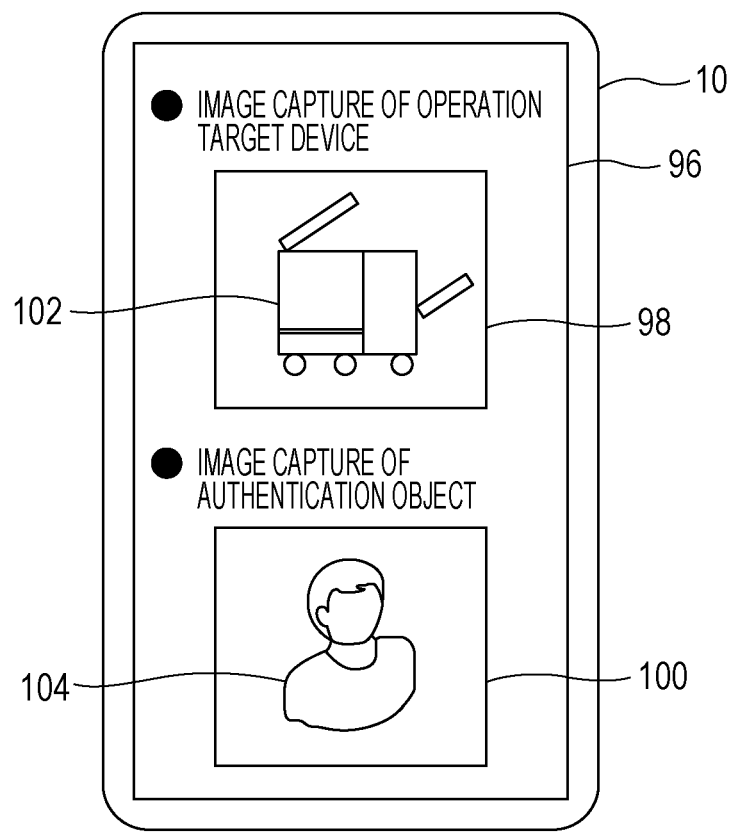
FIG. 31 illustrates a screen.

FIG. 31 illustrates a screen 96 displayed while sensing is performed and after sensing is completed. The screen 96 includes areas 98 and 100. In the area 98, an image representing the device 12 that is an operation target is displayed. In the area 100, authentication information is displayed. Each of the areas 98 and 100 may be bounded by, for example, a colored frame. In response to sensing of the multifunction machine 30 by the sensing unit 20, the controller 24 displays, within the area 98, an image 102 based on sensing data generated as a result of the sensing. The image 102 is an image (e.g., still image or moving image) representing the multifunction machine 30. In response to sensing of the face of the user 94 by the sensing unit 20, the controller 24 displays, within the area 100, an image 104 based on sensing data generated as a result of the sensing. The image 104 is an image (e.g., still image or moving image) representing the face of the user 94. Of course, measurement data representing the shape of the multifunction machine 30 or the shape of the face of the user 94 may be displayed. The multifunction machine 30 and the user 94 may be sensed simultaneously, or may be sensed sequentially.

If the terminal apparatus 10 is provided with multiple sensing units 20, the multifunction machine 30 may be sensed by one of the multiple sensing units 20, and the face of the user 94 may be sensed by another sensing unit 20. For example, if the terminal apparatus 10 is provided with a rear camera and a front camera each serving as the sensing unit 20, the multifunction machine 30 and the face of the user 94 may be captured by using the rear camera and the front camera. The rear camera is a camera located on the opposite side from the screen. The front camera is a camera located on the same side as the screen. It may be possible to set focusing such as zooming-in or zooming-out for each camera. Of course, the terminal apparatus 10 may be provided with multiple cameras, or a single camera may be used to capture the multifunction machine 30 and the face of the user 94. Focusing such as zooming-in or zooming-out may be performed for each individual area that is displaying an object subject to image capture. For example, focusing may be performed individually for each of the area 98 and the area 100. In another example, multiple areas (e.g., the areas 98 and 100) may be combined into a single combined area, and focusing may be performed for the single area. Focusing may be performed by a gesture action such as pinch-in, pinch-out, flick, or swipe.

The notification controller 28 searches the function management table for a combination of sensing data representing the multifunction machine 30 and sensing data representing the face of the user 94. If sensing data representing the multifunction machine 30 and sensing data representing the multifunction machine α perfectly or partially match, and if sensing data representing the face of the user 94 and sensing data representing the face of the user X perfectly or partially match, the notification controller 28 displays, on the display of the UI unit 18, a screen used for operating the multifunction machine 30 (multifunction machine α).

In another example, if characteristic features extracted from sensing data representing the multifunction machine 30, and characteristic features extracted from sensing data representing the multifunction machine α are identical or similar, and if characteristic features extracted from sensing data representing the face of the user 94 and characteristic features extracted from sensing data representing the face of the user X are identical or similar, the notification controller 28 may display, on the display of the UI unit 18, a screen used for operating the multifunction machine 30 (multifunction machine α).

In another example, the notification controller 28 may identify the multifunction machine 30 based on sensing data representing the multifunction machine 30, and identify the user 94 based on sensing data representing the face of the user 94. If the multifunction machine 30 is identified to be the multifunction machine α, and if the user 94 is identified to be the user X, the notification controller 28 displays, on the display of the UI unit 18, a screen used for operating the multifunction machine 30 (multifunction machine α). This identification process is performed by using the above-mentioned database.

Figure 32:
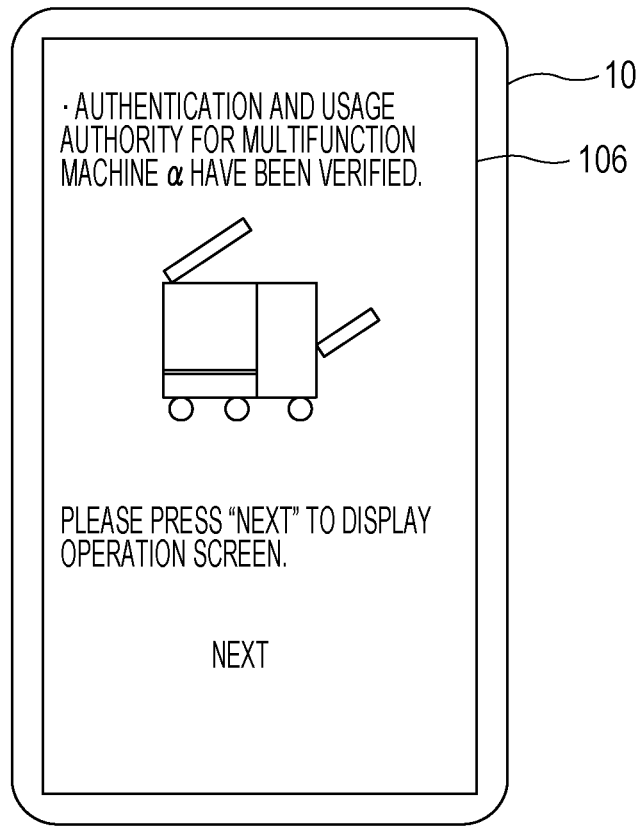
FIG. 32 illustrates a screen.

Authentication succeeds if a combination of sensing data representing the multifunction machine 30 and sensing data representing the face of the user 94 is registered in the function management table. In this case, as illustrated in FIG. 32, the notification controller 28 displays a screen 106 on the display of the UI unit 18, and displays, on the screen 106, a message indicating that authentication for the multifunction machine 30 (multifunction machine α) has succeeded. If authentication fails, the notification controller 28 displays, on the display, a message indicating failed authentication.

Figure 33:
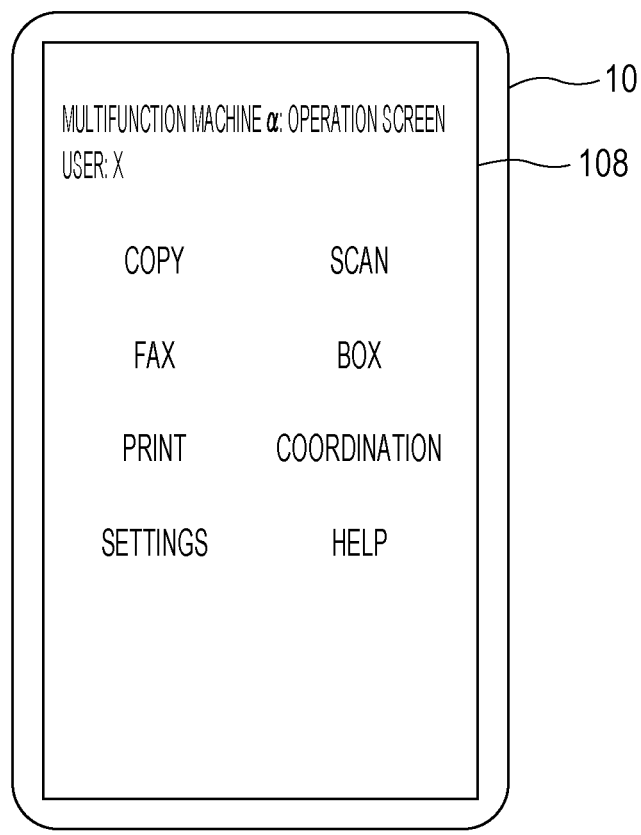
FIG. 33 illustrates a screen.

When the user gives, on the screen 106, an instruction to display an operation screen (e.g., by pressing a "Next" button), the notification controller 28 displays an operation screen for the multifunction machine 30 (multifunction machine α) on the display of the UI unit 18. FIG. 33 illustrates an operation screen 108 displayed at this time. The notification controller 28 displays, on the operation screen 108, information indicative of each independent function possessed by the multifunction machine 30 (multifunction machine α). The notification controller 28 may display, on the operation screen 108, information indicative of each coordinated function that can be executed by using the multifunction machine 30 (multifunction machine α). Other than the information mentioned above, the notification controller 28 may display, on the display, information such as a setting screen for the multifunction machine 30 (multifunction machine α).

If the above-mentioned authentication succeeds, the notification controller 28 may communicate with the multifunction machine 30 (multifunction machine α) to acquire information indicative of the operation screen 108 used for operating the multifunction machine 30, and display the operation screen 108 on the display. In this case, for example, information about a function not registered in the function management table may be displayed.

When the user specifies a function and gives an instruction to execute the function on the operation screen 108, the controller 24 transmits control information indicative of the instruction to execute the function to the multifunction machine 30. In accordance with the control information, the multifunction machine 30 executes the function specified by the user.

As described above, according to the second exemplary embodiment, in response to sensing of the device 12 as an operation target and of an authentication object, information (e.g., an operation screen) used for operating the device 12 is displayed. Through such a simple operation, authentication may be performed for an operation target, and also notification may be given of information used for operating the operation target.

Figure 34:
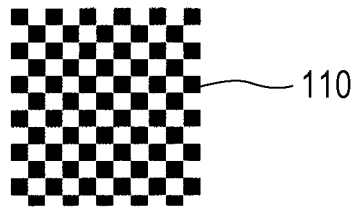
FIG. 34 illustrates an authentication object.
Figure 35:
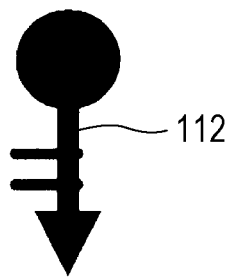
FIG. 35 illustrates an authentication object.

Although the above-mentioned example uses a human face as an authentication object, another object or information may be used as an authentication object. For example, as illustrated in FIG. 34, a two-dimensional code image 110 may be used as an authentication object. For example, the code image 110 may be displayed on a display, or may be formed on the surface of a physical object. The code image 110 is captured by the sensing unit 20 to perform an authentication process. In another example, as illustrated in FIG. 35, a physical object 112 may be used as an authentication object. Although the object 112 has the shape of a key in the example illustrated in FIG. 35, the shape of an authentication object is not limited to this shape. Any object may be registered as an authentication object. A character string may be registered as an authentication object.

An authentication process may be performed not by the terminal apparatus 10 but by an external apparatus (authentication apparatus) such as the relay apparatus 14 or a server. In this case, sensing data representing authentication information (image data or measurement data) and an operation target is transmitted from the terminal apparatus 10 to the external apparatus, and the external apparatus performs an authentication process for the operation target by use of the authentication information. For example, authentication information about each user permitted to use individual devices 12 is stored in the external apparatus in advance. If authentication information transmitted from the terminal apparatus 10 is stored in the external apparatus, authentication for the device 12 associated with the authentication information succeeds, and the user is thus permitted to use the device 12. If authentication succeeds as a result of the authentication process performed by the external apparatus, the notification controller 28 displays an operation screen on the display in response to the authentication result. For example, in response to sensing of both an operation target and an authentication object, sensing data representing the operation target and authentication information is transmitted from the terminal apparatus 10 to the authentication apparatus. An authentication process is not performed in the authentication apparatus unless both an operation target and an authentication object have been sensed. This configuration provides enhanced security.

An authentication process may be performed not by the terminal apparatus 10 but by the device 12 that is an operation target device. In this case, sensing data representing authentication information and an operation target is transmitted from the terminal apparatus 10 to the operation target device 12, and an authentication process for the operation target is performed by the operation target device 12 by using the authentication information. For example, the operation target device 12 is identified based on sensing data through the above-mentioned identification process, and authentication information is transmitted to the identified device 12 from the terminal apparatus 10. For example, authentication information about each user permitted to use the device 12 is stored in the device 12 in advance. If the authentication information transmitted from the terminal apparatus 10 is stored in the device 12, authentication for the device 12 succeeds, and the user is thus permitted to use the device 12. If the authentication process performed by the operation target device 12 results in successful authentication, the notification controller 28 displays an operation screen on the display in response to the authentication result. For example, in response to sensing of an operation target and an authentication object, sensing data representing the operation target, and authentication information are transmitted from the terminal apparatus 10 to the operation target device 12. An authentication process is not performed in the device 12 unless both an operation object and an authentication object have been sensed. This configuration provides enhanced security.

Sensing of Multiple Devices 12

Figure 36:
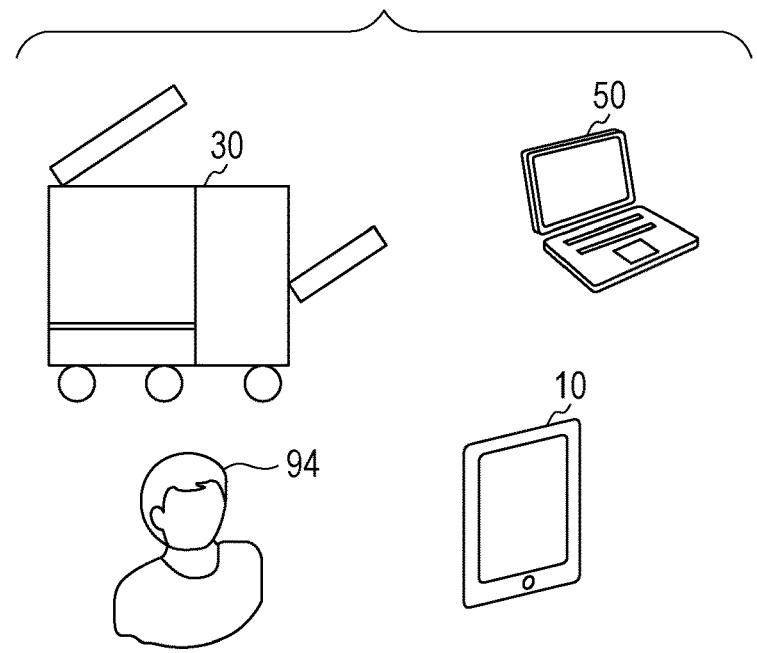
FIG. 36 illustrates devices.

The following describes a process performed in response to sensing (e.g., image capture) of multiple devices 12. FIG. 36 illustrates the multifunction machine 30, the PC 50, and the user 94. In the present case, the multifunction machine 30 and the PC 50 each correspond to an example of an operation target. The user 94 corresponds to an example of an authentication object.

For example, when the user operates the UI unit 18 and gives an instruction to perform sensing, the sensing unit 20 executes sensing. For example, the multifunction machine 30 and the PC 50 are sensed by the sensing unit 20, and sensing data representing the multifunction machine 30 and the PC 50 is generated as a result. As described above, the multifunction machine 30 and the PC 50 may be sensed simultaneously, or may be sensed sequentially. Further, the face of the user 94 is sensed by the sensing unit 20, and sensing data representing the face of the user 94 is generated as a result. For example, if the multifunction machine 30 and the PC 50 are captured by a camera, image data (still image data or moving image data) representing the multifunction machine 30 and the PC 50 is generated as sensing data. If the multifunction machine 30 and the PC 50 are sensed by a three-dimensional sensor, measurement data representing the shape of each of the multifunction machine 30 and the PC 50 is generated as sensing data. Likewise, if the face of the user 94 is captured by a camera, image data representing the face of the user 94 is generated as authentication information. If the face of the user 94 is sensed by a three-dimensional sensor, measurement data representing the shape of the face of the user 94 is generated as authentication information.

Figure 37:
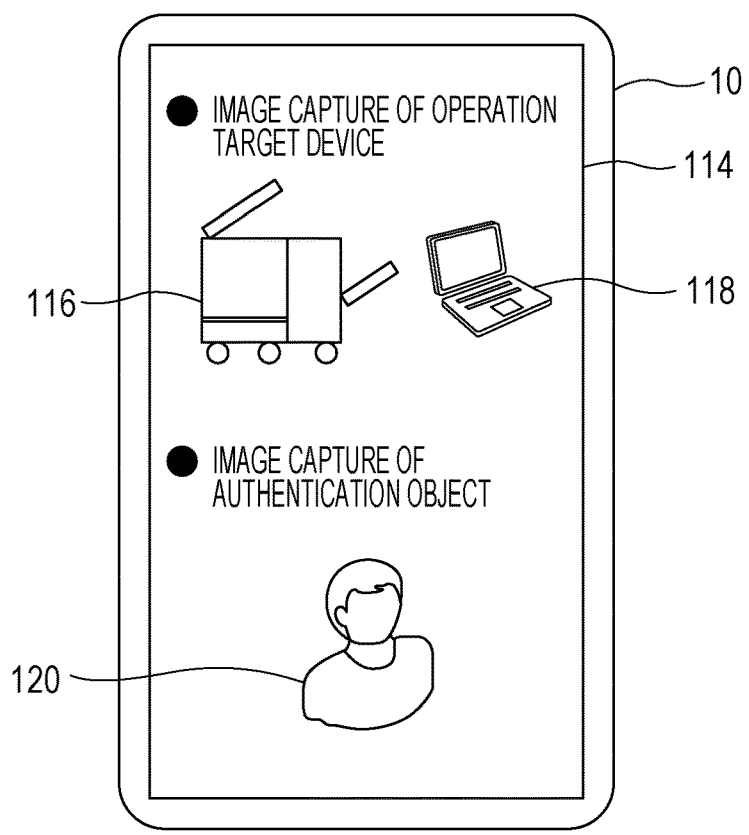
FIG. 37 illustrates a screen.

FIG. 37 illustrates a screen 114 displayed while sensing is performed and after sensing is completed. The screen 114 includes an area that displays an image representing the device 12 that is an operation target device, and an area that displays authentication information. As with the screen 96 illustrated in FIG. 31, each of these areas may be bounded by, for example, a colored frame. In response to sensing of the multifunction machine 30 and the PC 50 by the sensing unit 20, the controller 24 displays each of images 116 and 118, which are based on sensing data generated as a result of the sensing, within the corresponding area used to display an operation target. The image 116 is an image (e.g., still image or moving image) representing the multifunction machine 30. The image 118 is an image (e.g., still image or moving image) representing the PC 50. In response to sensing of the face of the user 94 by the sensing unit 20, the controller 24 displays, within the area used to display authentication information, an image 120 based on sensing data generated as a result of the sensing. The image 120 is an image (e.g., still image or moving image) representing the face of the user 94. Of course, measurement data representing the shape of the multifunction machine 30, the shape of the PC 50, and the shape of the face of the user 94 may be displayed. The multifunction machine 30, the PC 50, and the user 94 may be sensed simultaneously, or may be sensed sequentially.

The notification controller 28 searches the function management table for a combination of sensing data representing the multifunction machine 30 and the PC 50, and sensing data representing the face of the user 94. If sensing data representing the multifunction machine 30 and the PC 50 and sensing data representing the multifunction machine α and the PC β perfectly or partially match, and if sensing data representing the face of the user 94 and sensing data representing the face of the user X perfectly or partially match, the notification controller 28 displays, on the display of the UI unit 18, a screen used for operating the multifunction machine 30 (multifunction machine α) and the PC 50 (PC β).

In another example, if characteristic features extracted from sensing data representing the multifunction machine 30 and the PC 50, and characteristic features extracted from sensing data representing the multifunction machine α and the PC β are identical or similar, and if characteristic features extracted from sensing data representing the face of the user 94 and characteristic features extracted from sensing data representing the face of the user X are identical or similar, the notification controller 28 may display, on the display of the UI unit 18, a screen used for operating the multifunction machine 30 (multifunction machine α) and the PC 50 (PC β).

In another example, the notification controller 28 may identify the multifunction machine 30 based on sensing data representing the multifunction machine 30, identify the PC 50 based on sensing data representing the PC 50, and identify the user 94 based on sensing data representing the face of the user 94. If the multifunction machine 30 is identified to be the multifunction machine α and the PC 50 is identified to the PC β, and if the user 94 is identified to be the user X, the notification controller 28 displays, on the display of the UI unit 18, a screen used for operating the multifunction machine 30 (multifunction machine α) and the PC 50 (PC β). This identification process is performed by using the above-mentioned database.

Figure 38:
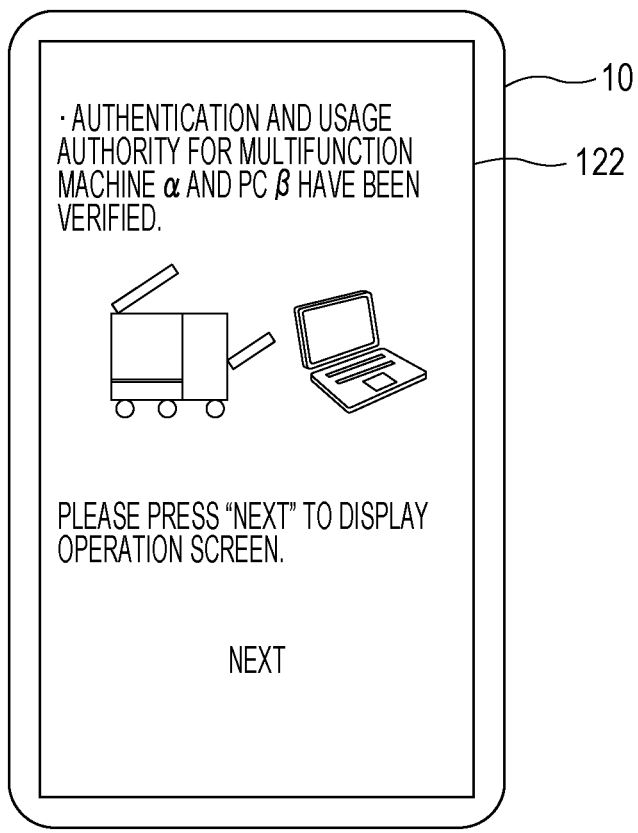
FIG. 38 illustrates a screen.

Authentication succeeds if a combination of sensing data representing the multifunction machine 30 and the PC 50, and sensing data representing the face of the user 94 is registered in the function management table. In this case, as illustrated in FIG. 38, the notification controller 28 displays a screen 122 on the display of the UI unit 18, and displays, on the screen 122, a message indicating that authentication has succeeded for the multifunction machine 30 (multifunction machine α) and the PC 50 (PC β). If authentication fails, the notification controller 28 displays, on the display, a message indicating failed authentication.

Figure 39:
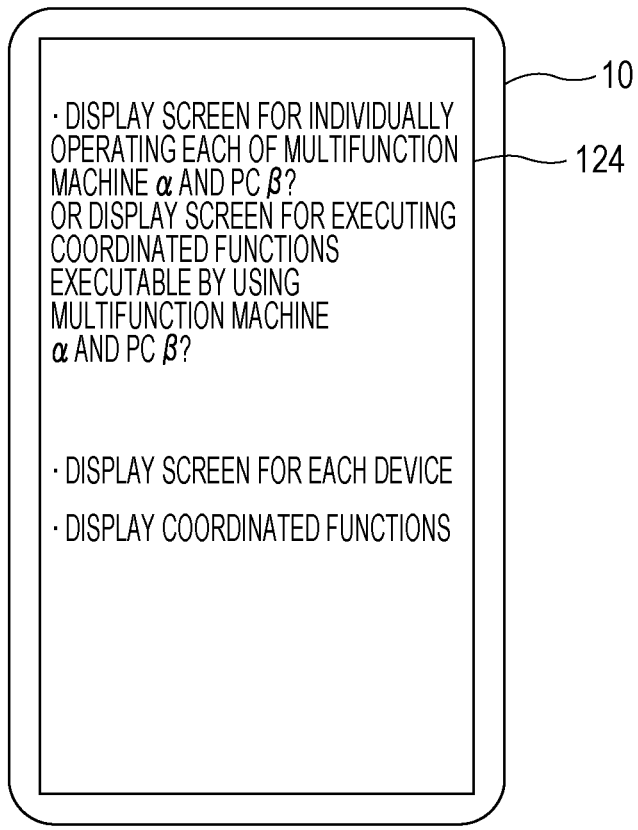
FIG. 39 illustrates a screen.

When the user gives, on the screen 122, an instruction to display an operation screen (e.g., by pressing a "Next" button), the notification controller 28 displays a selection screen 124 on the display of the UI unit 18 as illustrated in FIG. 39. The selection screen 124 is used for the user to select either independent use of each device 12, or use of a coordinated function. If the user selects independent use of each device 12, the notification controller 28 displays, on the display, a screen used for operating each of the multifunction machine 30 and the PC 50 individually. If the user selects use of a coordinated function, the notification controller 28 displays, on the display, a screen used for operating each coordinated function that can be executed by using the multifunction machine 30 and the PC 50.

Figure 40:
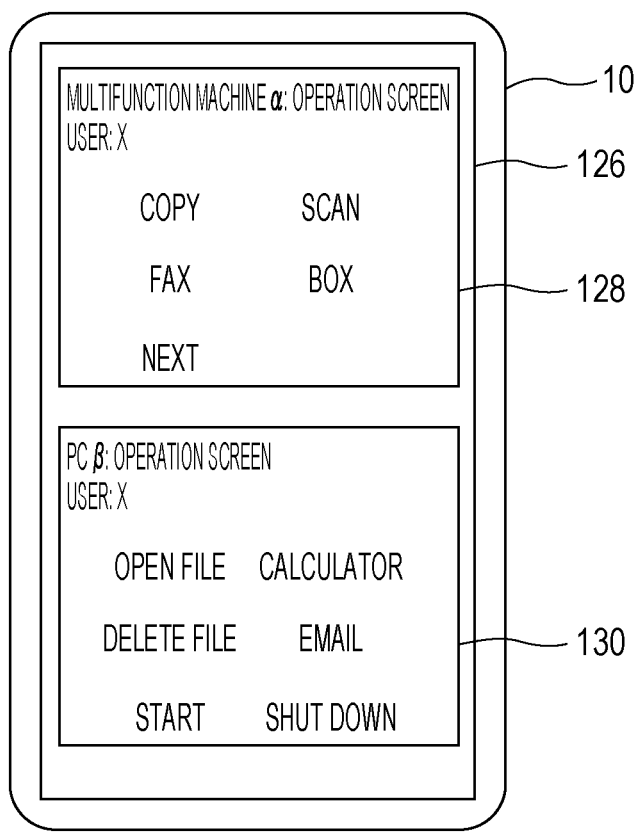
FIG. 40 illustrates a screen.

When the user selects, on the selection screen 124, independent use of each device 12 (e.g., by pressing a "Display Screen for Each Device" button), the notification controller 28 displays, on the display, a screen 126 for independent use of each device 12 as illustrated in FIG. 40. The screen 126 includes areas 128 and 130. The area 128 displays an operation screen for the multifunction machine 30. For example, the area 128 displays information such as independent functions possessed by the multifunction machine 30. The area 130 displays an operation screen for the PC 50. For example, the area 130 displays information such as independent functions possessed by the PC 50.

When the user selects a function and gives an execute instruction to execute the function on the operation screen used for operating the multifunction machine 30, information indicative of the execute instruction is transmitted from the terminal apparatus 10 to the multifunction machine 30. In accordance with the execute instruction, the multifunction machine 30 executes the function specified by the user. The same applies for the PC 50.

Figure 41:
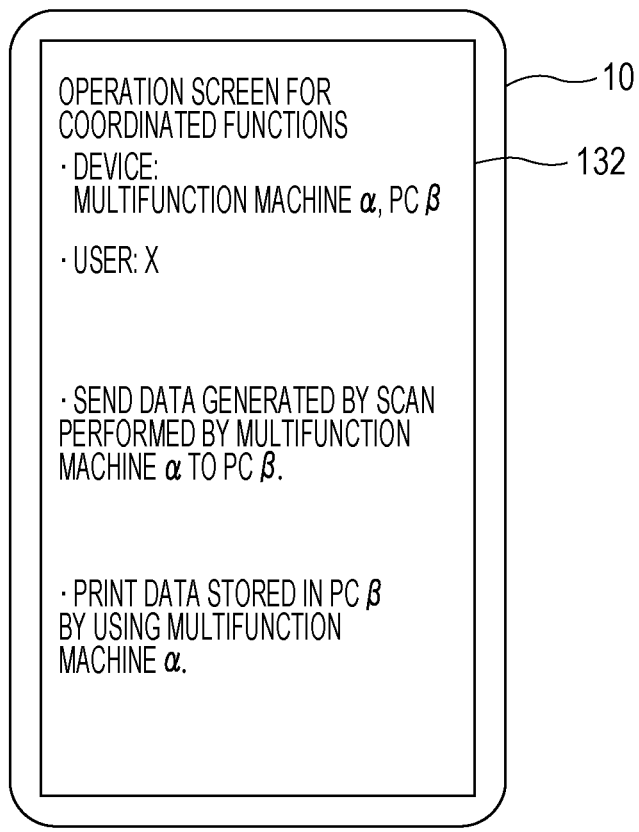
FIG. 41 illustrates a screen.

When the user selects, on the selection screen 124 illustrated in FIG. 39, use of a coordinated function (e.g., by pressing a "Display Coordinated Functions" button), the notification controller 28 displays, on the display, a screen 132 used for coordinated functions as illustrated in FIG. 41. The screen 132 displays information indicative of coordinated functions that can be executed by using the multifunction machine 30 (multifunction machine α) and the PC 50 (PC β). For example, information indicative of a scan-transfer function, and information indicative of a print function are displayed.

When the user selects a coordinated function and gives an execute instruction to execute the coordinated function on the screen 132, information indicative of the execute instruction is transmitted from the terminal apparatus 10 to the multifunction machine 30 and the PC 50. In accordance with the execute instruction, the multifunction machine 30 and the PC 50 execute the coordinated function specified by the user.

If an authentication process is to be executed by each of multiple devices 12 that are operation target devices (e.g., the multifunction machine 30 and the PC 50), the controller 24 may transmit authentication information (e.g., image data or measurement data) to each device 12 simultaneously. In the above-mentioned example, the controller 24 transmits authentication information to each of the multifunction machine 30 and the PC 50 simultaneously. Compared with sending authentication information over multiple transmissions, the above-mentioned configuration reduces the time and trouble (load) involved in the transmission process. Since an authentication process is performed in each of the multifunction machine 30 and the PC 50 by using the same authentication information, security may be enhanced. If authentication succeeds in both the multifunction machine 30 and the PC 50, the notification controller 28 displays the selection screen 124 on the display.

Even for cases where sensing data used for authentication includes information not used for the authentication or other information, authentication may succeed if the sensing data includes registered authentication information. This is described below by way of a specific example. For example, it is assumed that the user X is permitted to use the multifunction machine α. It is also assumed that the user X is sensed for the purpose of authentication and also another person Y is sensed, and thus both the user X and the person Y are represented in the sensing data obtained as a result of these sensing operations. In this case, the user X, who is permitted to use the multifunction machine α, is represented in the sensing data, and thus authentication for the multifunction machine α succeeds. Of course, in another configuration, authentication for the multifunction machine α may fail in this case for the reason that the unnecessary person Y other than the user X is also represented in the sensing data. The user may be able to set which one of the above-mentioned two processes is to be employed.

If authentication succeeds for only one of the two devices 12, that is, one of the multifunction machine 30 and the PC 50, the notification controller 28 may display, on the display, an operation screen used for operating the device 12 for which authentication has succeeded. In this case, an operation screen related to coordinated functions is not displayed.

As described above, in response to sensing of multiple devices 12 as operation targets and of an authentication object, information used for operating the multiple devices (e.g., a screen for operating each device 12 individually, or an operation screen for coordinated functions) is displayed. Through such a simple operation, authentication may be performed for an operation target, and also notification may be given of information used for operating the operation target.

Modification 9

Modification 9 will be described. Modification 9 is a modification according to the second exemplary embodiment. According to Modification 9, if the device 12 as an operation target, and an authentication object are sensed simultaneously, the notification controller 28 gives notification of information (e.g., an operation screen) used for operating the device 12. For example, if the device 12 and an authentication object are captured within the same frame by a camera serving as the sensing unit 20, and if authentication succeeds based on authentication information representing the authentication object, the notification controller 28 gives notification of information used for operating the device 12. If multiple devices 12 and an authentication object are captured within the same frame, and if authentication succeeds based on authentication information representing the authentication object, the notification controller 28 displays, on the display, a selection screen such as the selection screen illustrated in FIG. 39.

If the device 12 and an authentication object are sensed individually, the notification controller 28 does not give notification of information used for operating the device 12 even if authentication succeeds based on authentication information representing the authentication object. In this case, the authentication process itself may not be performed.

According to Modification 9, notification is given of information used for operating the device 12 only in response to sensing performed under the specific sensing condition that the device 12 and an authentication object be sensed simultaneously. Consequently, compared with cases where notification is given of information used for operating the device 12 irrespective of the sensing condition, enhanced security may be provided for the device 12.

Modification 10

Modification 10 will be described. Modification 10 is a modification according to the second exemplary embodiment. According to Modification 10, if the device 12 that is an operation target, and an authentication object are sensed by sequential sensing (a sequence of sensing operations), the notification controller 28 gives notification of information (e.g., an operation screen) used for operating the device 12. For example, if the device 12 and an authentication object are captured without interruptions by a camera serving as the sensing unit 20, and if authentication succeeds based on authentication information representing the authentication object, the notification controller 28 gives notification of information used for operating the device 12. This is explained below by way of a specific example. Even if the device 12 and an authentication object are not represented within the same frame, if the device 12 and the authentication object are represented within a single moving image, and if authentication succeeds based on authentication information representing the authentication object, the notification controller 28 gives notification of information used for operating the device 12. For cases where multiple still images are captured through successive image captures, if the device 12 and an authentication object are captured by a sequence of such successive image captures, and if authentication succeeds based on authentication information representing the authentication object, the notification controller 28 gives notification of information used for operating the device 12. If multiple devices 12 and an authentication object are sensed by sequential sensing, and if authentication succeeds based on authentication information representing the authentication object, the notification controller 28 displays, on the display, a selection screen such as the selection screen illustrated in FIG. 39. In another example, a three-dimensional sensor may be used as the sensing unit 20, and measurement data generated by the three-dimensional sensor may be used as sensing data.

If the device 12 and an authentication object are not sensed by sequential sensing, the notification controller 28 does not give notification of information used for operating the device 12 even if authentication succeeds based on authentication information representing the authentication object. In this case, the authentication process itself may not be performed.

According to Modification 10, notification is given of information used for operating the device 12 only in response to sensing performed under the specific sensing condition that the device 12 and an authentication object be sensed sequentially. Consequently, compared with cases where notification is given of information used for operating the device 12 irrespective of the sensing condition, enhanced security may be provided for the device 12.

Modification 11

Modification 11 will be described. Modification 11 is a modification according to the second exemplary embodiment. According to Modification 11, if the device 12 that is an operation target, and an authentication object are sensed by the same sensing unit 20, the notification controller 28 gives notification of information (e.g., an operation screen) used for operating the device 12.

For example, it is assumed that, as described above, the terminal apparatus 10 is provided with a rear camera and a front camera each serving as the sensing unit 20. If the device 12 and an authentication object are captured by the same camera (e.g., one of the rear camera and the front camera), and if authentication succeeds based on authentication information representing the authentication object, the notification controller 28 gives notification of information used for operating the device 12. If multiple devices 12 and an authentication object are captured by the same camera, and if authentication succeeds based on authentication information representing the authentication object, the notification controller 28 displays, on the display, a selection screen such as the selection screen illustrated in FIG. 39. A three-dimensional sensor may be used as the sensing unit 20.

If the device 12 and an authentication object are sensed by different sensing units 20, the notification controller 28 does not give notification of information used for operating the device 12 even if authentication succeeds based on authentication information representing the authentication object. In this case, the authentication process itself may not be performed.

According to Modification 11, notification is given of information used for operating the device 12 only in response to sensing performed under the specific sensing condition that the device 12 and an authentication object be sensed by the same sensing unit 20. Consequently, compared with cases where notification is given of information used for operating the device 12 irrespective of the sensing condition, enhanced security may be provided for the device 12.

Modification 12

Modification 12 will be described. Modification 12 is a modification according to the second exemplary embodiment. According to Modification 12, if the device 12 that is an operation target, and an authentication object are sensed by different sensing units 20, the notification controller 28 gives notification of information (e.g., an operation screen) used for operating the device 12.

For example, it is assumed that, as described above, the terminal apparatus 10 is provided with a rear camera and a front camera each serving as the sensing unit 20. For example, if the device 12 is captured by the rear camera and an authentication object is captured by the front camera, and if authentication succeeds based on authentication information representing the authentication object, the notification controller 28 gives notification of information used for operating the device 12. If multiple devices 12 and an authentication object are captured by different cameras, and if authentication succeeds based on authentication information representing the authentication object, the notification controller 28 displays, on the display, a selection screen such as the selection screen illustrated in FIG. 39. Multiple three-dimensional sensors may be each used as the sensing unit 20.

If the device 12 and an authentication object are sensed by the same sensing unit 20, the notification controller 28 does not give notification of information used for operating the device 12 even if authentication succeeds based on authentication information representing the authentication object. In this case, the authentication process itself may not be performed.

According to Modification 12, notification is given of information used for operating the device 12 only in response to sensing performed under the specific sensing condition that the device 12 and an authentication object be sensed by different sensing units 20. Consequently, compared with cases where notification is given of information used for operating the device 12 irrespective of the sensing condition, enhanced security may be provided for the device 12.

Different types of sensing units 20, such as a camera and a three-dimensional sensor, may be used in combination.

Modification 13

Modification 13 will be described. Modification 13 is a modification according to the second exemplary embodiment. According to Modification 13, in response to sensing of a portion of the device 12 that is an operation target, and of an authentication object, the notification controller 28 gives notification of information used for operating the portion of the device 12. A portion of the device 12 in this case is identical in concept to a portion of the device 12 according to the first exemplary embodiment (see FIG. 20).

FIG. 42 illustrates an exemplary function management table according to Modification 13. In one example, the function management table includes the following pieces of information in association with each other: an ID, information indicative of the name of a device, sensing data, authentication information, and information describing a function. According to Modification 13, as a device name, the name of a portion of a device is registered into the function management table.

Hereinafter, information registered in the function management table will be described in detail.

For example, as an operation target associated with an ID "19", a body portion $\alpha 1$ of a multifunction machine $\alpha$ is registered. As sensing data, sensing data representing the body portion $\alpha 1$ of the multifunction machine $\alpha$ is registered. As authentication information, image data representing the face of a user X is registered. This authentication information is used for operating the body portion $\alpha 1$ of the multifunction machine $\alpha$. Further, function information about a print function possessed by the body portion $\alpha 1$ of the multifunction machine α (a function that can be executed by using the body portion α1) is registered.

When the body portion α1 of the multifunction machine α is sensed and, further, the face of the user X is sensed, the notification controller 28 gives notification of information used for operating the body portion α1. For example, the notification controller 28 displays, on the display of the UI unit 18, information indicative of a print function possessed by the body portion α1 (a function that can be executed by using the body portion α1).

More specifically, sensing the body portion α1 of the multifunction machine α generates sensing data representing the body portion α1 of the multifunction machine α. Likewise, sensing the face of the user X generates sensing data representing the face of the user X. The notification controller 28 searches the function management table for a combination of sensing data representing the body portion α1 of the multifunction machine α and sensing data representing the face of the user X. Authentication succeeds if the combination is registered in the function management table. If authentication succeeds, the notification controller 28 displays, on the display of the UI unit 18, information (e.g., an operation screen) used for operating the body portion α1 of the multifunction machine α. For example, the notification controller 28 displays, on the display, information indicative of a print function associated with the combination. Authentication fails if the above-mentioned combination is not registered in the function management table. In this case, the notification controller 28 does not display, on the display, information used for operating the body portion α1 of the multifunction machine α. The notification controller 28 may display, on the display, information indicating failed authentication.

An authentication process may be performed by the multifunction machine α. In this case, sensing data representing the face of the user X is transmitted from the terminal apparatus 10 to the multifunction machine α. Authentication for the multifunction machine α succeeds if the user X is registered in the multifunction machine α as a user permitted to use the body portion α1. In response to the authentication result from the multifunction machine α, the notification controller 28 gives notification of information used for operating the body portion α1.

As an operation target associated with an ID "20", the body portion α1 of the multifunction machine α and a display β1 of a PC β are registered. As sensing data, sensing data representing the body portion α1 of the multifunction machine α and the display β1 of the PC β is registered. As authentication information, image data representing the face of the user X is registered. This authentication information is used for operating the body portion α1 of the multifunction machine α and the display β1 of the PC β. Information about a coordinated function that can be executed by using the body portion α1 of the multifunction machine α and the display β1 of the PC β is registered. For example, information about a print function as a coordinated function is registered.

When the body portion α1 of the multifunction machine α and the display β1 of the PC β are sensed and, further, the face of the user X is sensed, the notification controller 28 displays a selection screen on the display. The selection screen is used for the user to select either individual operation of each portion of the device 12, or operation of a coordinated function. If the user selects individual operation of each portion of the device 12, the notification controller 28 displays, on the display, a screen used for operating each of the body portion α1 and the display β1 individually. If the user selects operation of a coordinated function, the notification controller 28 displays, on the display, a screen used for operating each coordinated function (print function) that can be executed by using the body portion α1 and the display β1.

More specifically, sensing the body portion α1 of the multifunction machine α and the display β1 of the PC β generates sensing data representing the body portion α1 and the display β1. Likewise, sensing the face of the user X generates sensing data representing the face of the user X. The notification controller 28 searches the function management table for a combination of sensing data representing the body portion α1 and the display β1, and sensing data representing the face of the user X. Authentication succeeds if the combination is registered in the function management table. If authentication succeeds, the notification controller 28 displays the above-mentioned selection screen on the display. Authentication fails if the above-mentioned combination is not registered in the function management table. In this case, the notification controller 28 does not display the above-mentioned selection screen on the display. The notification controller 28 may display, on the display, information indicating failed authentication.

An authentication process may be performed by the multifunction machine α and the PC β. In this case, sensing data representing the face of the user X is transmitted from the terminal apparatus to the multifunction machine α and the PC β. Authentication for the body portion α1 succeeds if the user X is registered in the multifunction machine α as a user permitted to use the body portion α1. Likewise, authentication for the display β1 succeeds if the user X is registered in the PC β as a user permitted to use the display β1. If authentication succeeds for both the body portion α1 and the display β1, the notification controller 28 displays the above-mentioned selection screen on the display.

As operation targets associated with an ID "21", the body portion α1 of the multifunction machine α and the PC β are registered. As sensing data, sensing data representing the body portion α1 of the multifunction machine α and the PC β is registered. As authentication information, image data representing the face of the user X is registered. This authentication information is used for operating the body portion α1 of the multifunction machine α and the PC β. Information about each coordinated function that can be executed by using the body portion α1 of the multifunction machine α and the PC β is registered. For example, information about a scan-transfer function and a print function is registered.

When the body portion α1 of the multifunction machine α and the PC β are sensed and, further, the face of the user X is sensed, the notification controller 28 displays a selection screen on the display. The selection screen is used for the user to select either individual operation of each portion of the device 12, or operation of a coordinated function. If the user selects individual operation of each portion of device 12, the notification controller 28 displays, on the display, a screen used for operating each of the body portion α1 and the PC β individually. If the user selects operation of a coordinated function, the notification controller 28 displays, on the display, a screen used for operating each coordinated function (a scan-transfer function and a print function) that can be executed by using the body portion α1 and the PC β.

More specifically, sensing the body portion α1 of the multifunction machine α and the PC β generates sensing data representing the body portion α1 and the PC β. Likewise, sensing the face of the user X generates sensing data representing the face of the user X. The notification controller 28 searches the function management table for a combination of sensing data representing the body portion α1 and the PC β, and sensing data representing the face of the user X. Authentication succeeds if the combination is registered in the function management table. If authentication succeeds, the notification controller 28 displays the above-mentioned selection screen on the display. Authentication fails if the above-mentioned combination is not registered in the function management table. In this case, the notification controller 28 does not display the above-mentioned selection screen on the display. The notification controller 28 may display, on the display, information indicating failed authentication.

As with the operation target associated with the ID "20", an authentication process may be performed by the multifunction machine α and the PC β.

According to Modification 13, for the same device 12, the user may be notified of a different piece of information (information used for operating the device 12) between when a given portion of the device 12 is sensed and when another portion of the device 12 is sensed.

Modification 14

Modification 14 will be described. Modification 14 is a modification according to the second exemplary embodiment. According to Modification 14, the notification controller 28 changes information used for operating the device 12, in accordance with the manner of sensing performed on the device 12. For example, the notification controller 28 changes information used for operating the device 12 in accordance with the direction or angle of sensing performed on the device 12.

The positional relationship between the device 12 and the terminal apparatus 10 is set as described above with reference to FIG. 24.

Hereinafter, Modification 14 will be described in detail with reference to FIG. 43. FIG. 43 illustrates an exemplary function management table according to Modification 14. The function management table includes the following pieces of information in association with each other: an ID, information indicative of the name of a device, sensing data, information indicative of a positional relationship, authentication information, and information describing a function. The information indicative of a positional relationship is indicative of the positional relationship between the device 12 and the terminal apparatus 10. Examples of the positional information include information indicative of the orientation of the device 12, information indicative of the direction of sensing performed on the device 12, and positional information of each of the device 12 and the terminal apparatus 10 (e.g., positional information determined by a global positioning system (GPS)).

For example, as an operation target associated with an ID "22", a multifunction machine α is registered. As sensing data, sensing data representing the front face of the multifunction machine α is registered. As a positional relationship, a direction A of sensing (sensing from the front face) is registered. As authentication information, image data representing the face of a user X is registered. Function information about a print function that can be executed by using the multifunction machine α is registered. If the multifunction machine α is sensed by the sensing unit 20 from the direction A (from the front face) and, further, the face of the user X is sensed, the notification controller 28 gives notification of information used for operating the multifunction machine α. For example, the notification controller 28 displays information indicative of a print function on the display of the UI unit 18.

As an operation target associated with an ID "23", the multifunction machine α is registered. As sensing data, sensing data representing the left side face of the multifunction machine α is registered. As a positional relationship, a direction B of sensing (sensing from the left side face) is registered. As authentication information, image data representing the face of the user X is registered. Function information about a scan function that can be executed by using the multifunction machine α is registered. If the multifunction machine α is sensed by the sensing unit 20 from the direction B (from the left side face) and, further, the face of the user X is sensed, the notification controller 28 gives notification of information used for operating the multifunction machine α. For example, the notification controller 28 displays information indicative of a scan function on the display of the UI unit 18.

As described above, according to Modification 14, a function is associated for each direction of sensing. Consequently, for example, notification may be given of information about a different function for each direction.

According to Modification 14, for example, notification may be given of information about a function that differs between when the device 12 is sensed 360 degrees and when the device 12 is sensed 180 degrees.

Modification 15

Modification 15 will be described. Modification 15 is a modification according to the second exemplary embodiment. According to Modification 15, the notification controller 28 changes information used for operating the device 12, in accordance with the type of sensing performed on the device 12.

Hereinafter, Modification 15 will be described in detail with reference to FIG. 44. FIG. 44 illustrates an exemplary function management table according to Modification 15. The function management table includes the following pieces of information in association with each other: an ID, information indicative of the name of a device, sensing data, information indicative of the type of sensing, authentication information, and information describing a function. Examples of the type of sensing include still image capture, moving image capture, and three-dimensional shape measurement.

For example, as an operation target associated with an ID "24", a multifunction machine α is registered. As sensing data, sensing data representing the multifunction machine α is registered. The type of sensing used is moving image capture. As authentication information, image data representing the face of a user X is registered. Function information about a print function that can be executed by using the multifunction machine α is registered. If a moving image of the multifunction machine α is captured and, further, a moving image of the face of the user X is captured, the notification controller 28 gives notification of information used for operating the multifunction machine α. For example, the notification controller 28 displays information indicative of a print function on the display of the UI unit 18.

As an operation target associated with an ID "25", the multifunction machine α is registered. As sensing data, sensing data representing the multifunction machine α is registered. The type of sensing used is still image capture. As authentication information, still image data representing the face of the user X is registered. Function information about a scan function that can be executed by using the multifunction machine α is registered. If a still image of the multifunction machine α is captured and, further, a still image of the face of the user X is captured, the notification controller 28 gives notification of information used for operating the multifunction machine α. For example, the notification controller 28 displays information indicative of a scan function on the display of the UI unit 18.

According to Modification 15, a different function may be used for each type of sensing.

Notification may be given of a different function for each type of sensing. An operation target and an authentication object may be sensed by the same mode of sensing, or may be sensed by different modes of sensing.

Modification 16

Modification 16 will be described. Modification 16 is a modification according to the second exemplary embodiment. According to Modification 16, the notification controller 28 changes information used for operating multiple devices 12 in accordance with the order in which the multiple devices 12 are sensed.

Hereinafter, Modification 16 will be described in detail with reference to FIG. 45. FIG. 45 illustrates an exemplary function management table according to Modification 16. The function management table includes the following pieces of information in association with each other: an ID, information indicative of the name of a device, sensing data, information indicative of the order of sensing individual entities, authentication information, and information describing a function.

For example, as operation targets associated with an ID "26", a multifunction machine α and a PC β are registered. As sensing data, sensing data representing the multifunction machine α and the PC β is registered. Sensing is performed in the order of the multifunction machine α followed by the PC β. As authentication information, sensing data representing the face of a user X is registered. Function information about a scan-transfer function that can be executed by using the multifunction machine α and the PC β is registered. If the multifunction machine α and the PC β are sensed in the order of the multifunction machine α followed by the PC β and, further, the face of the user X is sensed, the notification controller 28 displays a selection screen on the display. The selection screen is used for the user to select either individual operation of each device 12, or operation of a coordinated function. If the user selects individual operation of each device 12, the notification controller 28 displays, on the display, a screen used for operating each of the multifunction machine α and the PC β individually. If the user selects operation of a coordinated function, the notification controller 28 displays, on the display, a screen used for operating each coordinated function (a scan-transfer function) that can be executed by using the multifunction machine α and the PC β.

As operation targets associated with an ID "27", the multifunction machine α and the PC β are registered. As sensing data, sensing data representing the multifunction machine α and the PC β is registered. Sensing is performed in the order of the PC β followed by the multifunction machine α. As authentication information, sensing data representing the face of the user X is registered. Function information about a print function that can be executed by using the multifunction machine α and the PC β is registered. If the multifunction machine α and the PC β are sensed in the order of the PC β followed by the multifunction machine α and, further, the face of the user X is sensed, the notification controller 28 displays a selection screen on the display. The selection screen is used for the user to select either individual operation of each device 12, or operation of a coordinated function. If the user selects individual operation of each device 12, the notification controller 28 displays, on the display, a screen used for operating each of the multifunction machine α and the PC β individually. If the user selects operation of a coordinated function, the notification controller 28 displays, on the display, a screen used for operating each coordinated function (a print function) that can be executed by using the multifunction machine α and the PC β.

According to Modification 16, a function may be changed in accordance with the order ofسensing individual devices 12.

As with Modification 6 according to the first exemplary embodiment, the notification controller 28 may provide notification of each function such that the priority of notification of each function is changed in accordance with the order of sensing individual devices 12.

For cases where three or more devices 12 are sensed, the notification controller 28 may, in the same manner as mentioned above, give notification of a function that varies according to the order of sensing.

Modification 17

Modification 17 will be described. Modification 17 is a modification according to the second exemplary embodiment. According to Modification 17, the notification controller 28 changes information used for operating the device 12, in accordance with the condition of sensing performed on the device 12. The condition of sensing is, for example, a condition determined by at least one of the followings: the direction of sensing performed on the device 12, the number of times of sensing, the type of sensing, and the order of sensing.

For example, the notification controller 28 may give notification of a different function depending on whether the device 12 (e.g., multifunction machine α) is sensed from its front face to the back face or sensed from the back face to the front face. The notification controller 28 may change a function in accordance with the number of times the device 12 is sensed, and give notification of the function. The notification controller 28 may change a function in accordance with the type of sensing, and give notification of the function. The notification controller 28 may change a function in accordance with the order of sensing, and give notification of the function.

As the condition of sensing to be used, a combination of multiple conditions selected from among the direction of sensing, the number of times of sensing, the type of sensing, and the order of sensing may be used. The more complex the combination, the higher the security provided for notification of a function.

The process according to Modification 17 may be applied to home security or other systems. For example, if multiple portions of a house are sensed in accordance with a specific sensing condition (e.g., a condition defined by a specific order of sensing, a specific number of times of sensing, or other factors) and, further, an authentication object is sensed and authentication succeeds, the notification controller 28 gives notification of an unlock function for unlocking a door of the house. If the multiple portions are not re-sensed in accordance with the specific sensing condition, the notification controller 28 does not give notification of the unlock function. When the user instructs that the unlock function be executed, the door is unlocked. The controller 24 may, if sensing is performed in accordance with a specific sensing condition, execute the unlock function to thereby open the door. Applying the process according to Modification 17 to security in this way may enhance security.

Modification 18

Modification 18 will be described. Modification 18 is a modification according to the second exemplary embodiment. Modification 18 uses software or a target (such as a file) as an operation target. For example, an independent function or coordinated function may be executed by one or more pieces of software, or an independent function or coordinated function may be executed for a target such as a file or a piece of merchandise.

Hereinafter, Modification 18 will be described in detail with reference to FIG. 46. FIG. 46 illustrates a function management table according to Modification 18. The function management table includes the following pieces of information in association with each other: an ID, information indicative of the name of a registration target, sensing data, authentication information, and information describing a function. In Modification 18, the function is executed by software, or the function is applied to a target. As authentication information, for example, image data representing the face of a user X is used.

Other than authentication information, the information registered in the function management table is identical to the information registered in the function management table according to Modification 8 (see FIG. 28). For example, information registered for an ID "28" is identical to the information registered for the ID "12". Information registered for an ID "29" is identical to the information registered for the ID "13". Information registered for an ID "30" is identical to the information registered for the ID "14". Information registered for an ID "31" is identical to the information registered for the ID "15".

For example, if a PC ε is sensed, and the face of the user X is sensed and authentication succeeds, the notification controller 28 gives notification of a function associated with the ID "28".

If the PC ε and a notebook ξ are sensed, and the face of the user X is sensed and authentication succeeds, the notification controller 28 displays a selection screen on the display. The selection screen is used for the user to select either display of an operation screen used for operating the PC ε, or display of a coordinated function. If the user selects display of the operation screen used for operating the PC ε, the notification controller 28 displays, on the display, the operation screen for operating the PC ε. If the user selects display of a coordinated function, the notification controller 28 displays, on the display, information about a coordinated function associated with the ID "29".

If the notebook ξ is sensed, and the face of the user X is sensed and authentication succeeds, the notification controller 28 gives notification of a function associated with the ID "30".

If the notebook ξ and a pen κ are sensed, and the face of the user X is sensed and authentication succeeds, the notification controller 28 gives notification of a coordinated function associated with the ID "31".

As described above, as a component other than the device 12, software or a file may be used for a function. A coordinated function that can be executed by using a combination of multiple components selected from among components including the device 12, software, and a file may be registered into the function management table in association with sensing data and authentication information. The process according to each of Modifications 9 to 17 mentioned above may be applied to Modification 18.

Modification 19

Modification 19 will be described. Modification 19 is a modification according to the second exemplary embodiment. According to Modification 19, the notification controller 28 changes, in accordance with authentication information, information used for operating the device 12, and gives notification of the information.

Hereinafter, Modification 19 will be described in detail with reference to FIG. 47. FIG. 47 illustrates a function management table according to Modification 19. The function management table includes the following pieces of information in association with each other: an ID, information indicative of the name of a device, sensing data, information indicative of authentication level, authentication information, and information describing a function.

For example, authentication information assumed to provide a higher level of security is associated with a higher authentication level, and is further associated with a higher-level function. An image displayed on the display, such as a two-dimensional barcode, or an image or geometrical figure formed on the surface of an object is used as an authentication object with the lowest authentication level. Accordingly, sensing data representing an image such as a two-dimensional barcode is used as authentication information with the lowest authentication level. A physical object such as a key is used as an authentication object with a medium authentication level. Accordingly, sensing data representing the object is used as authentication information with a medium authentication level. The user himself or herself is used as an authentication object with the highest authentication level. Accordingly, sensing data representing biometric information of the user is used as authentication information with the highest authentication level.

In the example illustrated in FIG. 47, a multifunction machine α is registered as the device 12, and sensing data representing the multifunction machine α is registered. As authentication information with an authentication level "1", sensing data representing a two-dimensional barcode is registered. Only a copy function is associated as an independent function with the authentication information. As authentication information with an authentication level "2", sensing data representing a physical key is registered. A copy function and a print function are associated as independent functions with the authentication information. As authentication information with an authentication level "3", sensing data representing an image of the face of a user X (biometric information of the user X) is registered, and all functions of the multifunction machine α are associated with the authentication information.

In response to sensing of the multifunction machine α, and sensing (e.g., image capture) of the two-dimensional barcode, the notification controller 28 displays, on the display, only function information about the copy function associated with the two-dimensional barcode.

In response to sensing of the multifunction machine α, and sensing of a physical key, the notification controller 28 displays, on the display, function information about the copy function and the print function that are associated with the key.

In response to sensing of the multifunction machine α, and sensing of the face of the user X, the notification controller 28 displays, on the display, function information about all functions associated with the face of the user X.

According to Modification 19, a function may be changed in accordance with authentication information. For example, by associating a higher-level function with an authentication object (e.g., living object) assumed to provide higher security, a higher-level function may be provided while ensuring security.

Modification 20

Modification 20 will be described. Modification 20 is a modification according to the second exemplary embodiment. According to Modification 20, if the device 12 is sensed, and multiple authentication objects are sensed and authentication succeeds, the notification controller 28 gives notification of information used for operating the device 12. The notification controller 28 may change the information used for operating the device 12 in accordance with the combination of authentication objects.

Hereinafter, Modification 20 will be described in detail with reference to FIG. 48. FIG. 48 illustrates a function management table according to Modification 20. The function management table includes the following pieces of information in association with each other: an ID, information indicative of the name of a device, sensing data, multiple pieces of authentication information, and information describing a function.

For example, as an operation target associated with an ID "33", a multifunction machine α is registered, and sensing data representing the multifunction machine α is registered. Image data representing the face of a user X and image data representing a key are registered as authentication information. All functions possessed by the multifunction machine α are registered as functions associated with the ID "33". If the multifunction machine α is sensed, and the face of the user X and the key are sensed and authentication succeeds, the notification controller 28 displays, on the display, function information about all the functions possessed by the multifunction machine α.

As an operation target associated with an ID "34", the multifunction machine α is registered, and sensing data representing the multifunction machine α is registered. Image data representing a two-dimensional barcode, and image data representing a key are registered as authentication information. A copy function and a scan function that are possessed by the multifunction machine α are registered as functions associated with the ID "34". If the multifunction machine α is sensed, and the two-dimensional barcode and the key are sensed and authentication succeeds, the notification controller 28 displays, on the display, function information about the copy function and the scan function that are possessed by the multifunction machine α.

According to Modification 20, authentication is performed by using multiple pieces of authentication information. This enhances security for an operation target compared with cases where an authentication process is performed by using a single piece of authentication information.

A higher-level function may be associated with a combination of authentication information that is assumed to provide higher security. For example, a combination (first combination) of biometric information such as an image representing the user, and authentication information representing an object is assumed to have an authentication level higher than the authentication level of a combination (second combination) of authentication information such as a two-dimensional barcode, and authentication information representing an object. Therefore, the first combination is associated with a higher-level function (e.g., all functions) than the second combination.

Three or more pieces of authentication information may be registered in association with an operation target. An authentication process using multiple pieces of authentication information may be performed also for cases where a portion of the device 12, software, or a target such as a file is used as an operation target.

The notification controller 28 may give notification of a function that varies according to the order of authentication. This will be described below with the ID "34" as a specific example. For example, the notification controller 28 may display, on the display, function information about a function that differs between when authentication using a key succeeds after success of authentication using a two-dimensional barcode, and when authentication using a two-dimensional barcode succeeds after success of authentication using a key.

At least two of Modifications 9 to 20 mentioned above may be combined. For example, notification may be given of a function that varies according to the order in which multiple portions of the device 12 are sensed, notification may be given of a function that varies according to the type of sensing performed on a portion of the device 12, or notification may be given of a coordinated function that can be executed by using a portion of the device 12 and software. Combinations other than those mentioned above may be used.

Third Exemplary Embodiment

Figure 49:
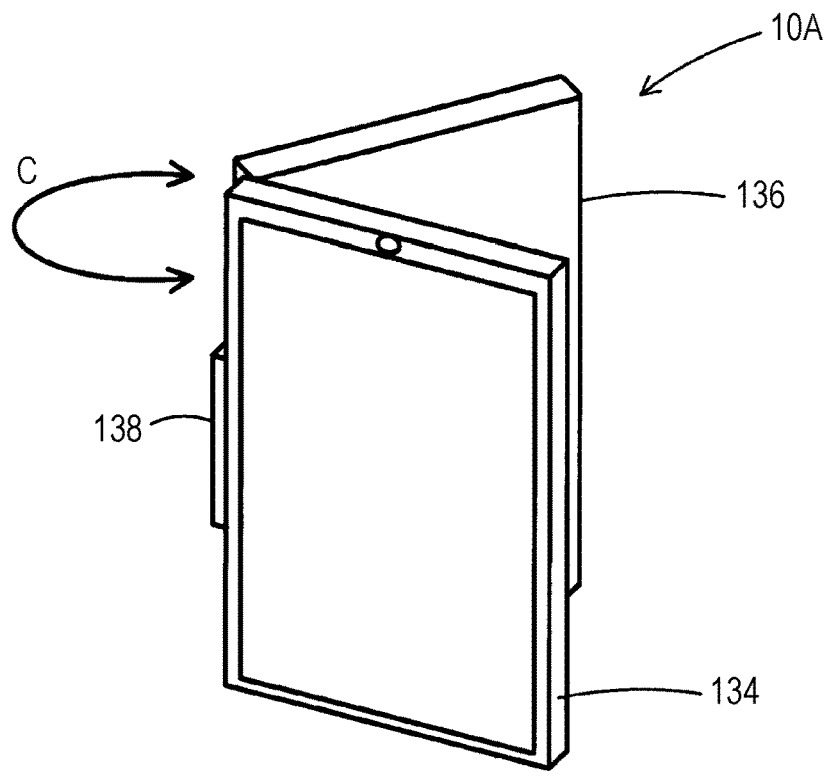
FIG. 49 is a perspective view of a terminal apparatus according to a third exemplary embodiment.

Hereinafter, a terminal apparatus 10A according to a third exemplary embodiment will be described. FIG. 49 illustrates the terminal apparatus 10A according to the third exemplary embodiment. The terminal apparatus 10A is a so-called foldable dual-screen smartphone. For example, the terminal apparatus 10A includes a first body portion 134 and a second body portion 136. The first body portion 134 and the second body portion 136 each have a display. The first body portion 134 and the second body portion 136 are connected to each other by a connection part 138 such as a hinge, for example. Rotating the first body portion 134 and the second body portion 136 about the connection part 138 in the direction of an arrow C makes it possible to place each of the first body portion 134 and the second body portion 136 at any given rotational angle. For example, rotating the first body portion 134 and the second body portion 136 into contact with each other results in a state in which the entire terminal apparatus 10A is folded up. Rotating the first body portion 134 and the second body portion 136 and arranging the first body portion 134 and the second body portion 136 horizontally with respect to each other results in a state in which the entire terminal apparatus 10A is unfolded 180 degrees horizontally.

The terminal apparatus 10A has the same configuration as the terminal apparatus 10 mentioned above.

Figure 50:
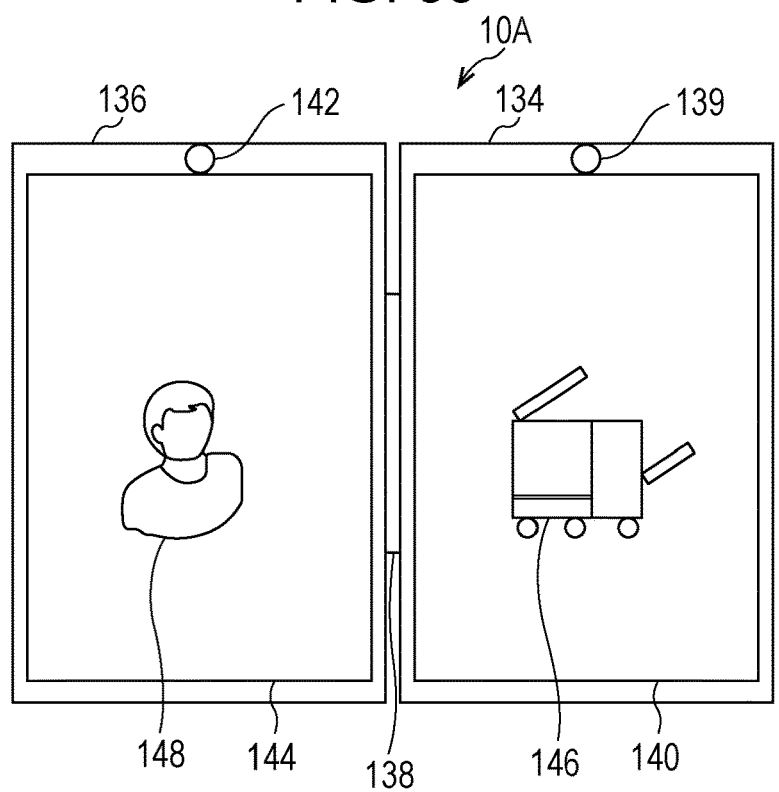
FIG. 50 illustrates the terminal apparatus according to the third exemplary embodiment.

FIG. 50 illustrates the terminal apparatus 10A when unfolded 180 degrees horizontally. The first body portion 134 has a first sensing unit 139 and a first display 140. The second body portion 136 has a second sensing unit 142 and a second display 144.

The first sensing unit 139 and the second sensing unit 142 each have the same function as that of the sensing unit 20 mentioned above. The first sensing unit 139 and the second sensing unit 142 may be identical in their performance capabilities, or may be different in their performance capabilities. For example, one of the sensing units may be implemented by a camera that captures a still image or a moving image, and the other sensing unit may function as a three-dimensional sensor that performs shape measurement.

The first display 140 displays sensing data generated by sensing performed by using the first sensing unit 139. In the example illustrated in FIG. 50, a multifunction machine α is captured by the first sensing unit 139, and a still image 146 representing the multifunction machine α is displayed. A moving image or measurement data representing the multifunction machine α may be used as sensing data.

The second display 144 displays sensing data generated by sensing performed by using the second sensing unit 142. In the example illustrated in FIG. 50, the face of a user X is captured by the second sensing unit 142, and a still image 148 representing the face of the user X is displayed. A moving image or measurement data representing the face of the user X may be used as sensing data.

Hereinafter, a process performed by the terminal apparatus 10A according to the third exemplary embodiment will be described.

Combination of Second Exemplary Embodiment and Third Exemplary Embodiment

The terminal apparatus 10A may be applied to the process according to the second exemplary embodiment. For example, if the device 12 (e.g., the multifunction machine α) as an operation target is sensed by the first sensing unit 139, and an authentication object (e.g., the face of the user X) is sensed by the second sensing unit 142 and authentication succeeds, the notification controller 28 displays, on the second display 144, information (e.g., an operation screen) used for operating the multifunction machine α. Of course, the notification controller 28 may display the information on the first display 140, or may display the information on both the first display 140 and the second display 144.

Conversely to the above-mentioned example, if the multifunction machine α as an operation target is sensed by the second sensing unit 142, and the face of the user X is sensed by the first sensing unit 139 and authentication succeeds, the notification controller 28 may display, on the first display 140, information (e.g., an operation screen) used for operating the multifunction machine α. Of course, the notification controller 28 may display the information on the second display 144, or may display the information on both the first display 140 and the second display 144.

A role may be associated with each of the first sensing unit 139 and the second sensing unit 142. For example, the first sensing unit 139 is defined as a sensing unit used for sensing an operation target, and the second sensing unit 142 is defined as a sensing unit used for sensing an authentication object. In this case, if an operation target is sensed by the first sensing unit 139, and an authentication object is sensed by the second sensing unit 142 and authentication succeeds, the notification controller 28 gives notification of information used for operating the operation target. By contrast, if an authentication object is sensed by the first sensing unit 139, and an operation target is sensed by the second sensing unit 142, the notification controller 28 does not give notification of information used for operating the operation target.

Figure 51:
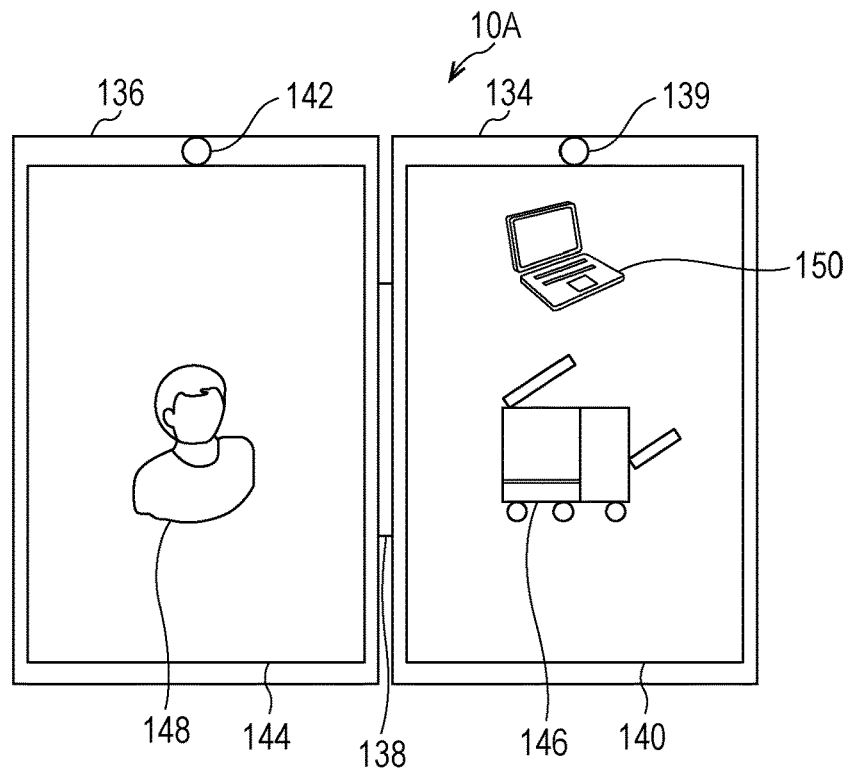
FIG. 51 illustrates the terminal apparatus according to the third exemplary embodiment.

If multiple operation targets (e.g., the multifunction machine α and the PC β) are captured by the first sensing unit 139, the still image 146 representing the multifunction machine α, and a still image 150 representing the PC β are displayed on the first display 140 as illustrated in FIG. 51. Further, the face of the user X as an authentication object is captured by the second sensing unit 142, and thus the still image 148 representing the face of the user X is displayed on the second display 144 as authentication information. Moving image data or measurement data may be used as sensing data. If authentication succeeds as a result of an authentication process performed by using the still image 148, the notification controller 28 displays a selection screen on the second display 144. The selection screen is used for the user to select either display of a screen used for operating each of the multifunction machine α and the PC β individually, or display of each coordinated function that can be executed by using the multifunction machine α and the PC β. An operation on the selection screen is performed in the same manner as the operation according to the second exemplary embodiment.

Combination of First Exemplary Embodiment and Third Exemplary Embodiment

Figure 52:
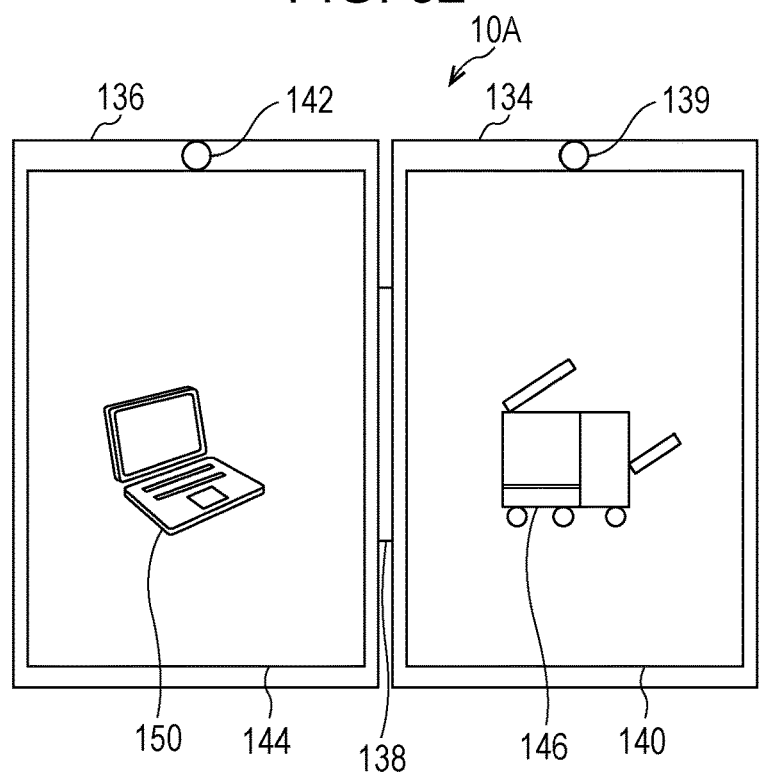
FIG. 52 illustrates the terminal apparatus according to the third exemplary embodiment.

The terminal apparatus 10A may be applied to the first exemplary embodiment. For example, the first sensing unit 139 and the second sensing unit 142 are used in registering multiple entities. For example, if the multifunction machine α to be registered is sensed by the first sensing unit 139, and the PC β to be registered is sensed by the second sensing unit 142, the still image 146 representing the multifunction machine α is displayed on the first display 140, and the still image 150 representing the PC β is displayed on the second display 144 as illustrated in FIG. 52. In this way, each entity to be registered may be sensed by using a different sensing unit.

The terminal apparatus 10A may include three or more displays.

Other Exemplary Embodiments

Figure 53:
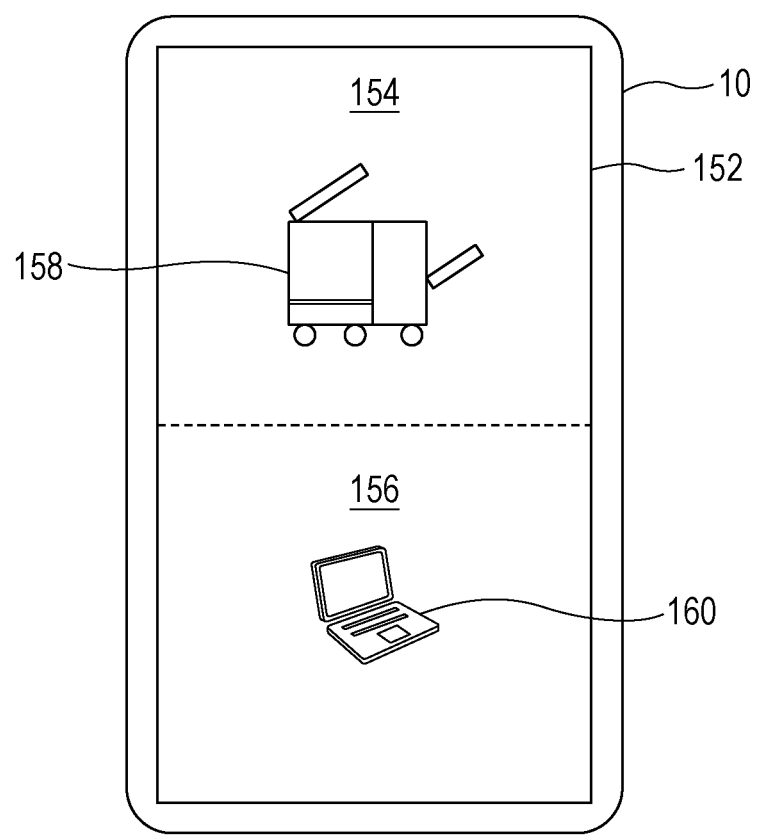
FIG. 53 illustrates a screen according to another exemplary embodiment.

Hereinafter, other exemplary embodiments will be described with reference to FIG. 53. FIG. 53 illustrates a screen 152. The screen 152 has multiple areas. In the example illustrated in FIG. 53, the screen 152 includes areas 154 and 156. For example, in each area, information such as sensing data representing an entity to be registered, sensing data representing an operation target, or sensing data representing an authentication object is displayed.

In the example illustrated in FIG. 53, a still image 158 representing a multifunction machine α is displayed in the area 154, and a still image 160 representing a PC β is displayed in the area 156. The multifunction machine α and the PC β each correspond to an example of an entity to be registered according to the first exemplary embodiment. A function is registered in association with each of the multifunction machine α and the PC β.

In another example, an image representing an operation target according to the second exemplary embodiment may be displayed in the area 154, and an image representing authentication information may be displayed in the area 156. The user may operate each image such that the image representing an operation target is moved into the area 154, and the image representing authentication information is moved into the area 156. An authentication process is performed based on the image displayed in the area 156, and if the authentication succeeds, notification is given of information used for operating an operation target associated with the image displayed in the area 154.

In one example, the terminal apparatus 10 or 10A is implemented by cooperation of hardware and software. Specifically, the terminal apparatus 10 or 10A includes one or more processors such as CPUs (not illustrated). As the one or more processors read and execute a program stored in a storage (not illustrated), the functions of various units of the terminal apparatus 10 or 10A are implemented. The program is stored into the storage via a recording medium such as a CD or DVD, or via a communication path such as a network. In another example, various units of the terminal apparatus 10 or 10A may be implemented by, for example, hardware resources such as processors, electronic circuits, or application specific integrated circuits (ASICs). A device such as a memory may be used for the implementation. In still another example, various units of the terminal apparatus 10 or 10A may be implemented by devices such as digital signal processors (DSPs) or field programmable gate arrays (FPGAs).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a hardware sensor configured to capture an image or three-dimensional information; and
    a controller that, in response to the hardware sensor capturing an image or three-dimensional information of an operation target and the hardware sensor capturing an image or three-dimensional information of an authentication object, is configured to perform authentication to grant access to the information processing apparatus and provide notification of information used for operating the operation target, wherein
    the controller changes the information based on a form of the authentication object, and
    the controller changes the information in accordance with a direction of capturing the operation target.

2. The information processing apparatus according to claim 1,
    wherein the controller controls notification of the information in response to simultaneous capturing of the operation target and the authentication object.

3. The information processing apparatus according to claim 1,
    wherein the controller controls notification of the information in response to sequential capturing of the operation target and the authentication object.

4. The information processing apparatus according to claim 1,
    wherein the controller controls notification of the information in response to capturing of the operation target and the authentication object by an identical hardware sensor.

5. The information processing apparatus according to claim 1,
    wherein the controller controls notification of the information in response to capturing of the operation target and the authentication object by different sensors.

6. The information processing apparatus according to claim 1,
    wherein the controller, in response to capturing of a portion of the operation target and the authentication object by the hardware sensor, controls notification of information used for operating the portion of the operation target.

7. The information processing apparatus according to claim 1,
    wherein the controller, in response to capturing of a plurality of operation targets and the authentication object, controls notification of information used for operating the plurality of operation targets.

8. The information processing apparatus according to claim 7,
    wherein the information is information about a function that is executable by using the plurality of operation targets.

9. The information processing apparatus according to claim 7,
    wherein authentication for the plurality of operation targets is performed by using an identical piece of authentication information.

10. The information processing apparatus according to claim 7,
    wherein the controller changes the information in accordance with an order of capturing the plurality of operation targets.

11. The information processing apparatus according to claim 1, further comprising:
    a first display including a first hardware sensor; and
    a second display including a second hardware sensor,
    wherein the controller controls notification of the information in response to capturing of the operation target by the first hardware sensor and to capturing of the authentication object by the second hardware sensor.

12. The information processing apparatus according to claim 1,
    wherein the information is a function that is changed in accordance with the type of the authentication object.

13. The information processing apparatus according to claim 1,
    wherein the controller controls notification of the information in response to capturing of the operation target and a plurality of authentication objects.

14. The information processing apparatus according to claim 9,
    wherein the authentication information is information including biometric information used for biometric authentication.

15. The information processing apparatus according to claim 9,
    wherein the authentication information is information other than biometric information and is an object used for authentication.

16. The information processing apparatus according to claim 1,
    wherein the operation target is a device, software, or a file.

17. A non-transitory computer readable medium storing a program causing a computer to execute a process, the process comprising:
    in response to a hardware sensor capturing an image or three-dimensional information of an operation target and the hardware sensor capturing an image or three-dimensional information of an authentication object, performing authentication to grant access to the computer and providing notification of information used for operating the operation target wherein
    the information is changed based on a form of the authentication object, and
    the information is changed in accordance with a direction of capturing the operation target.

18. The information processing apparatus according to claim 1,
    wherein the information is accessible functions, and the accessible functions are changed in accordance with the type of the authentication object.

* * * * *